USO05563932A

United States Patent [19]
Tachibana et al.

[11] Patent Number: 5,563,932
[45] Date of Patent: Oct. 8, 1996

[54] COMMUNICATION APPARATUS CONNECTABLE TO SWITCHING NETWORK PROVIDING DISTINCTIVE RINGING PATTERN SERVICE

[75] Inventors: Shunichi Tachibana, Urayasu; Tomoyuki Takeda, Yokohama; Kaori Nakagawa; Akemi Sato, both of Kawasaki, all of Japan

[73] Assignee: Canon Kabushiki Kaisha, Tokyo, Japan

[21] Appl. No.: 538,033

[22] Filed: Oct. 2, 1995

Related U.S. Application Data

[63] Continuation of Ser. No. 297,823, Aug. 30, 1994, abandoned.

[30] Foreign Application Priority Data

| Sep. 1, 1993 | [JP] | Japan | 5-217560 |
| Sep. 1, 1993 | [JP] | Japan | 5-217562 |
| Sep. 1, 1993 | [JP] | Japan | 5-217563 |
| Dec. 13, 1993 | [JP] | Japan | 5-312019 |
| Dec. 13, 1993 | [JP] | Japan | 5-312025 |

[51] Int. Cl.⁶ .......................... H04M 1/00; H04N 1/00; H04Q 3/00
[52] U.S. Cl. .......................... 379/100; 379/373; 358/434
[58] Field of Search ...................... 379/100, 93, 96–99, 379/102, 104, 105, 94, 95, 181, 183, 179, 167, 201, 245, 246, 258, 268, 373, 375, 387, 374, 372, 377, 386; 358/400, 402, 407, 434–442, 468

[56] References Cited

U.S. PATENT DOCUMENTS

| 4,140,882 | 2/1979 | Regan et al. | 379/201 |
| 4,293,737 | 10/1981 | Cepelinski | 379/179 |
| 4,741,024 | 4/1988 | Del Monte et al. | 379/181 |
| 4,782,518 | 11/1988 | Mattley et al. | 379/201 |
| 4,800,439 | 1/1989 | Yoshino | 358/257 |
| 4,815,121 | 5/1989 | Yoshida | 379/67 |
| 4,823,375 | 4/1989 | Yoshida | 379/100 |
| 4,868,865 | 9/1989 | Ogawa et al. | 379/100 |
| 4,932,048 | 6/1990 | Kenmochi et al. | 379/67 |
| 4,939,772 | 7/1990 | Goto | 379/100 |
| 4,998,273 | 3/1991 | Nichols | 379/102 |
| 5,029,202 | 7/1991 | Doernbach, Jr. et al. | 379/245 |
| 5,040,209 | 8/1991 | Greenberg et al. | 379/94 |
| 5,093,857 | 3/1992 | Yoshida et al. | 379/100 |
| 5,155,601 | 10/1992 | Toyama | 379/100 |
| 5,165,096 | 11/1992 | Matsumoto | 379/97 |
| 5,185,783 | 2/1993 | Takahashi et al. | 379/93 |
| 5,200,992 | 4/1993 | Yoshino | 379/93 |
| 5,317,629 | 5/1994 | Watanabe | 379/93 |
| 5,361,296 | 11/1994 | Reyes et al. | 379/102 |

FOREIGN PATENT DOCUMENTS

| 2066505 | 10/1992 | Canada . | |
| 0314655 | 5/1989 | European Pat. Off. . | |
| 0454452 | 10/1991 | European Pat. Off. . | |
| 63-42266 | 2/1988 | Japan | 379/100 |
| 2193419 | 2/1988 | United Kingdom | 379/374 |

OTHER PUBLICATIONS

Patent Abstracts of Japan, vol. 016, No. 134 (E–1185), Apr. 1992, for Kokai 3–206351.

*Primary Examiner*—Wing F. Chan
*Attorney, Agent, or Firm*—Fitzpatrick, Cella, Harper & Scinto

[57] ABSTRACT

A communication apparatus utilizes a distinctive ringing pattern service provided by a switching network for switching speech communication to and from data communication and for telling who is to answer an incoming call. In the apparatus, communication is switched between speech communication, including voice answering communication, and data communication, including facsimile data communication, according to an intermittent pattern of a call signal from a switching network. Data corresponding to the intermittent pattern of a call signal is transmitted, data from a calling party side is recorded and character information corresponding to the intermittent pattern of a call signal is displayed.

20 Claims, 55 Drawing Sheets

COMMUNICATION MANAGEMENT INFORMATION

COMMUNICATION MANAGEMENT BUFFER

CALLED TERMINAL INFORMATION TABLE

| ID | USER'S TEL NUMBER | USER'S ABBREVIATION |
|---|---|---|
| 0 | 03-3768-6661 | OANON |
| 1 | 03-3768-6662 | K. NAKAGAWA |
| 2 | 03-3768-6663 | S. TACHIBANA |
| 3 | 03-3768-6664 | ROBERT GREEN |
| 4 | 03-3768-6665 | |

FIG. 20

```
        ┌─────────────────────────────┐
        │ COMMUNICATION RESULT REPORT │
        └─────────────────────────────┘

RECEPTION IS COMPLETED

RECEPTION NUMBER              0002

PARTNER'S TEL NUMBER          1 773 3173

PARTNER'S ABBREVIATION        OANON UK

START TIME                    05/07 10:53

COMMUNICATION TIME            00'31

NUMBER OF SHEET               1

COMMUNICATION RESULT          OK

CALLED PARTY TEL NUMBER       03 3768 6661

CALLED PARTY ABBREVIATION     OANON
```

FIG. 22

COMMUNICATION RESULT REPORT

TRANSMISSION IS COMPLETED

| | |
|---|---|
| RECEPTION NUMBER | 0015 |
| PARTNER'S TEL NUMBER | 20 5458545 |
| PARTNER'S ABBREVIATION | JIMMY BROWN |
| START TIME | 05/11 13:03 |
| COMMUNICATION TIME | 00'29 |
| NUMBER OF SHEET | 1 |
| COMMUNICATION RESULT | OK |
| CALLING PARTY TEL NUMBER | 03 3768 6664 |
| CALLING PARTY ABBREVIATION | ROBERT GREEN |

FIG. 24

COMMUNICATION RESULT REPORT

| RECEPTION NUMBER | COMMUNICATION MODE | | PARTNER'S TEL NUMBER | PARTNER'S ABBREVIATION | START TIME | COMMUNICATION TIME | NUMBER OF SHEET | COMMUNICATION RESULT | USER'S ABBREVIATION |
|---|---|---|---|---|---|---|---|---|---|
| 0001 | TRANSMISSION | ECM | 1 773 3173 | OANON UK | 05/07 10:11 | 01'28 | 3 | OK | OANON U.S.A |
| 0002 | AUTOMATIC RECEPTION | ECM | 1 773 3173 | OANON UK | 05/07 10:53 | 00'31 | 1 | OK | OANON U.S.A |
| 0003 | BROADCASTING TRANSMISSION | ECM | 2 5059 | OANON ITALIA | 05/07 14:31 | 01'33 | 2 | OK | OANON U.S.A |
| 0003 | BROADCASTING TRANSMISSION | ECM | 312 288 5700 | OANON INC. | 05/07 14:33 | 01'32 | 2 | OK | OANON U.S.A |
| 0003 | BROADCASTING TRANSMISSION | ECM | 1 341251 | OANON FRANCE | 05/07 14:35 | 01'30 | 2 | OK | OANON U.S.A |
| 0003 | BROADCASTING TRANSMISSION | ECM | 3 234 232 | OANON SALES | 05/07 14:37 | 01'32 | 2 | OK | OANON U.S.A |
| 0004 | AUTOMATIC RECEPTION | ECM | 1 773 3173 | OANON UK | 05/07 14:35 | 00'40 | 1 | OK | OANON U.S.A |
| 0005 | MANUAL RECEPTION | G3 | 35425 | Mr. M | 05/07 19:21 | 12'13 | 16 | OK | K. NAKAGAWA |
| 0006 | TRANSMISSION | ECM | 1 773 3173 | OANON UK | 05/08 08:31 | 02'43 | 3 | OK | S. TACHIBANA |
| 0007 | POLLING TRANSMISSION | G3 | 20 5458545 | JIMMY BROWN | 05/08 09:14 | 00'35 | 1 | OK | S. TACHIBANA |
| 0008 | AUTOMATIC RECEPTION | ECM | 312 288 5700 | OANON INC. | 05/09 10:41 | 00'33 | 1 | OK | OANON U.S.A |
| 0009 | AUTOMATIC RECEPTION | ECM | 0427 45 | J.M. | 05/09 19:59 | 00'31 | 1 | OK | OANON U.S.A |
| 0010 | TIMER TRANSMISSION | ECM | 2 5059 | OANON ITALIA | 05/10 06:00 | 00'51 | 2 | OK | K. NAKAGAWA |
| 0011 | AUTOMATIC RECEPTION | G3 | 20 5458545 | JIMMY BROWN | 05/10 09:22 | 00'29 | 1 | OK | OANON U.S.A |
| 0012 | POLLING RECEPTION | ECM | 0427 35 | | 05/10 10:04 | 00'09 | 1 | NG #021 | ROBERT GREEN |
| 0013 | TRANSMISSION | | 3122887500 | | 05/10 11:11 | 00'00 | 0 | NG STOP | K. NAKAGAWA |
| 0014 | TRANSMISSION | ECM | 312 288 5700 | OANON INC. | 05/10 14:15 | 02'45 | 5 | OK | OANON U.S.A |
| 0015 | TRANSMISSION | G3 | 20 5458545 | JIMMY BROWN | 05/11 13:03 | 00'29 | 1 | OK | ROBERT GREEN |

FIG. 25A

[OANON] COMMUNICATION RESULT REPORT [03 3768 6661]

| RECEPTION NUMBER | COMMUNICATION MODE | | PARTNER'S TEL NUMBER | PARTNER'S ABBREVIATION | START TIME | COMMUNICATION TIME | NUMBER OF SHEET | COMMUNICATION RESULT |
|---|---|---|---|---|---|---|---|---|
| 0001 | TRANSMISSION | ECM | 1 773 3173 | OANON UK | 05/07 10:11 | 01'28 | 3 | OK |
| 0002 | AUTOMATIC RECEPTION | ECM | 1 773 3173 | OANON UK | 05/07 10:53 | 00'31 | 1 | OK |
| 0003 | BROADCASTING TRANSMISSION | ECM | 2 5059 | OANON ITALIA | 05/07 14:31 | 01'33 | 2 | OK |
| 0003 | BROADCASTING TRANSMISSION | ECM | 312 288 5700 | OANON INC. | 05/07 14:33 | 01'32 | 2 | OK |
| 0003 | BROADCASTING TRANSMISSION | ECM | 1 341251 | OANON FRANCE | 05/07 14:35 | 01'30 | 2 | OK |
| 0003 | BROADCASTING TRANSMISSION | ECM | 3 234 232 | OANON SALES | 05/07 14:37 | 01'32 | 2 | OK |
| 0007 | POLLING TRANSMISSION | G3 | 20 5458545 | JIMMY BROWN | 05/08 09:14 | 00'35 | 1 | OK |
| 0008 | AUTOMATIC RECEPTION | ECM | 312 288 5700 | OANON INC. | 05/09 10:41 | 00'33 | 1 | OK |
| 0010 | TIMER TRANSMISSION | ECM | 2 5059 | OANON ITALIA | 05/10 06:00 | 00'51 | 2 | OK |
| 0013 | TRANSMISSION | | 3122887500 | | 05/10 11:11 | 00'00 | 0 | NG STOP |
| 0014 | TRANSMISSION | ECM | 312 288 5700 | OANON INC. | 05/10 14:15 | 02'45 | 5 | OK |

FIG. 25B

[K. NAKAGAWA] COMMUNICATION RESULT REPORT [03 3768 6662]

| RECEPTION NUMBER | COMMUNICATION MODE | | PARTNER'S TEL NUMBER | PARTNER'S ABBREVIATION | START TIME | COMMUNICATION TIME | NUMBER OF SHEET | COMMUNICATION RESULT |
|---|---|---|---|---|---|---|---|---|
| 0004 | AUTOMATIC RECEPTION | ECM | 1 773 3173 | OANON UK | 05/07 14:35 | 00'40 | 1 | OK |
| 0009 | AUTOMATIC RECEPTION | ECM | 0427 45 | J.M. | 05/09 19:59 | 00'31 | 1 | OK |
| 0012 | POLLING RECEPTION | ECM | 0427 35 | | 05/10 00:04 | 00'09 | 1 | NG #021 |

FIG. 25C

[S. TACHIBANA] COMMUNICATION RESULT REPORT [03 3768 6663]

| RECEPTION NUMBER | COMMUNICATION MODE | PARTNER'S TEL NUMBER | PARTNER'S ABBREVIATION | START TIME | COMMUNICATION TIME | NUMBER OF SHEET | COMMUNICATION RESULT |
|---|---|---|---|---|---|---|---|
| 0005 | MANUAL RECEPTION | 35425 | Mr. M | 05/07 19:21 | 12'13 | 16 | OK |
| 0006 | TRANSMISSION | 1 773 3173 | OANON UK | 05/08 08:31 | 02'43 | 3 | OK |

FIG. 25D

[ROBERT GREEN] COMMUNICATION RESULT REPORT [03 3768 6664]

| RECEPTION NUMBER | COMMUNICATION MODE | PARTNER'S TEL NUMBER | PARTNER'S ABBREVIATION | START TIME | COMMUNICATION TIME | NUMBER OF SHEET | COMMUNICATION RESULT |
|---|---|---|---|---|---|---|---|
| 0011 | AUTOMATIC RECEPTION | 20 5458545 | JIMMY BROWN | 05/10 09:22 | 00'29 | 1 | OK |
| 0015 | TRANSMISSION | 20 5458545 | JIMMY BROWN | 05/11 13:03 | 00'29 | 1 | OK |

FIG. 26

PAGE RECORD

| | NEXT PAGE ID → | TOP ADDRESS → | END ADDRESS → | |
|---|---|---|---|---|
| 1 | 2 | 10000 | 121f0 | |
| 2 | 8000 | 121f1 | 140fb | |
| 3 | | | | |
| 4 | | | | |
| 32 | | | | |

IMAGE RECORD

| RECEPTION NUMBER : 0009 |
| RECEPTION TIME : 9212242359 |
| RING PATTERN ID : 2 |
| TOP PAGE ID : 1 |

92/12/24 23:59 RECEPTION NUMBER [0009] NAME OF RECEIVER [A. Tachibana] P.001

PASSWORD TABLE

| ID | PASSWORD |
|----|----------|
| 0  | FFFF     |
| 1  | FFFF     |
| 2  | 1234     |
| 3  | FFFF     |
| 4  | 5678     |

FIG. 38

OPERATION SET TABLE

| ID | OPERATION |
|---|---|
| 0 | TELA |
| 1 | TELB |
| 2 | FAX |
| 3 | |
| 4 | |

FIG. 41

PSEUDO CALL SOUND PATTERN DATA TABLE

| ID | | | | | | | | | | |
|---|---|---|---|---|---|---|---|---|---|---|
| 0 | 200 | 400 | 0 | 0 | 0 | 0 | 0 | 0 | 0 | 0 |
| 1 | 80 | 40 | 80 | 400 | 0 | 0 | 0 | 0 | 0 | 0 |
| 2 | 40 | 20 | 40 | 20 | 80 | 400 | 0 | 0 | 0 | 0 |
| 3 | 30 | 20 | 100 | 20 | 30 | 400 | 0 | 0 | 0 | 0 |
| 4 | 100 | 50 | 100 | 50 | 100 | 200 | 0 | 0 | 0 | 0 |

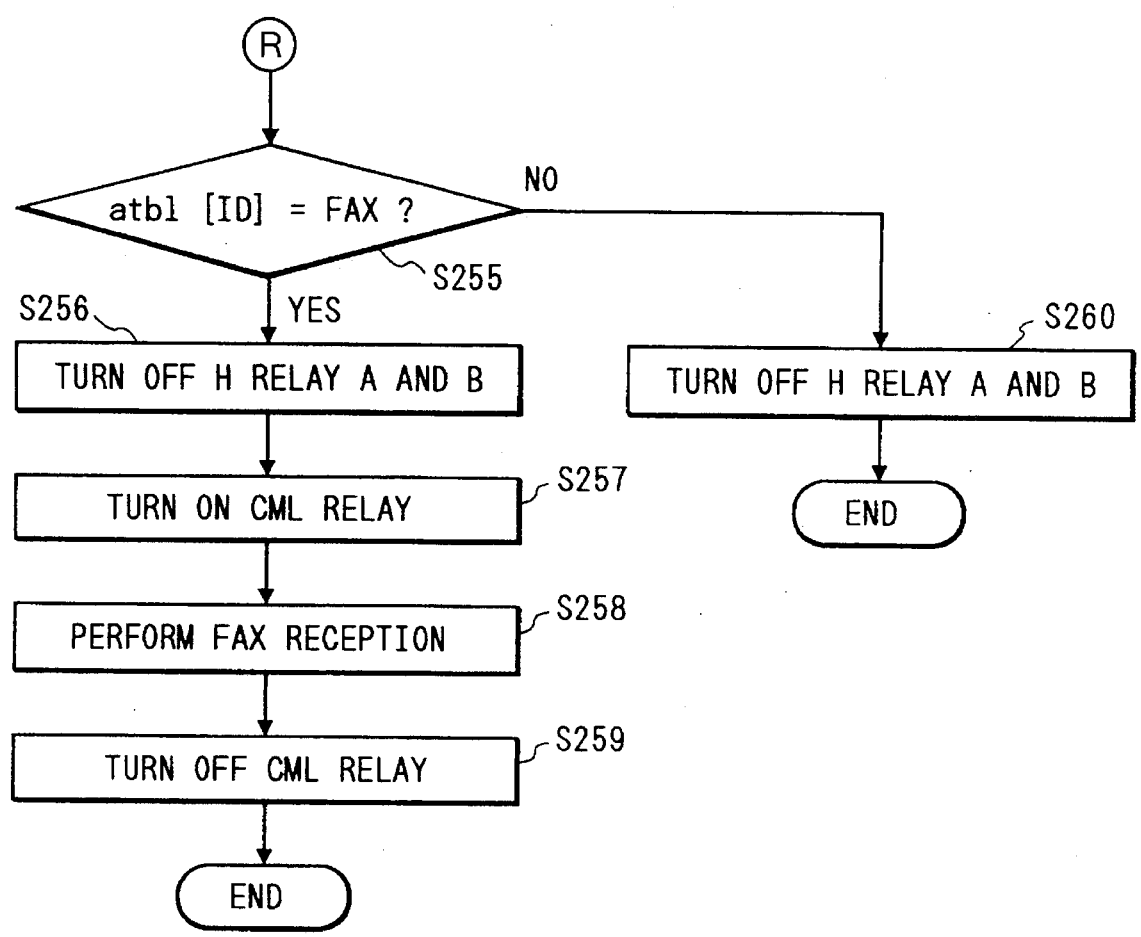

CALLED TERMINAL INFORMATION TABLE

| ID | USER'S TEL NUMBER | USER'S ABBREVIATION |
|---|---|---|
| 0 | 03 - 3768 - 6661 | OANON |
| 1 | 03 - 3768 - 6662 | K. NAKAGAWA |
| 2 | 03 - 3768 - 6663 | S. TACHIBANA |
| 3 | 03 - 3768 - 6664 | ROBERT GREEN |
| 4 | 03 - 3768 - 6665 | |

COMMUNICATION APPARATUS CONNECTABLE TO SWITCHING NETWORK PROVIDING DISTINCTIVE RINGING PATTERN SERVICE

This application is a continuation of application Ser. No. 08/297,823 filed Aug. 30, 1994, which is now abandoned.

BACKGROUND OF THE INVENTION

1. Field of the Invention

The present invention relates to a communication apparatus which operates according to an intermittent pattern of a call signal from a switching network.

1. Related Background Art

In the case of sharing one communication line between speech communication and data communication, after the line is connected with a communication partner, when a data communication signal is transmitted from the communication partner, a data communication is performed; and when a speech voice is transmitted, a bell sound is rung to call an operator for carrying out a speech communication.

However, even when the communication partner wants a speech communication, if an operator is absent, a communication charge is imposed on the partner although the speech communication fails.

In some case, a data communication signal or a speech voice is not properly detected.

Also, in some case, when a plurality of users share one communication apparatus, it is unknown which user is to answer an incoming call.

There is an apparatus which allows a confidential reception of data which is not wanted to be disclosed to others.

However, the confidential reception does not work unless a transmission side and a reception side agree about communication procedure.

U.S. Pat. No. 5,200,992 discloses a communication apparatus connected to a PBX extension line which identifies the type of a calling party side on receipt of an incoming call, i.e. discriminates between an intercom call and an outside call. This communication apparatus previously stores an ON time and an OFF time of a call signal from an extension line and a call signal from an outside line for comparison with an input call signal.

However, as the types of call signals increase, it is necessary for the communication apparatus to previously store an ON time and an OFF time for each of the types of call signals; hence, a memory for such storage is needed, and processing are complicated.

SUMMARY OF THE INVENTION

It is an object of the present invention to improve a communication apparatus.

It is another object of the present invention to switch a speech communication to and from a data communication before answering an incoming call.

It is a further object of the present invention to securely switch a speech communication to and from a data communication.

It is a still another object of the present invention to tell who is to answer an incoming call using a distinctive ringing pattern service when a plurality of users share an apparatus.

It is a still further object of the present invention to provide a highly versatile confidential reception.

It is a still further object of the present invention to provide a communication apparatus which switches a speech communication to and from a data communication according to the distinctive ringing pattern service.

It is a still further object of the present invention to improve the discrimination of intermittent patterns of call signals.

Other objects of the present invention will be apparent from the following description of embodiments.

BRIEF DESCRIPTION OF THE DRAWINGS

FIG. 20 is a view showing a reception result report of the fifth embodiment;

FIG. 22 is a view showing a transmission result report of the fifth embodiment;

FIG. 24 is a view showing a batch outputted communication management report of the fifth embodiment;

FIGS. 25A to 25D are views showing communication management reports of the fifth embodiment outputted classified by ring pattern ID;

FIG. 26 is a construction diagram of a reception image management table of a sixth embodiment;

FIG. 38 is a construction diagram of an operation set table of the eighth embodiment;

FIGS. 39A to 39C are flow charts of a termination process of the eighth embodiment;

FIG. 41 is a construction diagram of a pseudo call sound pattern data table;

DETAILED DESCRIPTION OF THE PREFERRED EMBODIMENTS

A first embodiment of the present invention will be described.

Figure 1:
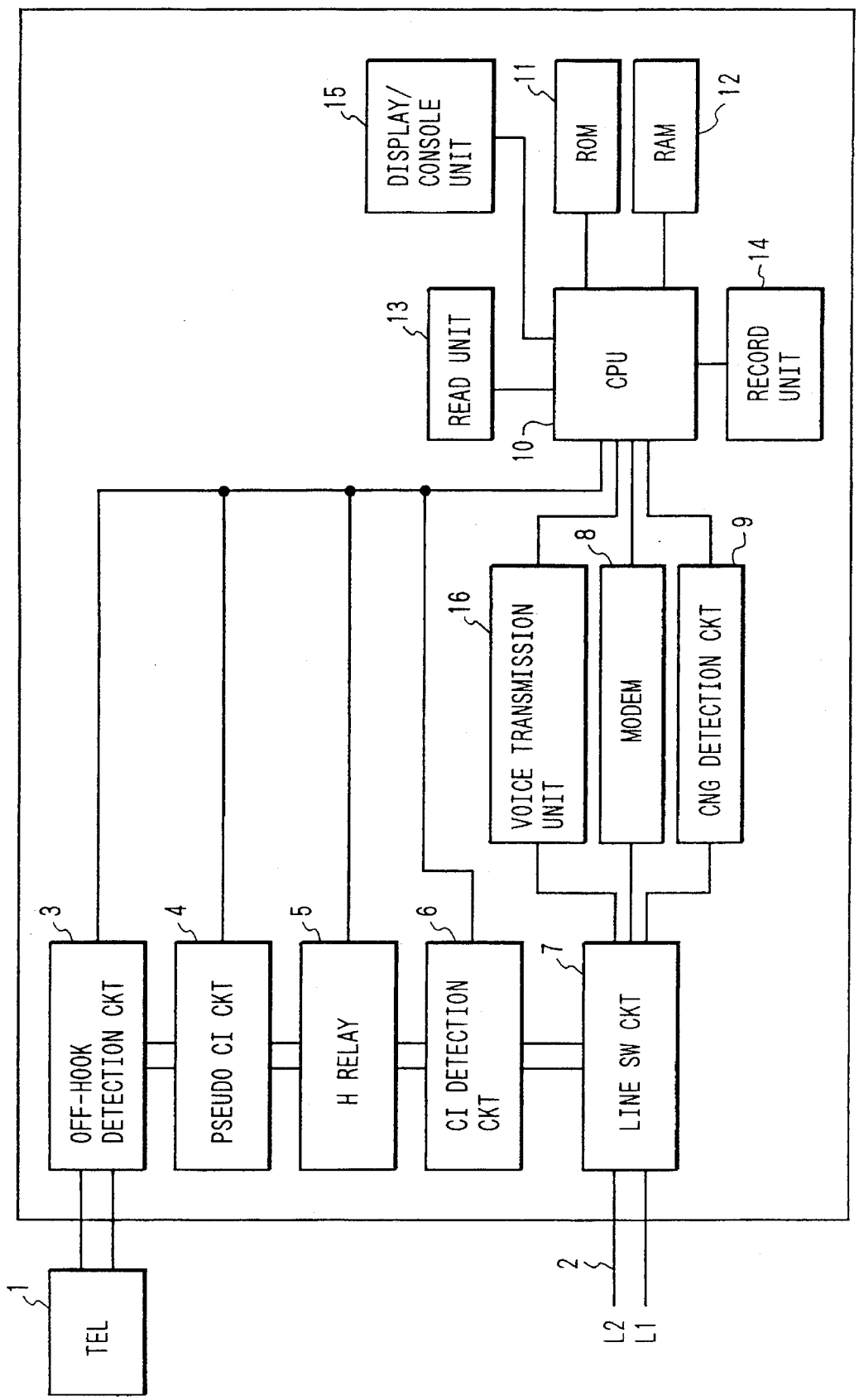
FIG. 1 is a block diagram showing the construction of a facsimile apparatus according to a first embodiment of the present invention.

FIG. 1 is a block diagram wherein: the reference numeral 1 designates a telephone externally attached to an apparatus; the reference numeral 2 designates a telephone line; the reference numeral 3 designates an off-hook detection circuit to detect the off-hook state of the telephone; the reference numeral 4 designates a pseudo CI circuit to ring a pseudo call sound by transmitting a pseudo CI (call signal) to the telephone; the reference numeral 5 designates an H relay to connect the telephone to the line and disconnect therefrom; the reference numeral 6 designates a CI detection circuit to detect CI coming from the telephone line; the reference numeral 7 designates a line switch circuit to switch a line connection between the telephone side and the apparatus side; the reference numeral 8 designates a modem; the reference numeral 9 designates a CNG (calling tone) detection circuit; the reference numeral 10 designates a CPU (central processing unit); the reference numeral 11 designates a RAM; the reference numeral 12 designates a ROM; the reference numeral 13 designates a read unit; the reference numeral 14 designates a record unit; the reference numeral 15 designates a display/console unit; and the reference numeral 16 designates a voice transmission unit.

Figure 2:
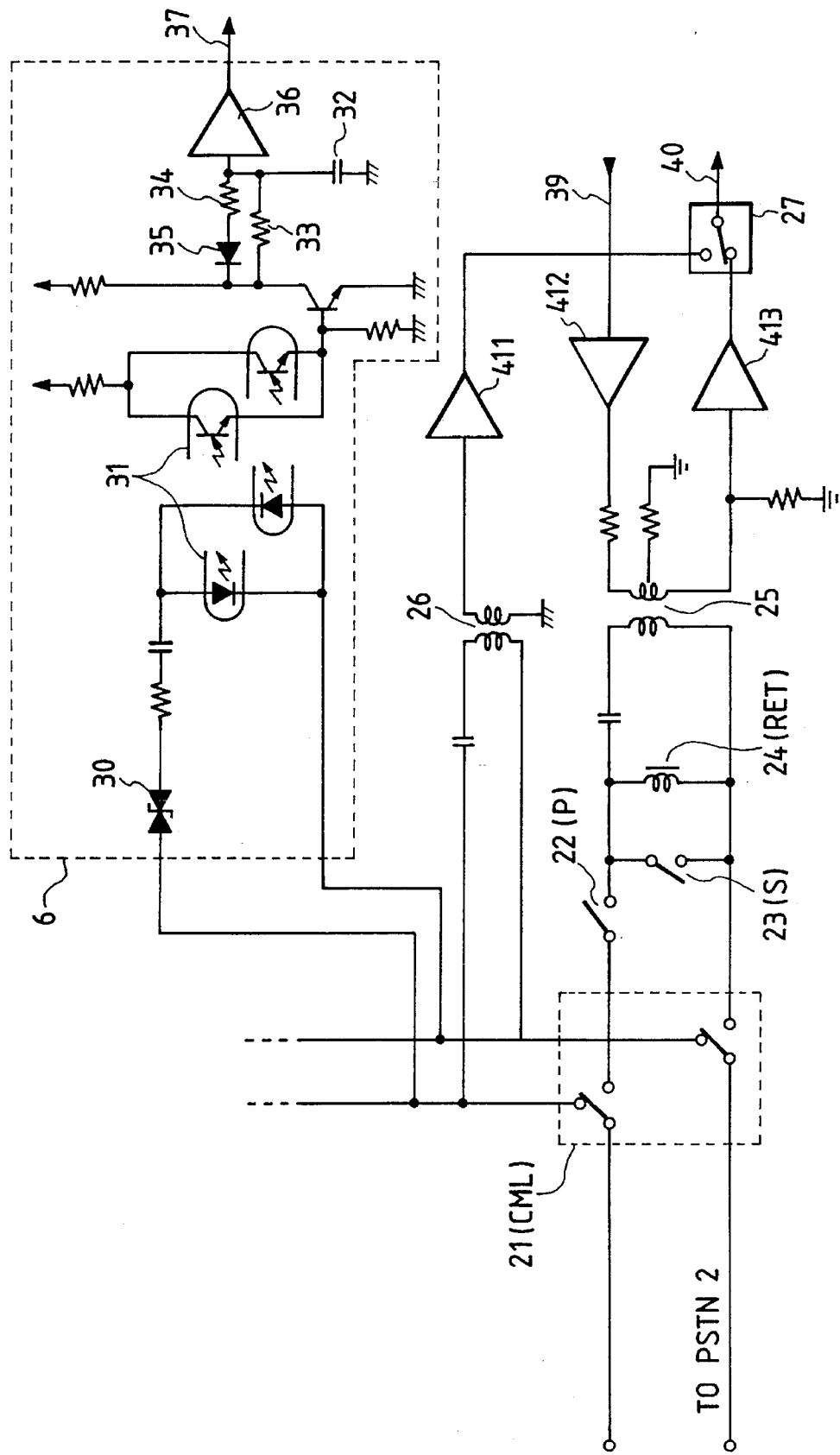
FIG. 2 is a circuit diagram showing a CI detection circuit and a line switch circuit of the first embodiment.

The CI detection circuit 6 and the line switch circuit 7 will now be described in detail with reference to a block diagram in FIG. 2. The reference numeral 21 designates a CML relay to switch the connection of a PSTN (public service telephone network service) line between the telephone side and a facsimile. The reference numeral 22 denotes a P relay to generate a dial pulse. The reference numeral 23 indicates an S relay to eliminate an influence of an RET (return) coil 24 and others when the P relay 22 is operated. The reference numeral 24 designates the RET coil to form a direct current loop. The reference numeral 25 designates a hybrid transformer which isolates the line from a secondary side and transmits an audio signal.

The reference numeral 26 designates an audio transformer. The reference numeral 27 denotes a switch for switching the path of a reception signal between a path from the hybrid transformer 25 (line side) and a path from the audio transformer 26 (monitor side).

Figure 3:
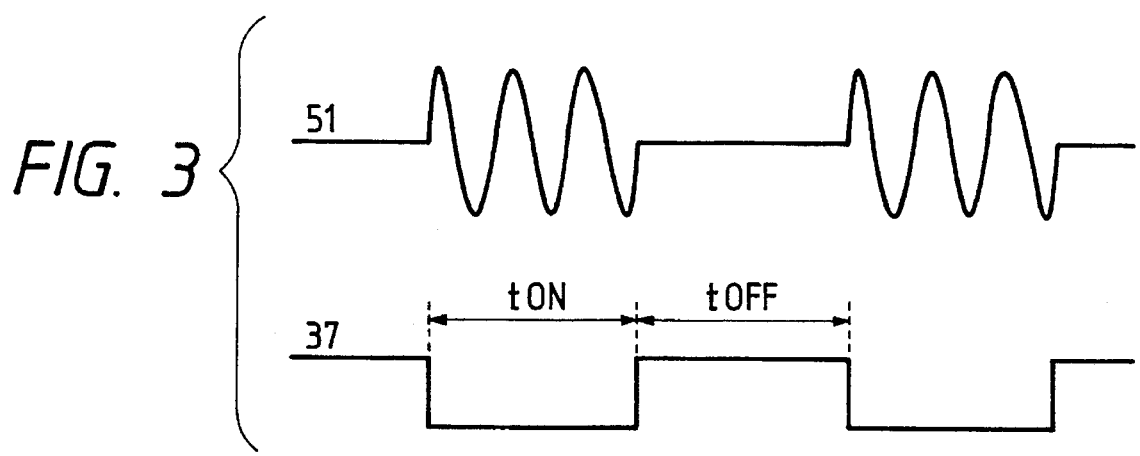
FIG. 3 is a waveform diagram showing an waveform of a CI signal and an output waveform of the CI detection circuit.

The CI detection circuit 6 will now be described. The reference numeral 30 designates a bidirectional Zener diode. An operating voltage of the Zener diode is about 27 V in the present embodiment. The reference numeral 31 indicates a photocoupler to isolate the line from the secondary side. The reference numeral 32 indicates a capacitor to charge and discharge for smoothing an output from the photocouplers. A capacitance of the capacitor is 1 µF in the present embodiment. The reference numerals 33, 34 are resistances to determine a time constant; the resistance 33 is 100 kΩ, and the resistance 34 is 20 kΩ in the present embodiment. The reference numeral 35 denotes a diode required for differentiating a time constant at charging time from that at discharging time. The reference numeral 36 indicates a comparator; a threshold thereof is 2.5 V in the present embodiment. The reference numeral 37 designates an output from the CI detection circuit. As seen from FIG. 3, the waveform of an incoming CI and the output 37 are such that the CI signal is ON with the output 37 being low, and the CI signal is OFF with the output 37 being high. In the figure, the reference numeral 51 indicates a waveform between lines. The CPU 10 in FIG. 1 detects an ON time and an OFF time of the output 37, thereby discriminatively detecting a CI pattern.

The reference numeral 39 designates a transmission signal from the modem 8 and the voice transmission unit 16 in FIG. 1. The reference numeral 40 denotes a reception signal to the modem 8 and the CNG detection circuit 9. The reference numerals 411, 412, and 413 indicate amplifiers.

Figure 4A:
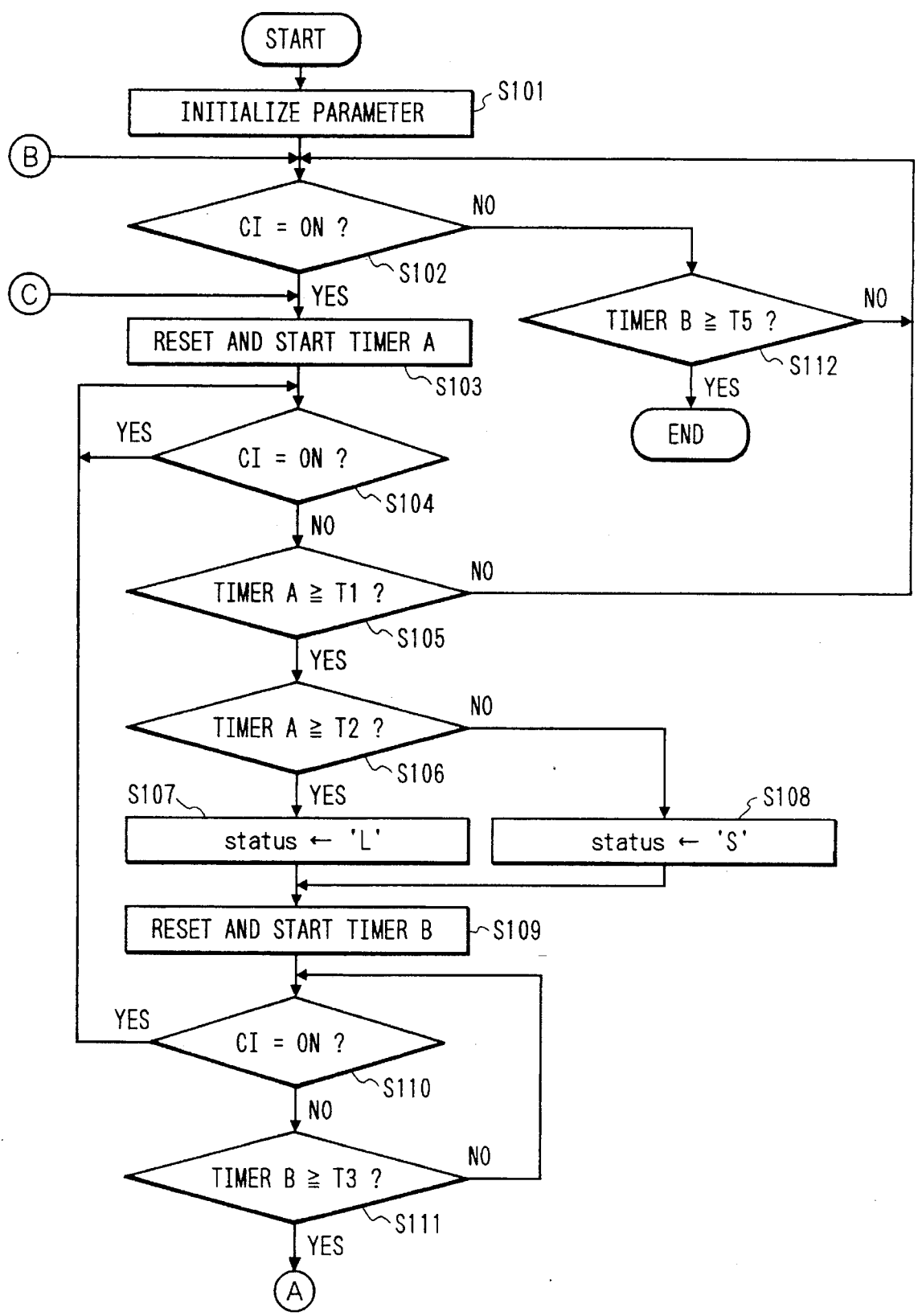
FIGS. 4A and 4B are flow charts of a CI detection process of the first embodiment.
Figure 4B:
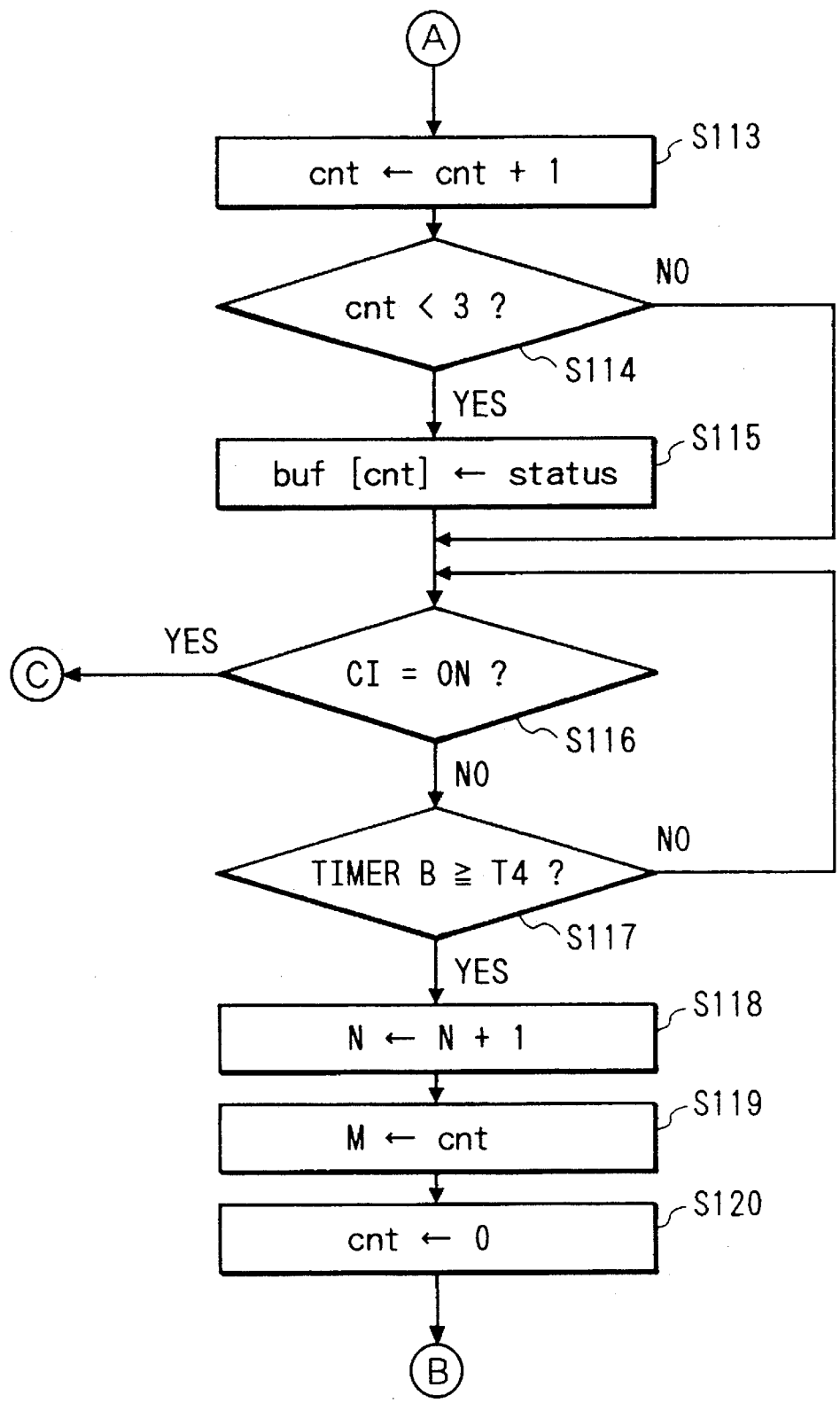

FIGS. 4A and 4B are flow charts showing a signal (FIGS. 5A to 5D) discrimination process executed by the CPU 10.

In the figures, CI represents a level of a CI signal obtained by the CI detection circuit 6.

Also, status is a one-byte sized buffer to temporarily save whether an ON of a detected CI is short 'S' or long 'L'; cnt is a counter to indicate which ON in one call sound is the ON of the detected CI; M is a buffer to save the contents of cnt; buf is a 4-byte sized buffer to save which ON in one call sound is short 'S' or long 'L'; N is a counter indicating a calling count; timer A is a timer to measure an ON time of CI; timer B is a timer to measure an OFF time of CI; T1 is a minimum ON time to determine whether a detected CI is noise or not; T2 is an intermediate ON time to determine whether an ON regarded as valid is a short ON or a long ON; T3 is a minimum OFF time to detect whether an OFF state detected while CI is in an ON state is a short interruption (noise) or not; T4 is an intermediate OFF time to determine whether an OFF considered valid is a short OFF or a long OFF; and T5 is a maximum OFF time to determine whether calling is completed.

In the present embodiment, T1 to T5 are placed on the backed-up RAM so that a serviceman can change them. To be able to recognize all patterns in FIG. 3, default values of T1 to T5 are set as follows: T1=0.2 sec, T2=0.6 sec, T3=0.1 sec, T4=1.2 sec, T5=6.0 sec.

The CPU 10 first initializes parameters contained in the RAM 12 at step S101 in FIG. 4A. In the initialization, status, cnt, buf, N and M are cleared, and timer A and timer B are reset. At step S102, the CPU 10 proceeds to step S103 if CI is ON and to step S112 if CI is OFF.

If CI is ON at step S102, the CPU 10 resets and starts timer A at step S103 and waits at step S104 until CI goes OFF. When CI goes OFF, the CPU 10 proceeds to step S105. The CPU 10 returns to step S102 if timer A has not reached T1, and proceeds to step S106 if timer A has reached T1.

If timer A has reached T2 at step S106, the CPU 10 sets the character 'L' indicating a long ON in status. If timer A has not reached T2 at step S106, the CPU 10 sets the character 'S' indicating a short ON in status at step S108. Then, the CPU 10 resets and starts timer B at step S109 and proceeds to step S110.

Steps S110 to S111 form a loop for the CPU 10 to wait until the time of an OFF state of CI reaches T3.

If CI is ON at step S110, it indicates that the OFF time is shorter than T3; hence, the CPU 10 considers the OFF invalid and returns to step S104. If timer B has reached T3 at step S111, the CPU 10 proceeds to step S113 in FIG. 4B. Here, one ON of CI has become definite. The CPU 10 increments cnt at step S113 and proceeds to step S114. If the number of ONs in one call sound contained in cnt is less than 3 at step S114, the CPU 10 stores the ON status (long or short) of CI saved at step S107 or S108 into the CI status buffer buf at step S115; if it is no less than 3, the CPU 10 proceeds to step S116 in FIG. 4B.

Steps S116 to S117 form a loop for the CPU 10 to wait until the time of an OFF state of CI reaches T4.

If CI is ON at step S116, it indicates that the OFF time is shorter than T4; hence, the CPU 10 considers that one call sound is under way and returns to step S103. If timer B has reached T4 at step S117, the CPU 10 considers that one call sound is not completed yet and proceeds to step S118. The CPU 10 increments at step S118 the counter N which counts the number of call sounds, saves at step S119 the contents of cnt which counts the number of ONs of CI in one call sound into buffer M, resets cnt at step S120, and then returns to step S102.

According to the above-mentioned processes, for example, when a call is made by a short-short-long ring pattern, 1.2 second (T4) after a first call sound, 1 is set in N, 3 is set in M, and 'S', 'S', and 'L' are set in the CI status buffer buf.

Figure 6:
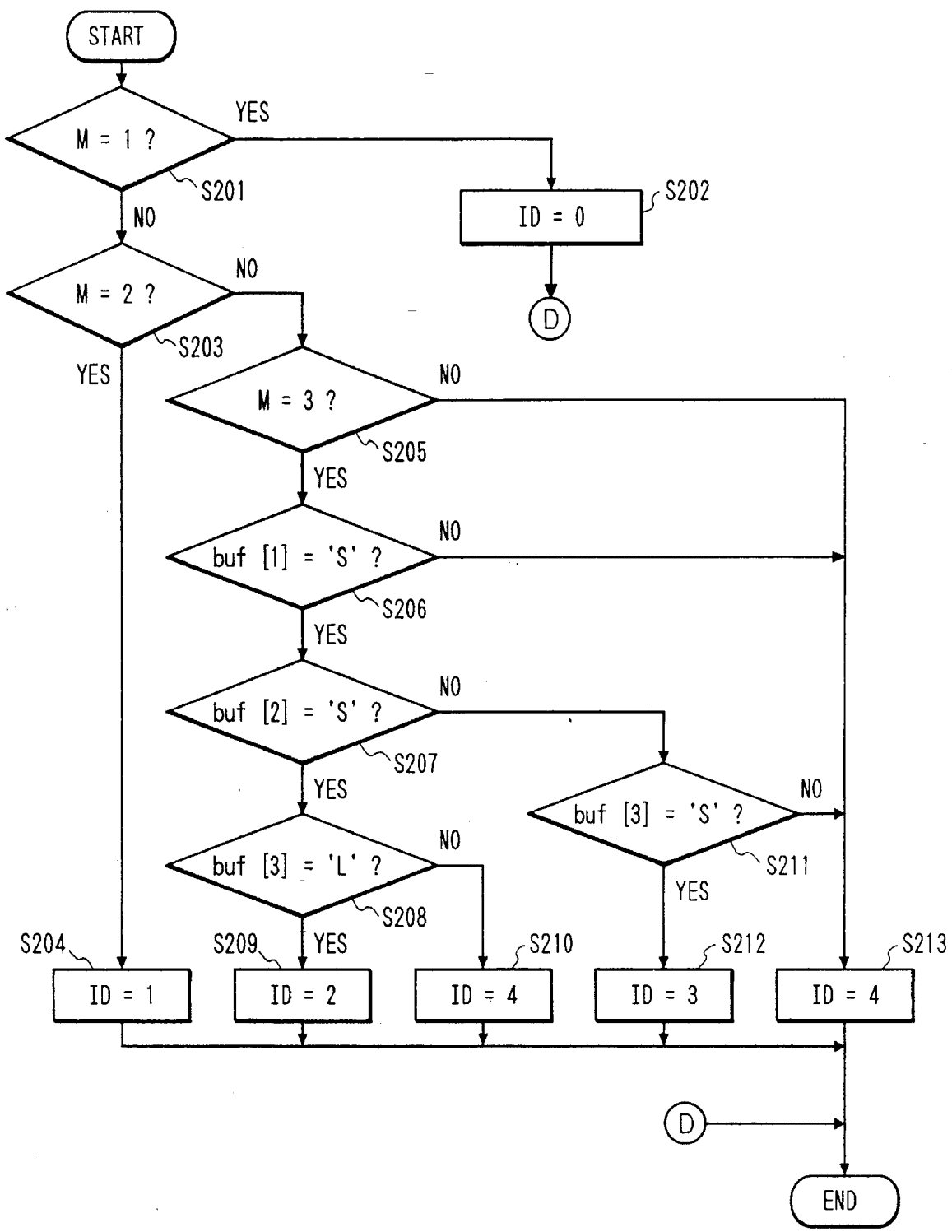
FIG. 6 is a flow chart to obtain a ring pattern ID of the first embodiment.

FIG. 6 is a flow chart showing a process which the CPU 10 obtains ID corresponding to a ring pattern from M and the CI status buffer.

If M is 1 at step S201, the CPU 10 proceeds to step S202 and sets 0 (normal ring) for ID, and then ends the process. If M is not 1 at step S201, the CPU 10 proceeds to step S203. If M is 2 at step S203, the CPU 10 sets 1 (double ring) for ID, and then ends the process. If M is not 2 at step S203, the CPU 10 proceeds to step S205. If M is 3 at step S205, the CPU 10 proceeds to step S206; if M is not 3, the CPU 10 sets 4 (other rings) for ID at step S213, and then ends the process.

If a first data of the CI status buffer buf is 'S' at step S206, the CPU 10 proceeds to step S207; if the first data is not 'S', the CPU 10 sets 4 (other rings) for ID at step S213, and then ends the process. If a second data of the CI status buffer buf is 'S' at step S207, the CPU 10 proceeds to step S208; if the second data is not 'S', the CPU 10 proceeds to S211. If a third data of the CI status buffer buf is 'L' at step S208, the CPU 10 sets 2 (triple ring of short-short-long) for ID at step S209, and then ends the process. If the third data of the CI status buffer buf is not 'L' at step S208, the CPU 10 sets 4 (other rings) for ID at step S210, and then ends the process. If the third data of the CI status buffer buf is 'S' at step S211, the CPU 10 sets 3 (triple ring of short-long-short) for ID at step S212, and then ends the process. If the third data of the CI status buffer buf is not 'S' at step S211, the CPU 10 sets 4 (other rings) for ID at step S213, and then ends the process.

Another embodiment of the CI detection process in FIGS. 4A and 4B will now be described.

Figure 7:
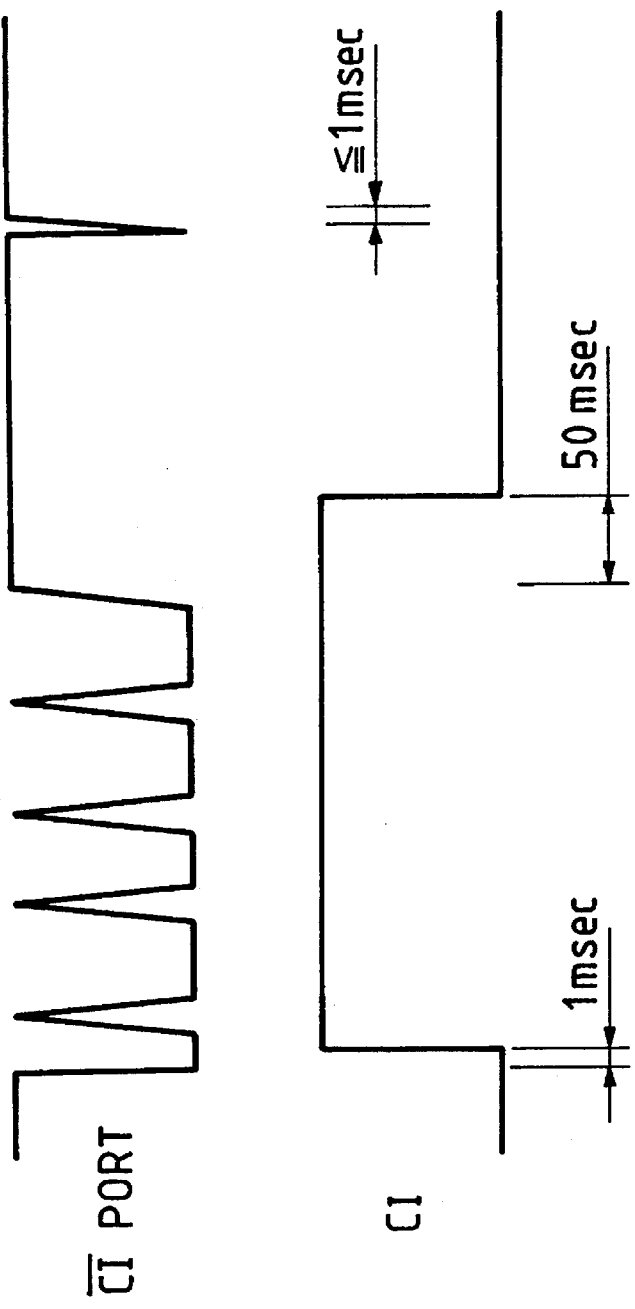
FIGS. 7A and 7B are diagrams showing the correspondence between an output waveform of the CI detection circuit and the status of CI for a modified example of the CI detection process.

FIG. 7A is an example of an output waveform from the CI detection circuit 6 to the CPU 10 when a call signal comes in from a telephone line 2. Since an absolute value of a voltage of CI is input, an output voltage is 0 at a zero-cross position. This causes an unstable operation; hence, in the present embodiment, a CI signal input to the CPU 10 is corrected by a method shown in FIG. 8.

Figure 8:
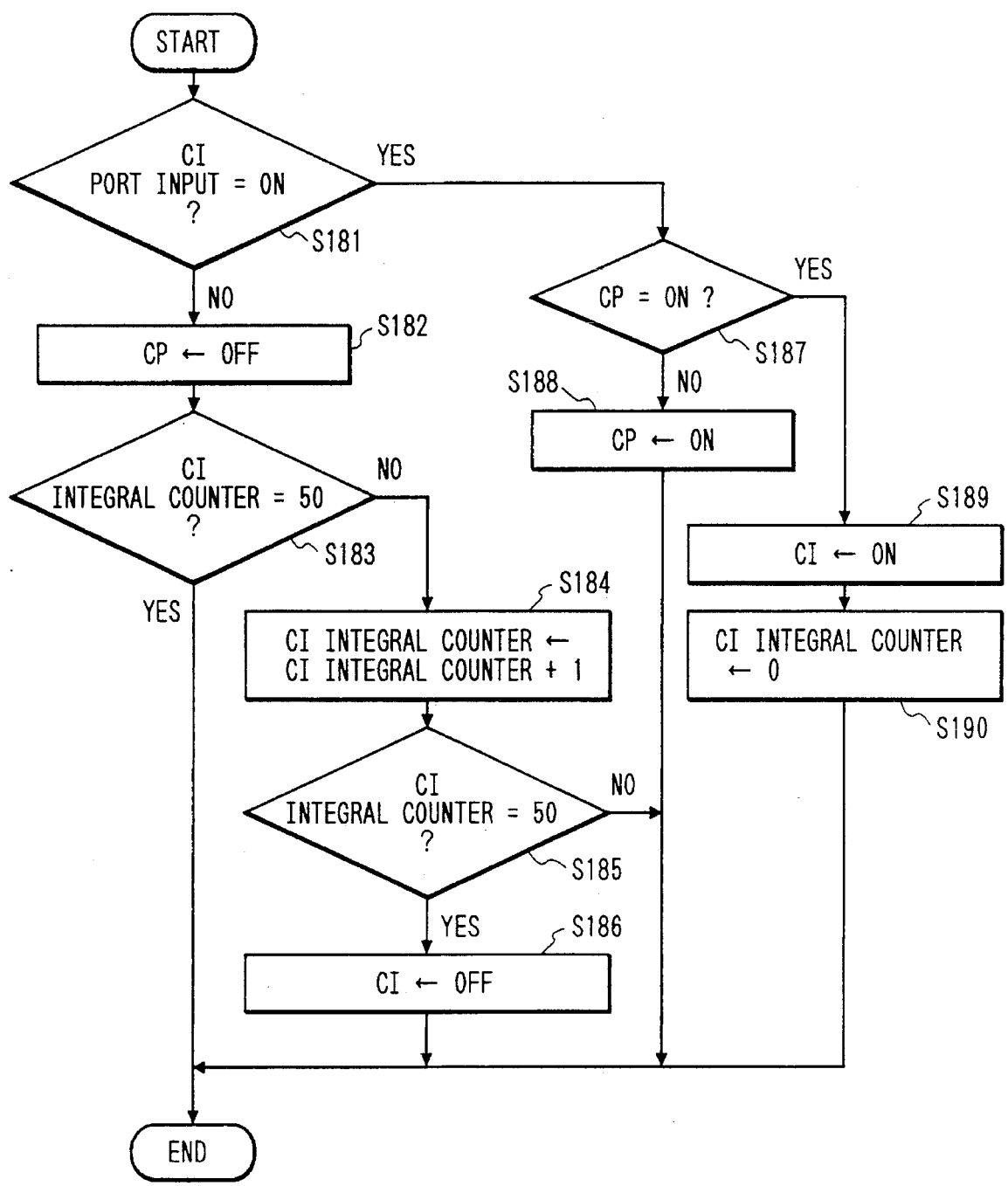
FIG. 8 is a flow chart to obtain the status of CI for a modified example of the CI detection process.

FIG. 8 is a flow chart showing a correction process of the CI signal input at the CPU 10. This process routine is executed every millisecond by a cyclic interruption which occurs every millisecond. The CPU 10 checks an input value from the CI detection circuit 6 at step S181; if the input is OFF, the CPU 10 proceeds to step S182 and sets OFF for flag CP. Then, if a CI integral counter 50 is 50 at step S183, the CPU 10 ends the process; if it is not 50, the CPU 10 proceeds to step S184. The CPU 10 increments the CI integral counter at step S184. If the CI integral counter is 50 at step S185, the CPU 10 sets OFF for the flag CI at step S186. If the CI integral counter is not 50 at step S185, the CPU 10 ends the process.

If the input is ON at step S181, the CPU 10 proceeds to step S187. If CP is OFF at step S187, the CPU 10 proceeds to step S188 and sets ON for CP, and then ends the process. If CP is ON at step S187, the CPU 10 proceeds to step S189 and sets ON for CI, clears the CI integral counter at step S190, and then ends the process.

As a result of the process, the status of a call signal as shown in FIG. 7B is set at the flag CI.

Figure 9:
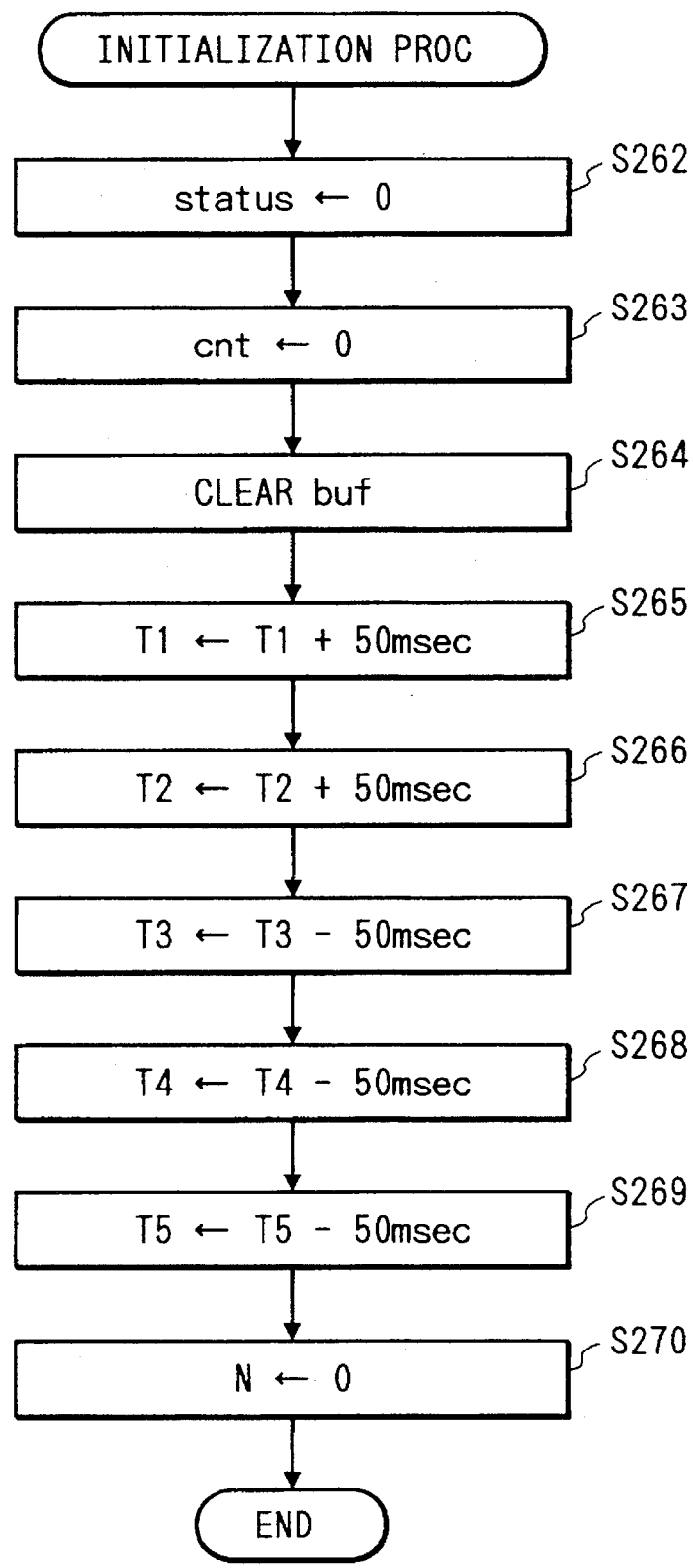
FIG. 9 is a flow chart of an initialization process for a modified example of the CI detection process.

FIG. 9 is a flow chart showing an initialization process of the present embodiment. At step S262, the CPU 10 clears the one-byte sized buffer status where whether an ON of a detected CI is short or long is temporarily saved; at step S263, the CPU 10 clears the counter cnt which indicates which ON in one call sound is the ON of the detected CI; and at step S264, the CPU 10 clears the 4-byte sized CI status buffer buf where which ON in one call sound is short or long is saved.

Next, at step S265, the CPU 10 adds 50 msec to the T1 time; at step S266, the CPU 10 adds 50 msec to the T2 time; at step S267, the CPU 10 subtracts 50 msec from the T3 time; at step S268, the CPU 10 subtracts 50 msec from the T4 time; and at step S269, the CPU 10 subtracts 50 msec from the T5 time and then ends the process.

The reason for adding and subtracting 50 msec is as follows: a CI signal obtained by a CI detection process is a flag CI which has undergone the correction process for a CI signal input in FIG. 8, and as apparent from FIGS. 7A and 7B, the status of the CI signal is such that an ON time is 50 msec longer than an actual call sound; hence, the correction of time is needed during the detection process.

After completing the initialization process, the CPU 10 executes the process at and after step S102.

Figure 10:
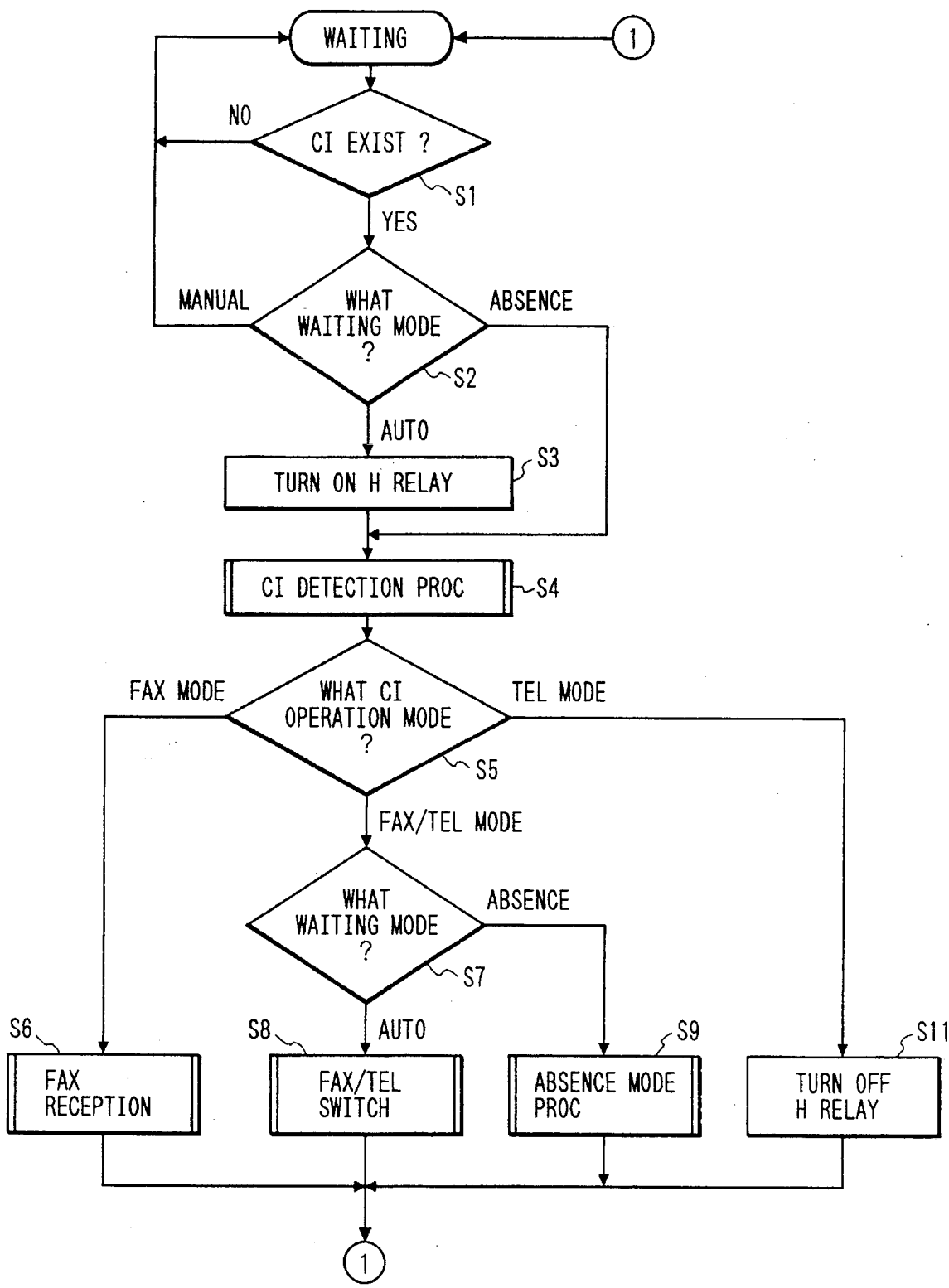
FIG. 10 is a flow chart of a termination process of the first embodiment.

FIG. 10 is a flow chart of a termination process when a call comes in to an apparatus of the present embodiment. On arrival of a CI signal from the line 2 (S1), if a waiting mode (S2) set at the console unit 15 is AUTO, the CPU 10 turns on the H relay (S3) to disconnect the telephone 1 from the line 2 for non-ringing termination, and determines the type of the incoming CI using the CI detection circuit 6 (S4). The details of the CI detection process are as shown in FIGS. 4A and 4B and FIGS. 5A to 5D.

The CPU 10 interprets operation mode information corresponding to the CI which was previously set from the console unit 15 (S5). If the operation mode information is a FAX mode, the CPU 10 switches the line switch circuit 7 to connect the modem 10 and the line 2, thereby performing a facsimile reception operation (S6). When the operation mode information is a FAX/TEL mode, if the waiting mode (S7) is AUTO, the CPU 10 performs a FAX/TEL switch operation (S8); if the waiting mode is ABSENCE, the CPU 10 executes an absence mode process (S9). If the operation mode information is a TEL mode, the CPU 10 turns off the H relay (S11) to connect the telephone 1 and the line 2, thereby canceling the non-ringing termination and ringing a ringer of the telephone 1 by CI from an exchange for making a telephone call.

In other words, when the waiting mode of a facsimile apparatus is AUTO, if the operation mode information corresponding to CI detected by the CI detection circuit 6 is the FAX/TEL mode (combined facsimile and speech communication mode), the CPU 10 connects the CNG detection circuit 9 to the line and performs a FAX/TEL switch operation on CNG detection (S8). When the waiting mode is ABSENCE (connected to an automatic answering telephone), if the operation mode information corresponding to CI detected by the CI detection circuit 6 is the FAX/TEL mode (combined facsimile and speech communication mode), the CPU 10 turns off the H relay and performs a FAX/TEL switch operation (absence mode process) on CNG detection and on silence detection after detecting an off-hook of the telephone 1 by the off-hook detection circuit 2 (S9).

If the operation mode information corresponding to CI detected by the CI detection circuit 6 is the TEL mode, the CPU 10 transmits an outgoing message (OGM) and records an incoming message (ICM) by the automatic answering telephone 1, but does not perform a FAX/TEL switch operation (absence mode process) on CNG detection and on silence detection.

The FAX/TEL switch operation at S8 will be described later using FIG. 13.

In a facsimile apparatus with a built-in automatic answering machine, by preparing an automatic answer only mode corresponding to a CI pattern to prevent a signal detection process such as CNG detection and silence detection, it can be prevented that a facsimile reception operation is activated in error when the automatic answering machine is started.

A second embodiment of the present invention will now be described.

FIG. 1 is used in common to show the construction of an apparatus of the present embodiment.

Figure 11A:
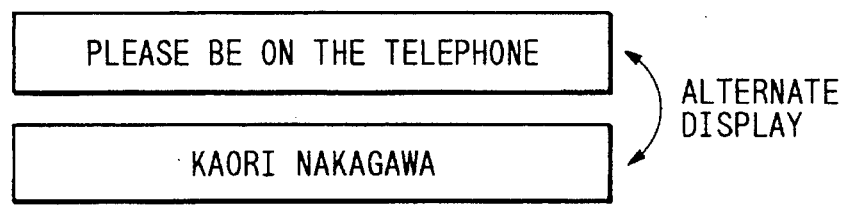
FIGS. 11A to 11C are views showing a display unit of a second embodiment.
Figure 11B:
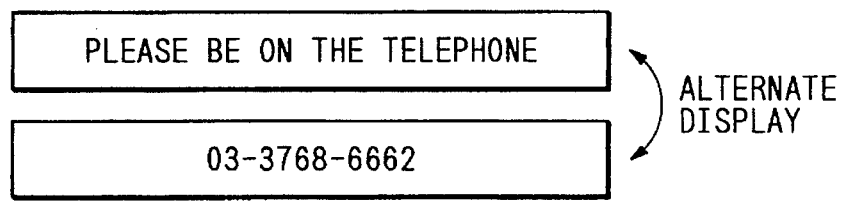
Figure 11C:
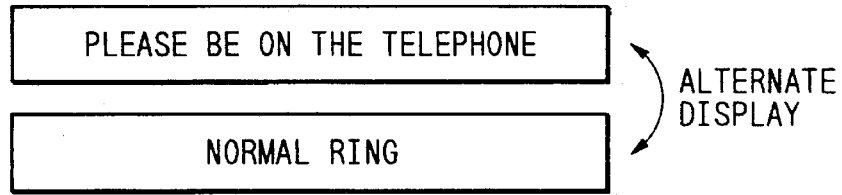

FIGS. 11A, 11B, and 11C are examples of call display in the present embodiment. FIG. 11A shows a message prompting a user to answer a call and a user's abbreviation which are alternately displayed when the user's abbreviation is registered. FIG. 11B shows a message prompting a user to answer a call and a user's telephone number which are alternately displayed when the user's abbreviation is not registered, but when the user's telephone number is registered. FIG. 11C shows a message prompting a user to answer a call and CI name information which are alternately displayed when neither the user's abbreviation nor the user's telephone number is registered.

Figure 12:
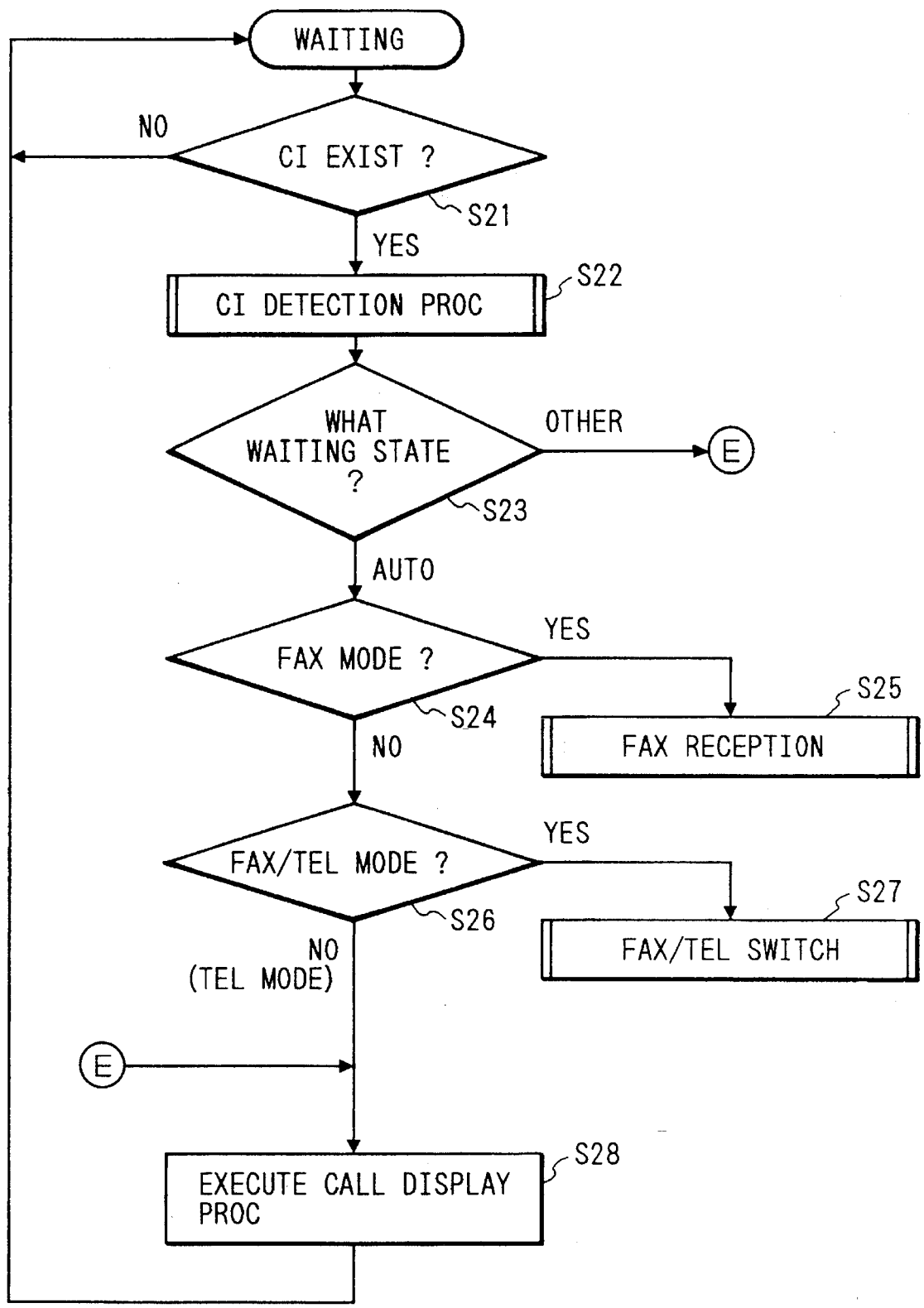
FIG. 12 is a flow chart of a termination process of the second embodiment.

FIG. 12 is a flow chart of processing when a call comes in to the apparatus of the present embodiment. When a CI signal comes in from the line 2 (S21), the CPU 10 determines the type of the incoming CI using the CI detection circuit 6 (S22). While CI is being detected, the H relay is turned on to disconnect the telephone 1 from the line 2. The details of the CI detection process are as shown in FIGS. 4A and 4B and FIG. 6. When the waiting mode (S23) of the apparatus is other than AUTO, the CPU 10 executes a call display process shown in FIGS. 11A to 11C according to the type of CI (S28).

As in the case of FIG. 10, when the waiting mode (S23) of the apparatus is AUTO and also when the operation mode of the detected CI is the FAX mode (facsimile only mode) (S24), the CPU 10 executes the facsimile reception operation (S25). When the operation mode is the FAX/TEL mode (combined facsimile and speech communication mode) (S26), the CPU 10 executes the FAX/TEL switch operation (S27). The details of the FAX/TEL switch operation will be described later. When the operation mode is the TEL mode (speech communication only mode), the CPU 10 executes the call display process (S28).

Figure 13:
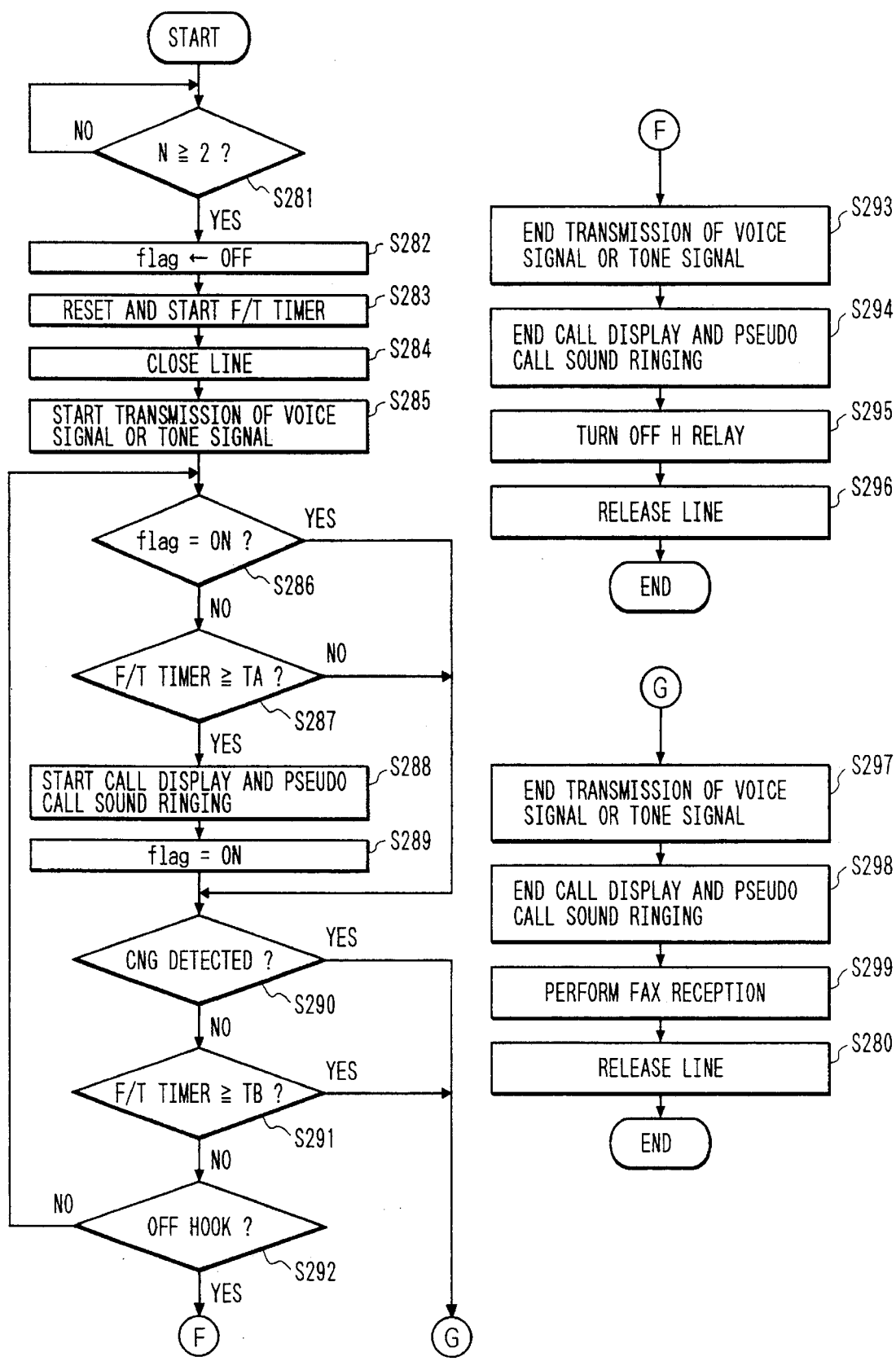
FIG. 13 is a flow chart of a FAX/TEL switch process of the first and second embodiments.

FIG. 13 is a flow chart showing the FAX/TEL switch operation.

In the figure, TA designates the time between the closing of the line and the starting of a call display and a pseudo CI or pseudo call sound ringing, and TB denotes the time between the closing of the line and the execution of a forced switch to the facsimile reception when neither CNG nor an off-hook is detected. In the present embodiment, TA is set to 8 seconds, and TB is set to 30 seconds.

First, at step S281, the CPU 10 waits until the counter N indicating a calling count being set by a CI detection process indicates 2 or more. When N indicates 2 or more, the CPU 10, at step S282, turns OFF the flag which indicates whether a pseudo CI or pseudo call sound is ringing, and at step S283, resets and starts the F/T timer which measures a time elapsed after the line is closed for making a FAX/TEL switch. Then, the CPU 10, at step S284, makes a switch on the line switch circuit 7 to connect the line 2 and the modem 8 and to close the line, and at step S285, starts the transmission of a voice signal or a tone signal through the voice transmission unit 16 or the modem 8.

Next, if the flag is ON at step S286, the CPU 10 proceeds to step S290; if the flag is OFF, the CPU 10 proceeds to step S287. At step S287, if the F/T timer has reached TA, the CPU 10 proceeds to step S288 and starts the call display process and the pseudo CI (pseudo CI circuit 4) or pseudo call sound (display unit 15) ringing process; at step S289, the CPU 10 turns ON the flag. At step S288, the CPU 10 performs a call display shown in FIGS. 11A to 11C according to the type of CI. At step S287, if the F/T timer has not reached TA, the CPU 10 proceeds to step S290.

If the CNG detection circuit 9 has detected CNG at step S290 or if the F/T timer has reached TB (TB>TA) at step S291, the CPU 10 considers a partner to be facsimile and proceeds to step S297; if not, the CPU 10 proceeds to step S292. At step S292, if the off-hook detection circuit 3 has detected an off-hook, the CPU 10 considers that a speech communication over the telephone has started, and proceeds to step S293. At step S292, if the off-hook detection circuit 3 has not detected an off-hook, the CPU 10 returns to step S286.

Step S293 and subsequent steps form a process to be executed when the CPU 10 considers that a speech communication over the telephone has started. First, the CPU 10 ends the transmission of a voice signal or a tone signal (step S293); the CPU 10 ends the call display process and the pseudo CI or pseudo call sound ringing process (step S294); the CPU 10 turns OFF the H relay 5 to connect the telephone 1 to the line 2 side (step S295); and finally the CPU 10 opens the connection of the line 2 and the modem 8 established by the line switch circuit 7 (step S296) and ends the process.

Step S297 and subsequent steps form a process to be executed when the CPU 10 considers a partner to be facsimile. First, the CPU 10 ends the transmission of the voice signal or the tone signal (step S217); the CPU 10 ends the call display process and the pseudo CI or pseudo call sound ringing process (step S298); the CPU 10 performs facsimile reception (step S299); and finally the CPU 10 releases the line (step S280) and ends the process.

The FAX/TEL switch process at step S8 in FIG. 10 is as shown in FIG. 13.

The first and second embodiments will now be described further specifically.

Figure 5A:
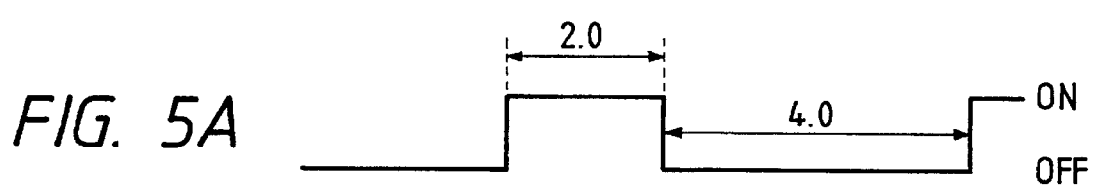
FIGS. 5A to 5D are waveform diagrams of a CI signal during distinctive ringing pattern service.
Figure 5B:
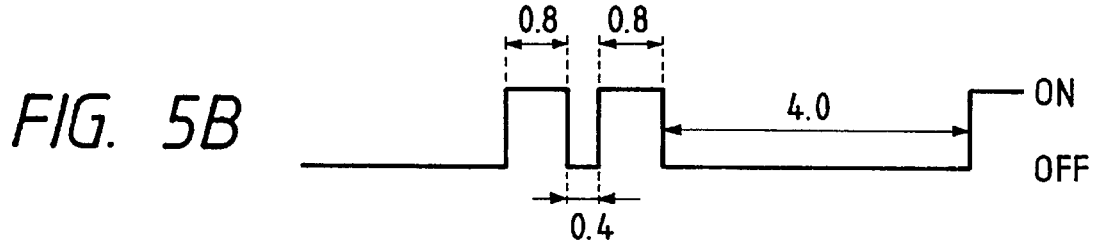
Figure 5C:
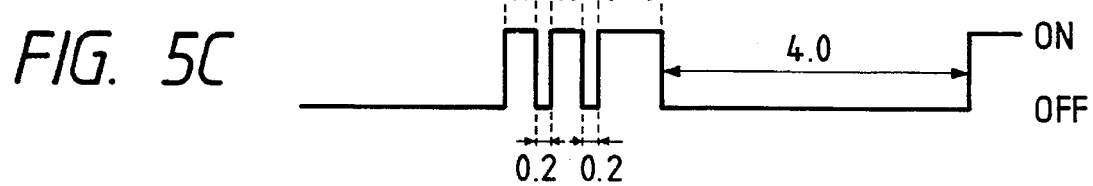
Figure 5D:
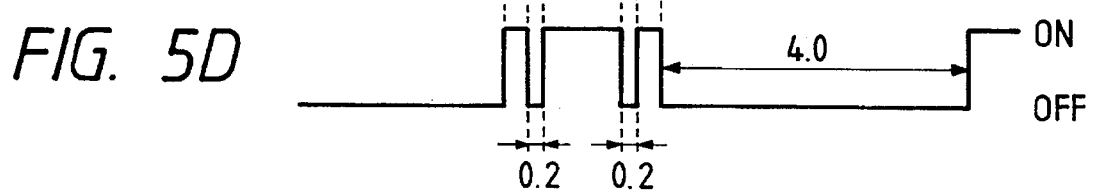

An exchange transmits CI in a normal ring pattern shown in FIG. 5A when 03-3768-6661 is dialed, CI in a double ring pattern shown in FIG. 5B when 03-3768-6662 is dialed, CI in a short-short-long pattern shown in FIG. 5C when 03-3768-6663 is dialed, and CI in a short-long-short pattern shown in FIG. 5D when 03-3768-6664 is dialed.

Corresponding to the CI patterns in FIGS. 5A, 5B, 5C, and 5D, user's telephone numbers 03-3768-6661, 03-3768-6662, 03-3768-6663, and 03-3768-6664, user's abbreviations OANON, NAKAGAWA, TACHIBANA, and SATO, and operation modes FAX, TEL, TEL, and TEL are previously registered in the RAM 12.

Also, for correspondence to a CI pattern other than those in FIGS. 5A to 5D, a user's telephone number 03-3768-6665, a user's abbreviation KOHRI, and an operation mode FAX/TEL are previously registered in the RAM 12.

When a selection signal is transmitted from a partner to the telephone number 03-3768-6661, the exchange transmits a CI signal in a corresponding CI pattern in FIG. 5A to a facsimile apparatus. The facsimile apparatus identifies the type of CI by the CI detection circuit 6 which can detect a plurality of CI signals. Since the FAX mode (facsimile only mode) is registered as an operation mode corresponding to the CI pattern, the CPU 10 performs a facsimile reception and transmits a corresponding user's abbreviation and user's telephone number to a facsimile apparatus on the partner's side.

When a selection signal is transmitted from a partner to the telephone number 03-3768-6662, the exchange transmits a CI signal in a corresponding CI pattern in FIG. 5B to a facsimile apparatus. The facsimile apparatus identifies the type of CI by the CI detection circuit 6 which can detect a plurality of CI signals. Since the TEL mode (speech communication only mode) is registered as an operation mode corresponding to the CI pattern, the CPU 10 performs the call display process to display a user's abbreviation, a user's telephone number, and a CI signal name on a display like LCD or the like on the display unit 15 without performing a facsimile reception and a signal detection process (CNG detection and silence detection) after detection of an off-hook.

When a selection signal is transmitted from a partner to the telephone number 03-3768-6665, the exchange transmits a CI signal in a corresponding CI pattern to a facsimile apparatus. The facsimile apparatus identifies the type of CI by the CI detection circuit 6 which can detect a plurality of CI signals. Since the FAX/TEL mode (combined facsimile and speech communication mode) is registered as an operation mode corresponding to the CI pattern, the CPU 10 performs an automatic FAX/TEL switch or an automatic answering machine connection process according to the waiting state (AUTO, ABSENCE or the like) of the apparatus.

A menu structure for user data and a user switch will now be described.

When the user switch [DRPD feature] is off, the menu structure is for use with a telephone line with which no contract is made for "distinctive ringing pattern service". In this case, by pressing a function key on the console unit 15 and a [2] key on a ten-key pad, it becomes possible to register user's telephone numbers and user's abbreviations one by one. Also, by pressing a function key on the console unit 15 and a [3] key on the ten-key pad, it becomes possible to set the automatic FAX/TEL switch and the DRPD feature.

When the user switch [DRPD feature] is on, the menu structure is for use with a telephone line with which a contract is made for "distinctive ringing pattern service". In this case, by pressing a function key on the console unit 15 and a [2] key on a ten-key pad, it becomes possible to register five user's telephone numbers and five user's abbreviations for each of CI patterns in FIGS. 5A to 5D and the other CI pattern. Also, by pressing a function key on the console unit 15 and a [3] key on the ten-key pad, it becomes possible to set the DRPD feature and to set an operation mode corresponding to each of CI patterns in FIGS. 5A to 5D and the other CI pattern.

It is possible to connect the apparatus of the aforesaid embodiments to an extension line of a private branch exchange in such a manner that a call from an extension telephone, which is low in the frequency of using FAX, is answered in the TEL mode, and that a call over an outside line is answered in the FAX or FAX/TEL mode.

A third embodiment of the present invention will now be described.

The present embodiment also receives the distinctive service, and hence two numbers "6661" and "6662" are assigned to one line. The number "6661" is assigned to usage primarily for receiving a facsimile, and the number "6662" is assigned to usage which rarely receives a facsimile. Incoming CI signal patterns corresponding to the two numbers "6661" and "6662" are shown in FIGS. 5A and 5B, respectively.

Figure 14A:
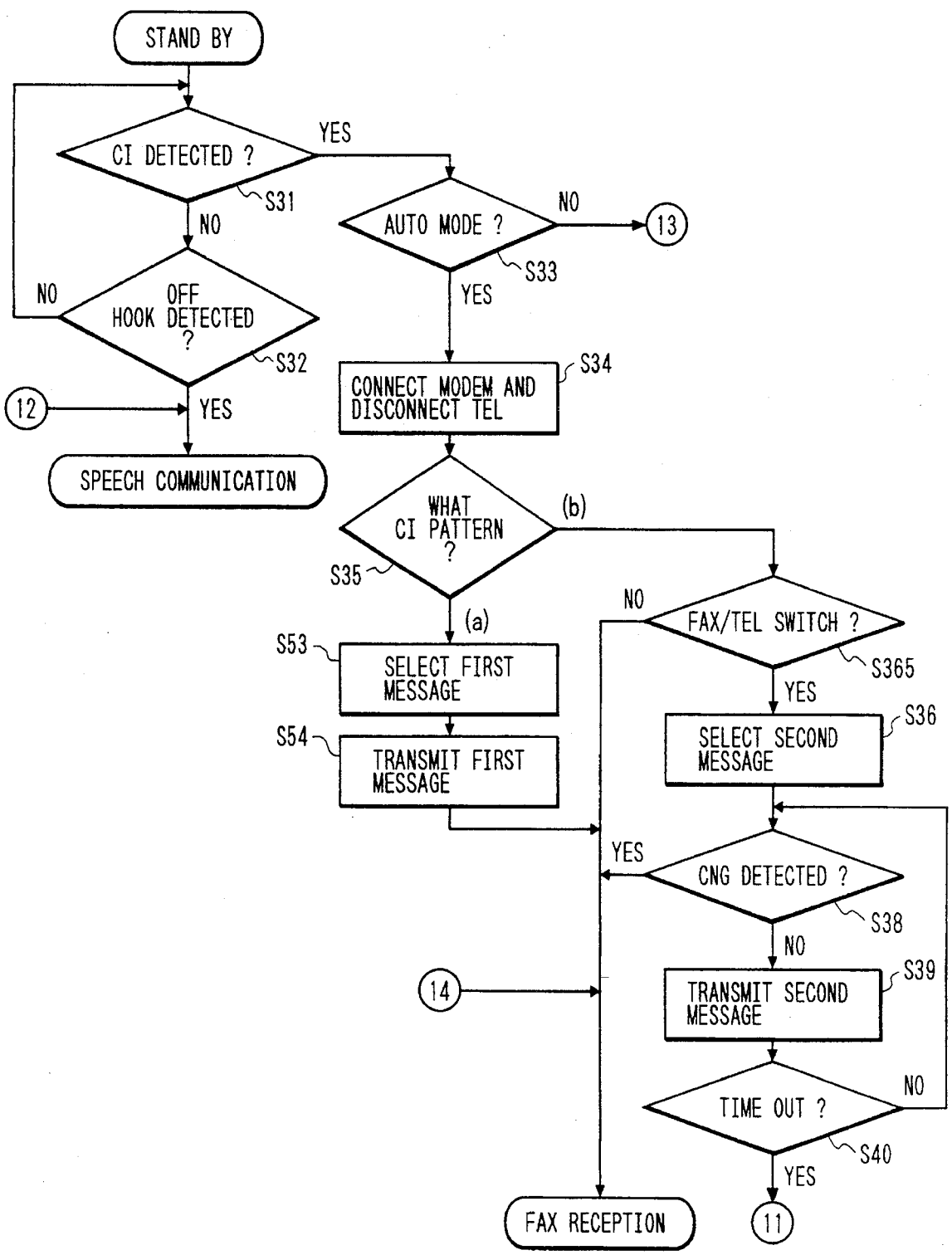
FIGS. 14A and 14B are flow charts of a termination process of a third embodiment.
Figure 14B:
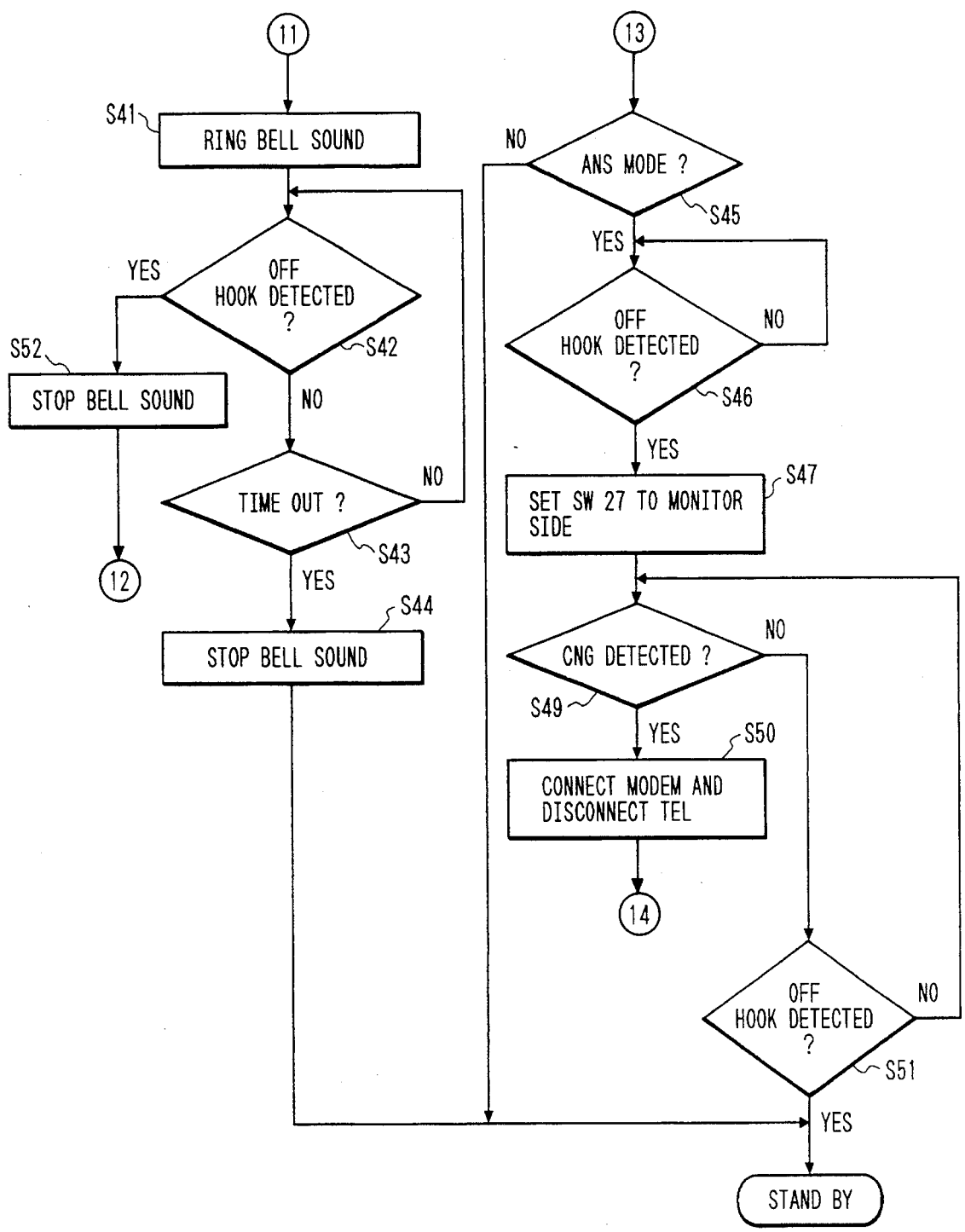

FIGS. 14A and 14B are flow charts of call reception in the present embodiment. The present embodiment uses the construction of the first embodiment in common. The flow in FIG. 14A begins with a standby state. In the standby state, the line switch circuit 7 is set to the telephone side, the H relay 5 is set to the line side, and the switch 27 is set to the amplifier 413 side. The CPU 10 is monitoring an output from the CI detection circuit 6 and an output from the off-hook detection circuit 3.

First, at step S31, the CPU 10 detects CI in the manner which was described using FIGS. 14A and 14B and FIG. 6. If the CPU 10 detects CI at step S31, it proceeds to step S33; if not, it proceeds to step S32. At step S32, the CPU 10 performs an off-hook detection. If an off-hook is detected at step S32, a speech communication state is established while the facsimile remains on standby. If an off-hook is not detected in step S32, the CPU 10 returns to step S31.

At step S33, if the CPU 10 recognizes that the AUTO mode is set from the console unit 15, it proceeds to step S34. At step S34, the CPU 10 switches the line switch circuit 7 to connect the line 2 and the modem 8, and switches the H relay 5 to disconnect the line 2 from the telephone 1. At step S35, if the CPU 10 detects the CI pattern in FIG. 5A, it proceeds to step S53 for forced facsimile reception and selects a first voice message "This is facsimile. Please start transmission." Then, at step S54, the CPU 10 transmits the first voice message from the voice transmission unit 16 and shifts to the facsimile reception process.

If the CI pattern in FIG. 5B is detected at step S35 and if the FAX/TEL switch mode is not previously Set from the console unit 15, the CPU 10 proceeds to the facsimile reception process. Meanwhile, to perform a FAX/TEL switch, the CPU 10 proceeds to step S36 and selects a second voice message "Please wait for a while."

At step S38, the CPU 10 performs a CNG detection. The modem 8 may be used to detect a CNG signal of 1100 Hz. If the CPU 10 detects CNG, it proceeds to the facsimile reception process. If the CPU 10 does not detect CNG, it proceeds to step S39 and transmits the second voice message from the voice transmission unit 16. Then, at step S40, the CPU 10 determines whether a time-out has occurred. In the present embodiment, a timer is set to 30 seconds for time-out. If a time-out is not detected at step S40, the CPU 10 returns to step S38; if a time-out is detected, it proceeds to step S41 in FIG. 14B.

The CPU 10 rings a telephone call bell at the display unit 15 at step S41, and performs an off-hook detection at step S42. If an off-hook is detected at step S42, it means that someone has answered the call on the telephone 1; hence, the CPU 10 stops a bell sound at step S52 and shifts to the speech communication state. At this time, the facsimile returns to the standby state.

Instead of ringing a bell at the display unit 15 at step S41, the CPU 10 may transmit a pseudo call signal from the pseudo CI circuit 4 to the telephone 1.

If an off-hook is not detected at step S42, the CPU 10 repeats steps S42 and S43 until a time-out occurs at step S43. In the present embodiment, a timer is set to 30 seconds for time-out. If a time-out is detected at step S42, the CPU 10 stops a bell sound at step S44 and returns to the standby state.

At step S33, if the AUTO mode is not detected, the CPU 10 proceeds to step S45. At step S45, if an ANS mode (automatic answer mode) is detected, the CPU 10 proceeds to step S46. The CPU 10 performs an off-hook detection at step S46 and waits until an automatic answering telephone connected as the telephone 1 starts. Even in this state, the facsimile is in the standby state; hence, a facsimile operation is not interrupted even when the automatic answering telephone fails to start.

If the automatic answering telephone 1 goes off-hook at step S46, the CPU 10 sets the switch 27 to the amplifier 411 side at step S47 and then performs the CNG detection at step S49. If CNG is detected, the CPU 10, at step S50, switches the line switch circuit 7 to connect the line 2 and the modem 8, and switches the H relay 5 to disconnect the line 2 from the telephone 1. Then, the CPU 10 proceeds to the facsimile reception process.

At step S49, if CNG is not detected, the CPU 10 proceeds to step S51 and performs the on-hook detection. The CNG detection at step S50 is continued until an on-hook is detected at step S51. If an on-hook is detected at step S51, the CPU 10 returns to the standby state.

If the ANS mode is not detected at step S45, the CPU 10 waits until somebody lifts a handset off a hook at the telephone 1 while the facsimile remains in the standby state.

Figure 15:
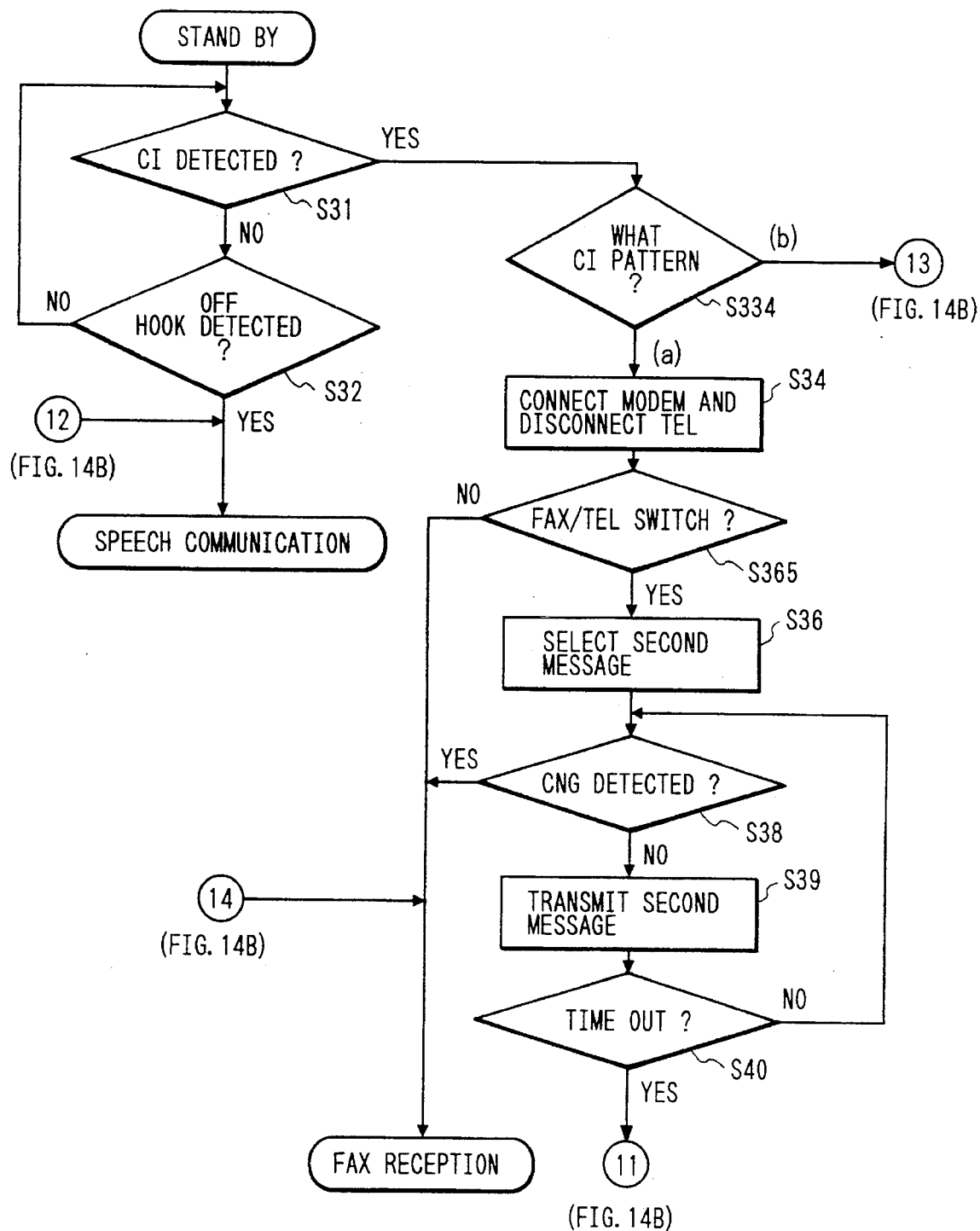
FIG. 15 is a modified example of the third embodiment.

In addition to the aforementioned embodiment, a branch process at step S33 may be executed according to a CI pattern. For example, as shown in FIG. 15, if the CI pattern in FIG. 5A is detected at step S334, the CPU 10 proceeds to step S34 and enters the AUTO mode. If the CI pattern in FIG. 5B is detected, the CPU 10 proceeds to step S45 in FIG. 14B. The reception mode may be thus switched.

At step S34, the CPU 10 switches the line switch circuit 7 to connect the line 2 and the modem 8, and switches the H relay 5 to disconnect the line 2 from the telephone 1. Then, the CPU 10 executes a process at step S365 and subsequent steps.

The process in FIG. 14B is used in common as a subsequent process to FIG. 15.

A fourth embodiment of the present invention will now be described.

The present embodiment uses the entire construction of the first embodiment in common. However, the first voice message transmitted from the voice transmission unit 16 is "This is Matsumoto speaking . . . ," and the second voice message is "This is Matsumoto Engineering. . . . "

Next, a facsimile reception process will be described with reference to flow charts in FIGS. 16A and 16B. A facsimile of the present embodiment is connected to one line which receives the distinctive ringing pattern service and to which two numbers "6663" and "6664" are assigned. This user uses "6663" as a number for private use and "6664" as a number for business use. Incoming CI signal patterns corresponding to the two numbers "6663" and "6664" are shown in FIGS. 5C and 5D, respectively.

Figure 16A:
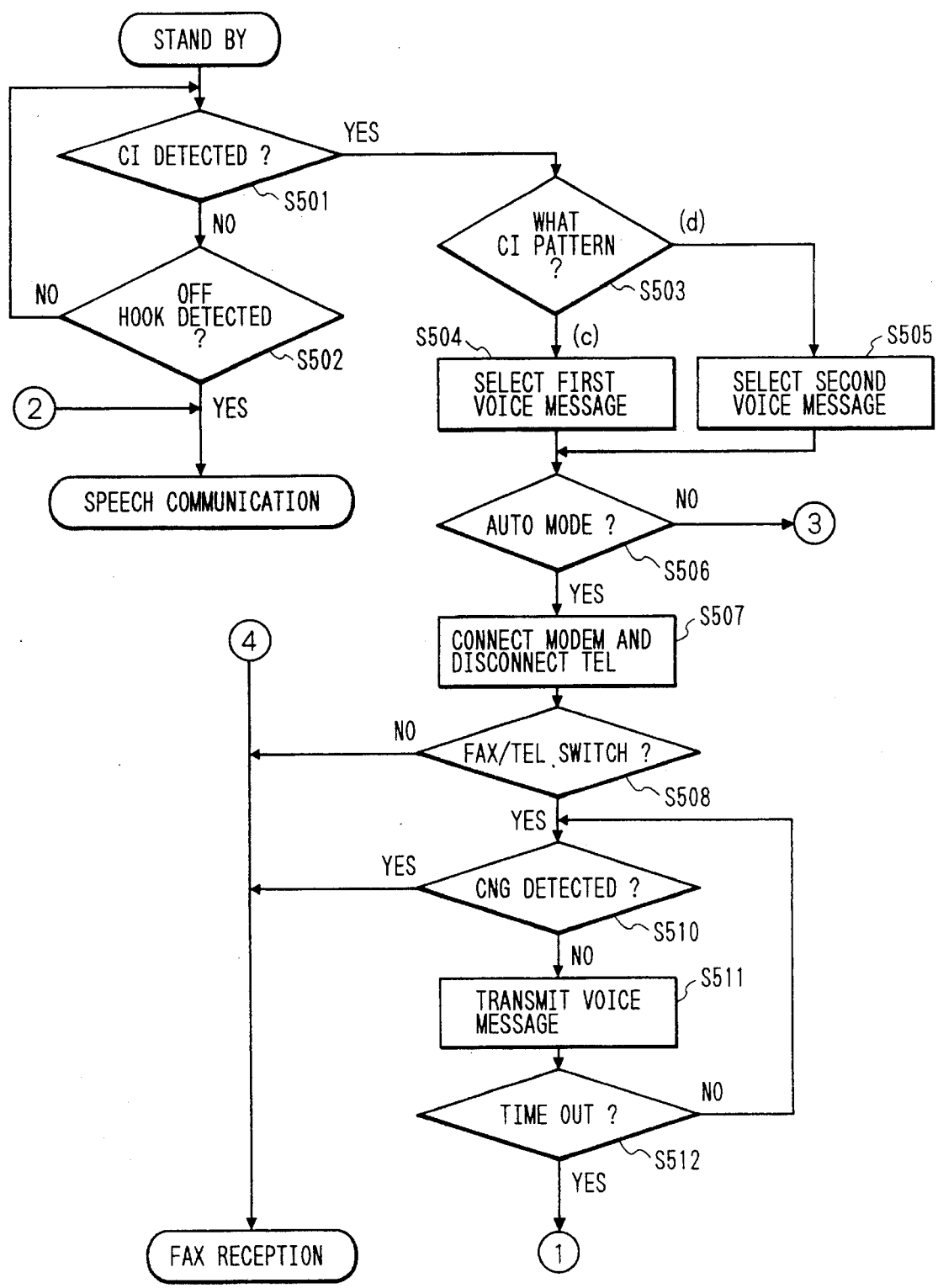
FIGS. 16A and 16B are flow charts of a termination process of a fourth embodiment.
Figure 16B:
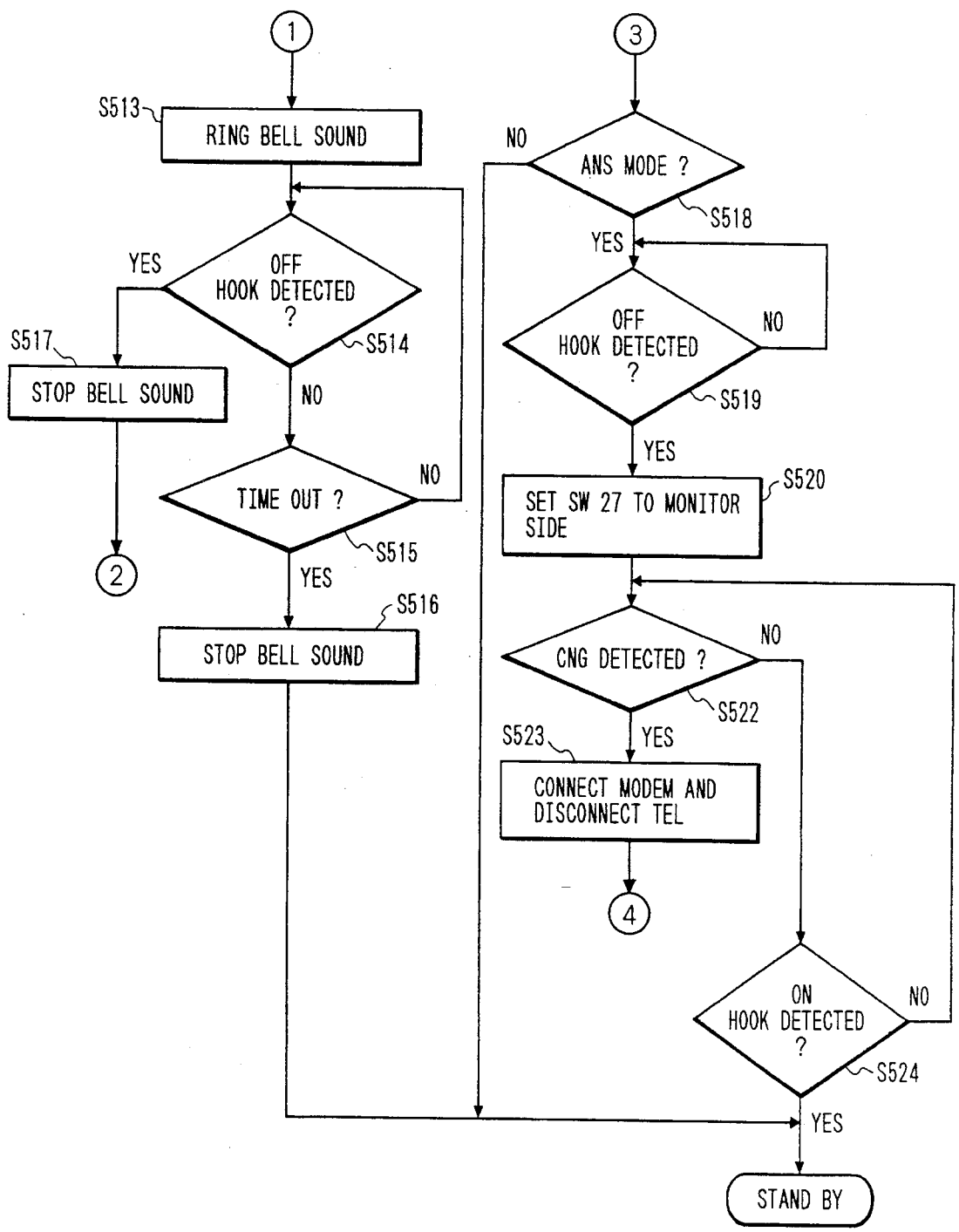

The flow in FIG. 16A begins with a standby state. in the standby state, the line switch circuit 7 is set to the telephone side, the H relay 5 is set to the telephone side, and the switch 27 is set to the amplifier 413 side. The CPU 10 is monitoring an output from the CI detection circuit 6 and an output from the off-hook detection circuit 3.

First, at step S501, the CPU 10 detects CI in the manner which was described using FIGS. 14A and 14B and FIG. 6. If the CPU 10 detects CI at step S501, it proceeds to step S503; if not it proceeds to step S502. At step S502, the CPU 10 performs an off-hook detection. If an off-hook is detected at step S502, a speech communication state is established while the facsimile remains on standby. If an off-hook is not detected at step S502, the CPU 10 returns to step S501.

If the CI pattern in FIG. 5C is detected at step S503, the CPU 10 proceeds to step S504, selects the first voice message "This is Matsumoto speaking . . . ," and then proceeds to step S506. If the CI pattern in FIG. 5D is detected at step S503, the CPU 10 proceeds to step S505, selects the second message "This is Matsumoto Engineering . . . ," and then proceeds to step S506.

Operations at and after step S506 will be described for each of set modes.

If the AUTO mode is set at step S506, the CPU 10 proceeds to step S507.

At step S507, the CPU 10 switches the line switch circuit 7 to connect the line 2 and the modem 8, and switches the H relay 5 to disconnect the line 2 from the telephone 1. Then, at step S508, if the FAX/TEL switch mode is previously set from the console unit 15, the CPU 10 proceeds to step S510. At step S508, if the CPU 10 is not to perform the FAX/TEL switch, it shifts to the facsimile reception process.

If the CPU 10 is to perform the FAX/TEL switch, it performs the CNG detection at step S510. If the CPU 10 detects CNG, it proceeds to the facsimile reception process. If the CPU 10 does not detect CNG, it proceeds to step S511 and transmits a voice message selected at step S504 or S505 from the voice transmission unit 16. Then, at step S512, the CPU 10 determines whether a time-out has occurred. In the present embodiment, a timer is set to 30 seconds for time-out. If a time-out is not detected at step S512, the CPU 10 returns to step S510; if a time-out is detected, it proceeds to step S513 in FIG. 16B.

The CPU 10 rings a telephone call bell at the display unit 15 at step S513, and performs an off-hook detection at step S514. If an off-hook is detected at step S514, it means that someone has answered the call on the telephone 1; hence, the CPU 10 stops a bell sound at step S517 and shifts to the speech communication state. At this time, the facsimile is in the standby state.

If an off-hook is not detected at step S514, the CPU 10 repeats steps S514 and S515 until a time-out occurs at step S515. In the present embodiment, a timer is set to 30 seconds for time-out. If a time-out is detected at step S515, the CPU 10 stops a bell sound at step S516 and returns to the standby state.

At step S506, if the AUTO mode is not detected, the CPU 10 proceeds to step S518. At step S518, if an ANS mode (automatic answer mode) is detected, the CPU 10 proceeds to step S519. The CPU 10 performs an off-hook detection at step S519 and waits until an automatic answering telephone connected as the telephone 1 starts. Even in this state, the facsimile is in the standby state; hence, a facsimile operation is not interrupted even when the automatic answering telephone 1 fails to start.

If the automatic answering telephone 1 goes off-hook at step S519, the CPU 10 sets the switch 27 to the monitor side at step S520 and then performs the CNG detection at step S522. If CNG is detected, the CPU 10, at step S523, switches the line switch circuit 7 to connect the line 2 and the modem 8, and switches the H relay 5 to disconnect the line 2 from the telephone 1. Then, the CPU 10 proceeds to the facsimile reception process.

At step S522, if CNG is not detected, the CPU 10 proceeds to step S522 and performs the on-hook detection. The CNG detection at step S522 is continued until an on-hook is detected at step S524. If an on-hook is detected at step S524, the CPU 10 returns to the standby state.

If the ANS mode is not detected at step S518, the CPU 10 waits until somebody lifts a handset off a hook at an externally attached telephone while the facsimile remains in the standby state.

It is possible to register nothing for a second voice message, thereby transmitting a voice message for the CI pattern in FIG. 5C and transmitting nothing for the CI pattern in FIG. 5D. Also, a similar effect can be implemented by adding a branch of whether to execute or skip a voice message transmission according to a CI pattern immediately before step S511.

Also, the transmission of a voice message is not limited to the FAX/TEL switch, but may be at other timing like immediately after the facsimile has closed the line.

A fifth embodiment of the present invention will now be described. The present embodiment uses the construction of the first embodiment in common.

Figures 17A, 17B:
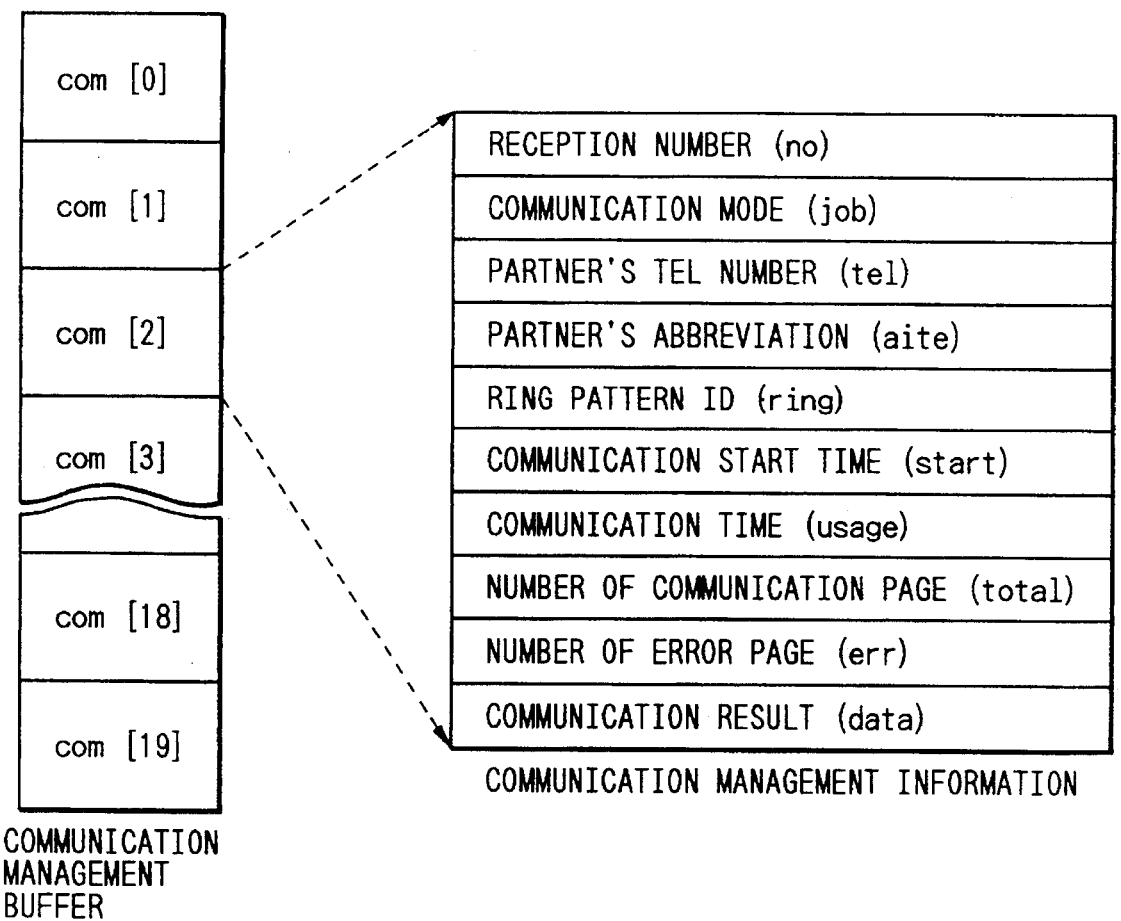
FIGS. 17A and 17B are diagrams showing a communication management buffer and a called terminal information table of a fifth embodiment.

FIG. 17A shows the contents of a communication management buffer (com) in the RAM 12 in the present embodiment. The buffer can contain data on up to 20 communications. A reception number (no), a communication mode (job), a partner's telephone number (tel), a partner's abbreviation (aite), a ring pattern ID (ring), a communication start time (start), a communication time (usage), the number of communication pages (total), the number of error pages (err), and a communication result (data) are stored for each communication.

FIG. 17B shows the contents of a called terminal information table in the RAM 12 in the present embodiment. ID, a user's telephone number, and a user's abbreviation are stored in each row in correspondence to a ring pattern. ID 0 corresponds to a normal ring (FIG. 5A); ID 1 corresponds to a double ring (FIG. 5B); ID 2 corresponds to a triple ring of short-short-long (FIG. 5C); ID 3 corresponds to a triple ring of short-long-short (FIG. 5D); and ID 4 corresponds to some other ring pattern.

Figure 18:
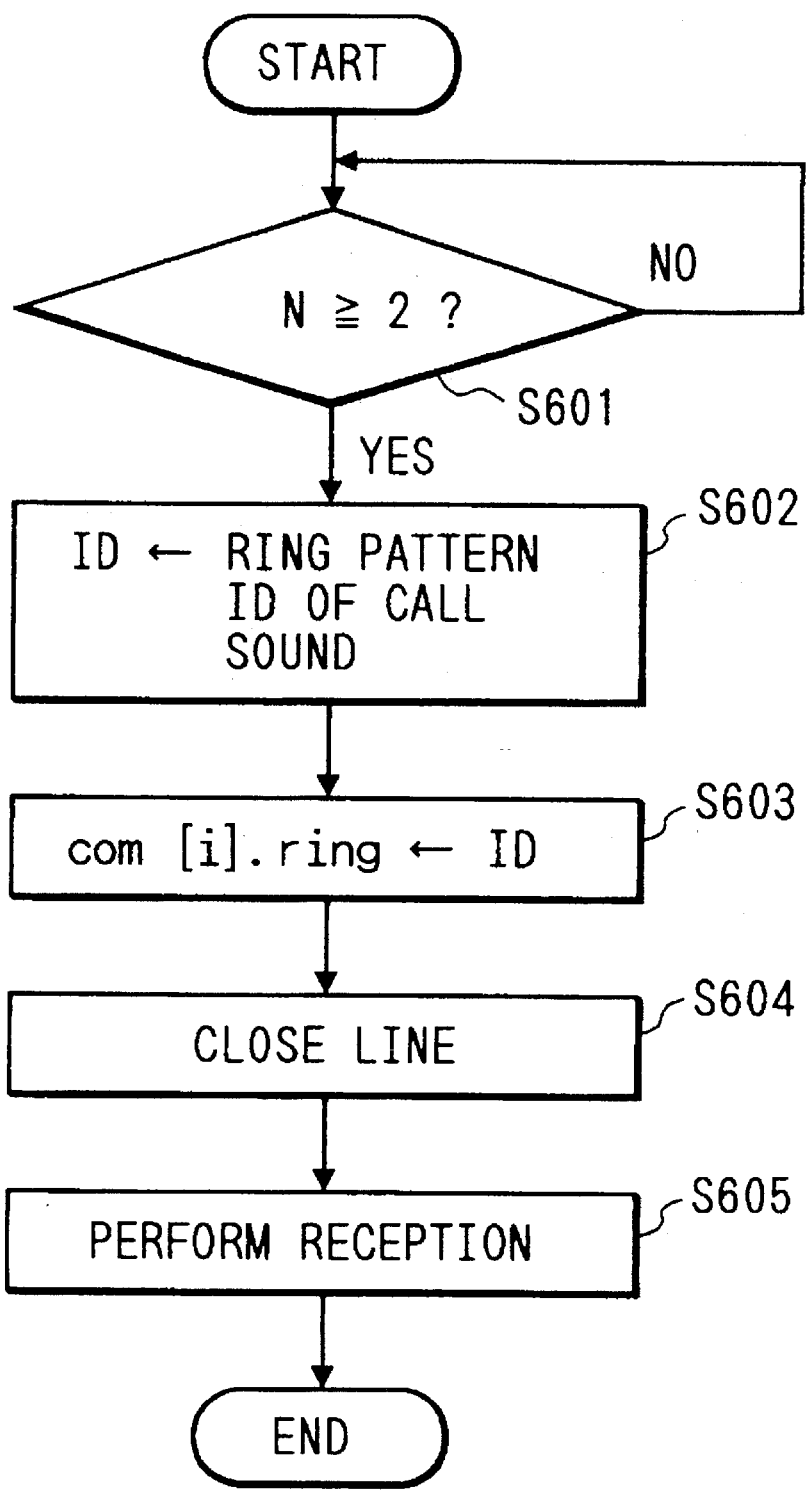
FIG. 18 is a flow chart of a termination process of the fifth embodiment.

FIG. 18 is a flow chart showing a reception process of the CPU 10 in the present embodiment.

First, at step S601, the CPU 10 waits until the calling count N becomes 2 or greater. N is set by the CI detection circuit 6 in parallel with a main process. When N becomes 2 or greater, the CPU 10 proceeds to step S602 and obtains a ring pattern of a call sound. The detail of this process is as shown in FIGS. 4A and 4B and FIG. 6. The obtained ID is stored in the communication management buffer at a region of the ring pattern ID (ring) (step S603), and is registered as ID corresponding to an incoming telephone number in this communication. i in com [i] is incremented from 0 to 19 communication by communication. When the communication management information is stored in com [2], the next information is stored in com [3]. The CPU 10 closes the line at step S604 and performs a reception at step S605. At step S605, the CPU 10 stores the reception number, the communication mode, and the communication start time in the communication management buffer at corresponding regions. Also, the CPU 10 stores the partner's telephone number and the partner's abbreviation contained in a received procedure signal in the communication management buffer at corresponding regions. Moreover, when the reception is completed, the CPU 10 stores the communication time, the number of communication pages or the number of error pages if the reception has ended up in error, and the communication result indicating whether the reception has ended in error or properly in the communication management buffer at corresponding regions.

At the time of transmission, similar information is also stored in the communication management buffer.

Figure 19A:
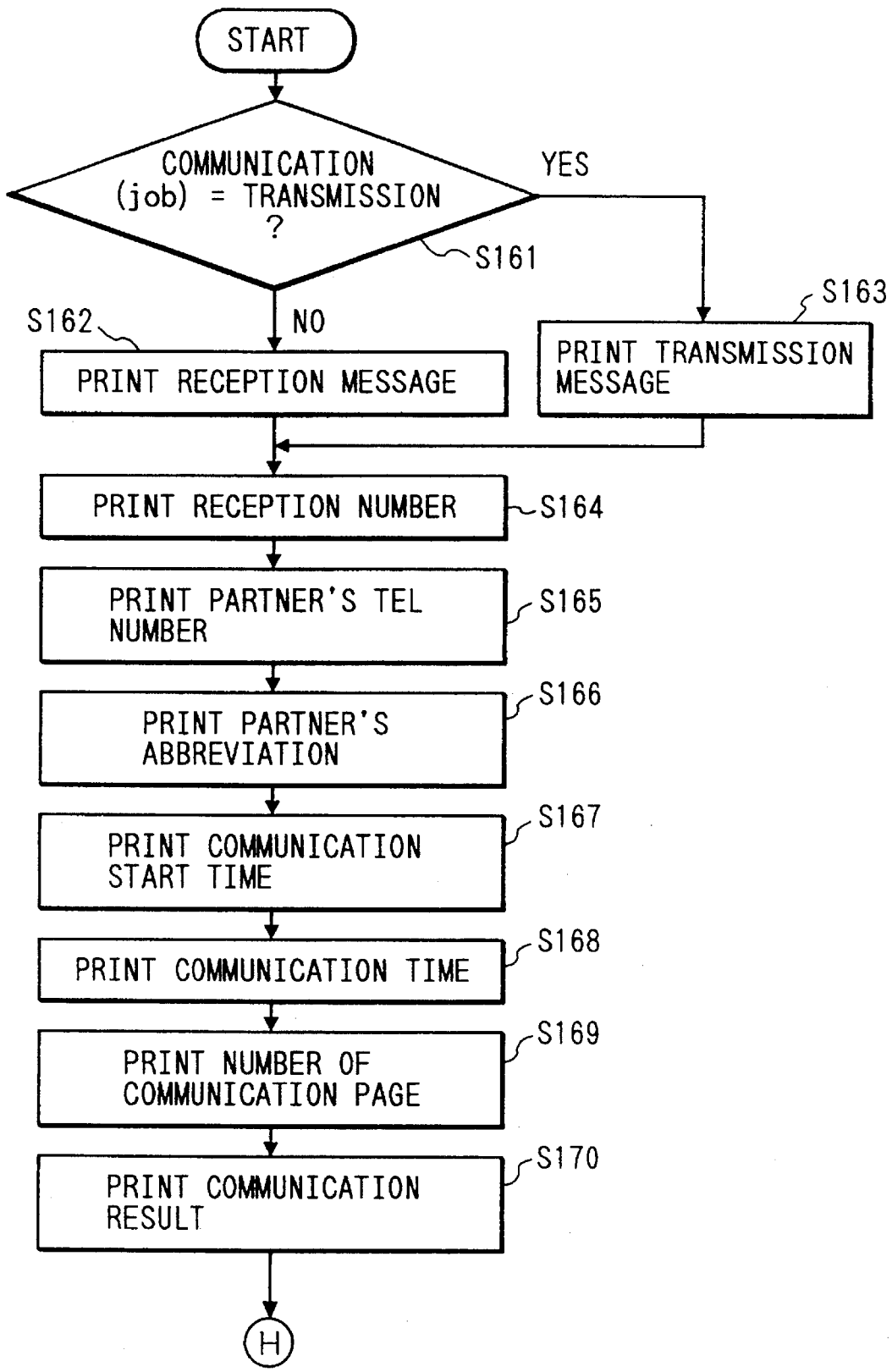
FIGS. 19A and 19B are flow charts of preparing a communication result report of the fifth embodiment.
Figure 19B:
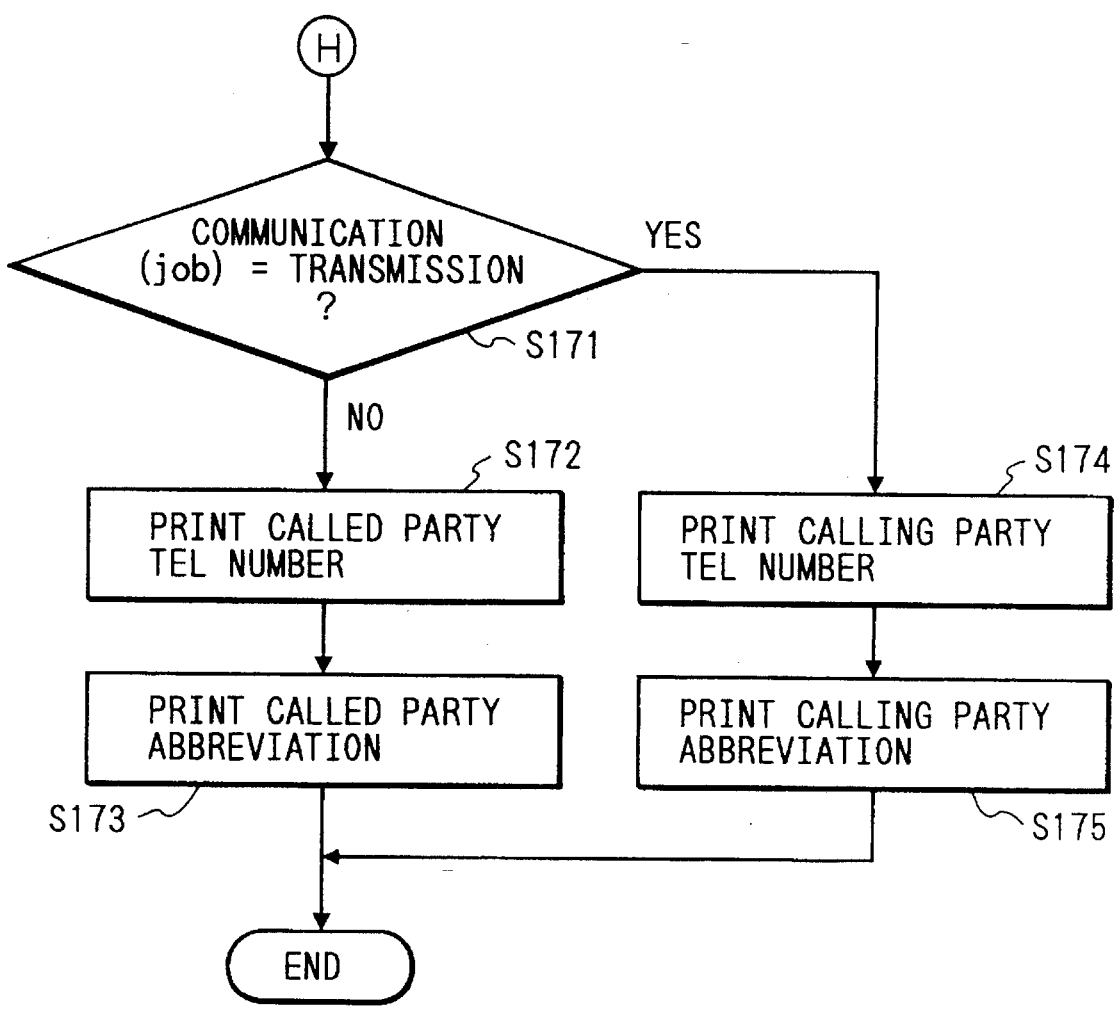

FIGS. 19A and 19B are flow charts of preparing a communication result report in the present embodiment.

When a communication is completed, the CPU 10 references the communication mode in the communication management buffer at step S161, and prints a reception message "RECEPTION IS COMPLETED" if the communication mode is reception (step S162) or prints a transmission message "TRANSMISSION IS COMPLETED" if the communication mode is transmission (step S163). Then, the CPU 10 prints the reception number (step S164), the partner's telephone number (step S165), the partner's abbreviation (step S166), the communication start time (step S167), the communication time (step S168), the number of communication pages (step S169), and the communication result (step S170) in the order. At step S171, the CPU 10 references the communication mode in the communication management buffer, and prints a called party's telephone number corresponding to a ring pattern ID (step S172) and a called party's abbreviation (step S173) if the communication mode is reception or prints a calling party's telephone number (step S174) and a calling party's abbreviation (step S175) if the communication mode is transmission.

FIG. 20 is a reception result report prepared and outputted according to the flow charts in FIGS. 19A and 19B when reception is completed.

Figure 21:
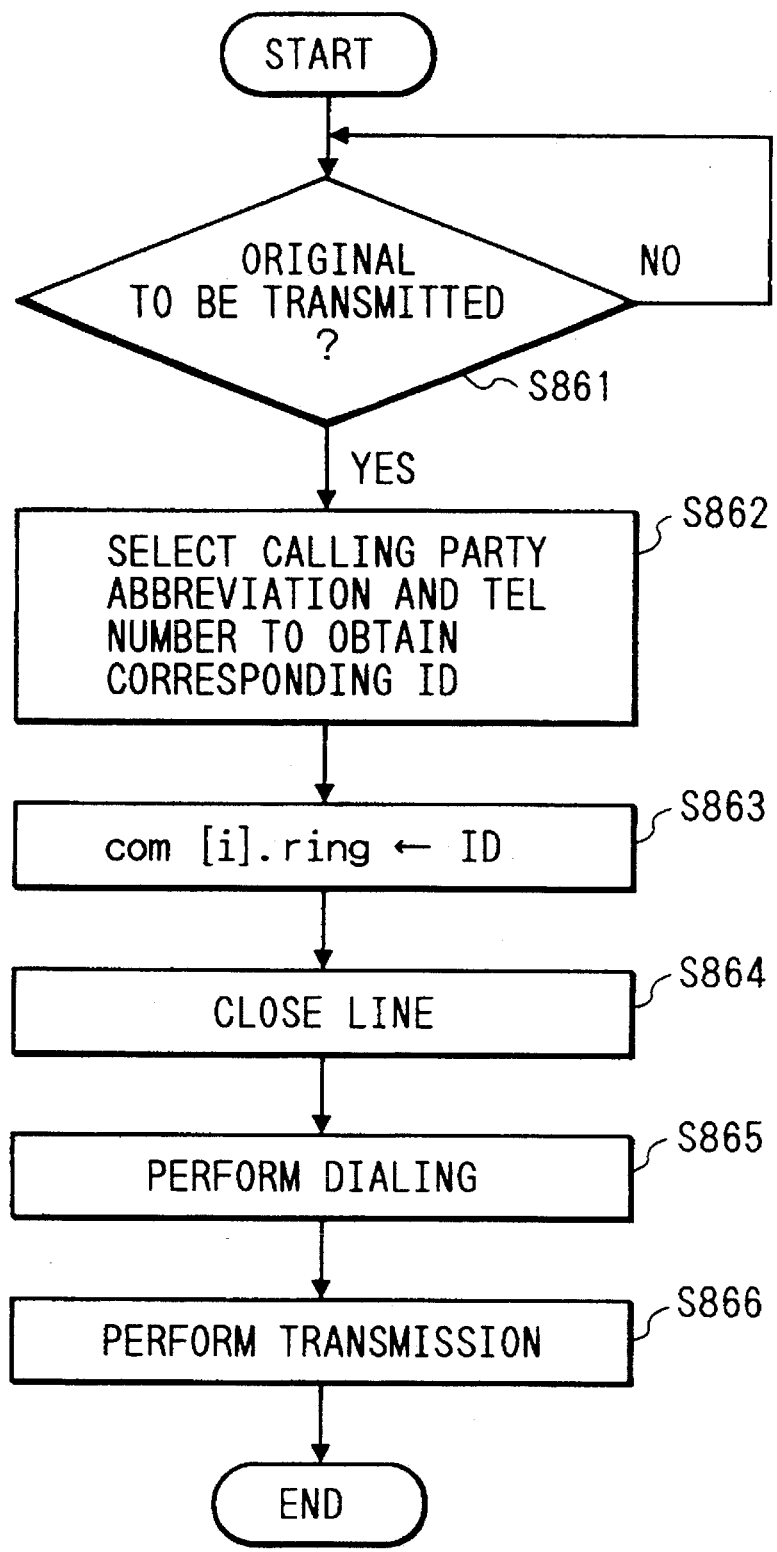
FIG. 21 is a flow chart of a transmission process of the fifth embodiment.

FIG. 21 is a flow chart of a transmission process in the present embodiment.

When an original to be transmitted exists at step S861, a user presses a calling party's abbreviation selection button on the console unit 15 in FIG. 1 to select a calling party's abbreviation, thereby obtaining a corresponding ID (step S862). Then, the CPU 10 stores the obtained ID in the communication management buffer at the ring pattern ID (ring) region (step S863) and registers it as ID corresponding to the calling party in the communication. The CPU 10 closes the line at step S864, performs dialing at step S865, performs transmission at step S866, and then ends the transmission.

FIG. 22 is a transmission result report prepared and outputted according to the flow chart in FIG. 21 when transmission is completed.

Figure 23A:
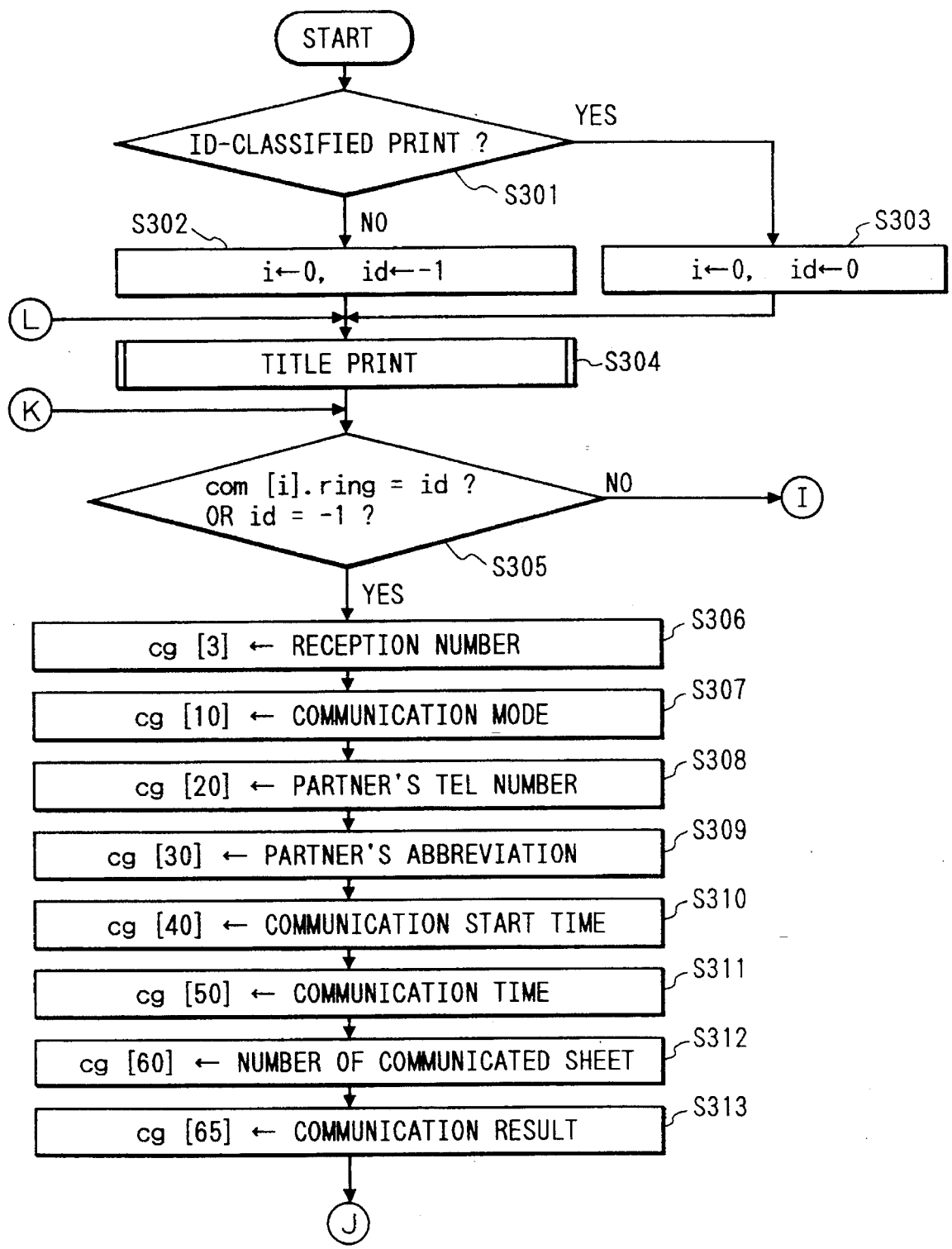
FIGS. 23A and 23B are flow charts of preparing a communication management report of the fifth embodiment.
Figure 23B:
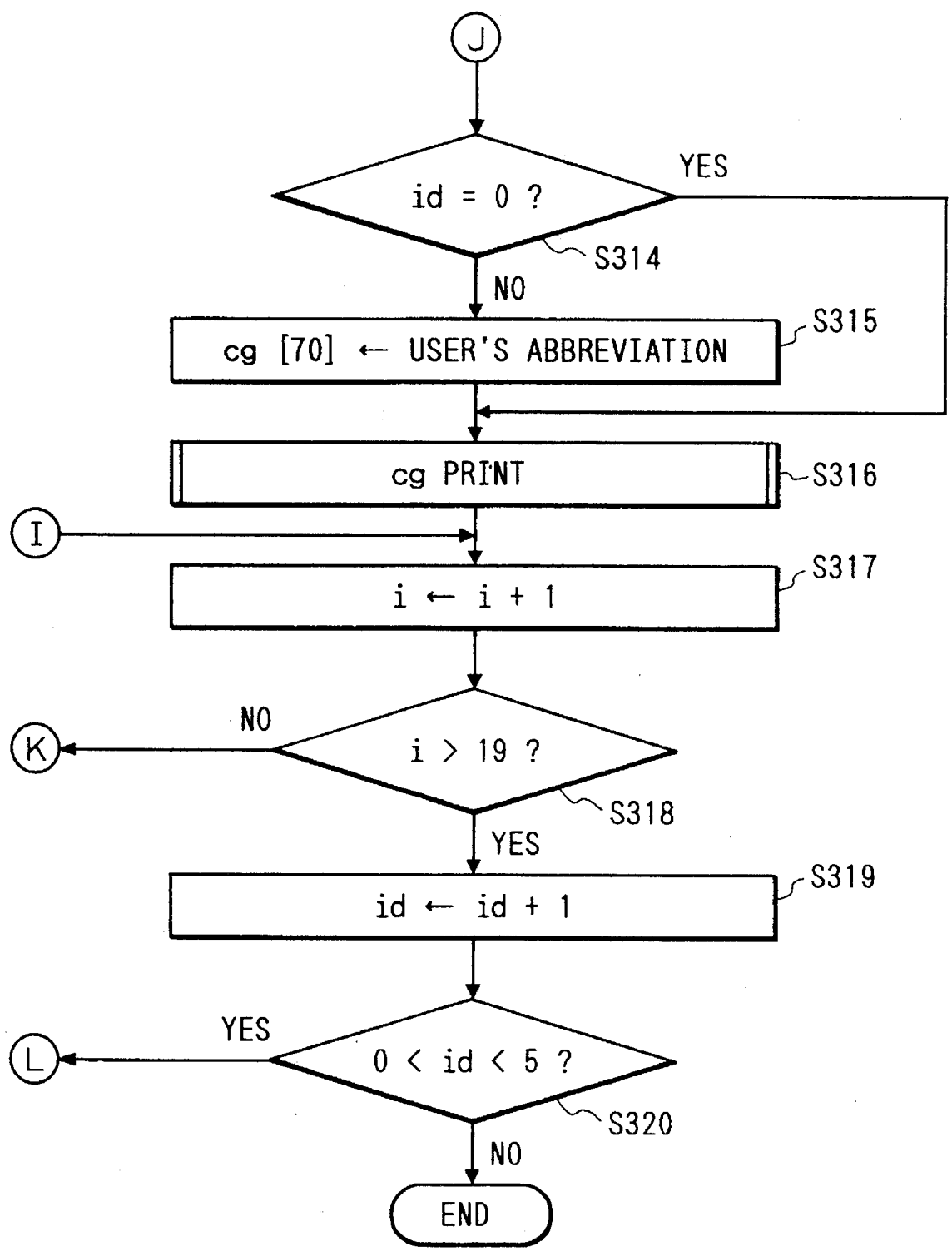

FIGS. 23A and 23B are flow charts of preparing communication management reports in FIG. 24 and FIGS. 25A to 25D by the CPU 10. In the figures, variable i denotes a counter indicating which communication stored in the communication management buffer is concerned, and variable id denotes a ring pattern ID. cg denotes a work buffer for output to a printer.

FIG. 24 is a communication management report listing communication management records for 20 communications.

FIGS. 25A to 25D are communication results reports which are classified by ring pattern ID (user's telephone number and user's abbreviation) used for reception or transmission and are outputted accordingly.

First, the CPU 10 determines whether to output an ID-classified report as shown in FIGS. 25A to 25D at step S301, and initializes the variables i and id at steps S302 and S303. Next, the CPU 10 prints a report title at step S304. At the title print, the CPU 10 prints a user's abbreviation or a user's telephone number corresponding to a ring pattern ID in the case of ID-classified output; it does not print in a user's abbreviation column, where a user abbreviation is printed at batch output (FIG. 24). When the ring pattern ID of the communication management information (com [i], ring) agrees with id or when ID-classified print is not performed (id=-1), the CPU 10 proceeds to step S306; in other than those cases, the CPU 10 proceeds to step S317 in FIG. 23B. Then, the CPU 10 writes the reception number (step S306), the communication mode (step S307), the partner's telephone number (step S308), the partner's abbreviation (step S309), the communication start time (step S310), the communication time (step S311), the number of communication sheets (step S312), and the communication result (step S313) to cg in the order.

At step S314 in FIG. 23B, the CPU 10 determines whether to perform ID-classified print. If ID-classified print is to be performed, the CPU 10 proceeds to step S316; if batch output is to be performed, it writes a user's abbreviation to cg (step S315). At step S316, the CPU 10 prints the contents of cg. At step S317, the CPU 10 increments the counter i indicating which communication is concerned, thereby making the counter i agree with a next communication. At step S318, the CPU 10 determines whether printing is completed with 20 communications. If not, the CPU 10 returns to step S305 to check for the contents of a next communication. When processing is completed with 20 communications, the CPU 10 proceeds to step S319 and increments the variable id indicating ID to be output, thereby making id agree with a next ring pattern. At step S320, the CPU 10 determines whether processing is all completed or not.

In the case of ID-classified output, in the mode of outputting data on a specific ID only, a specified ID is substituted into id, and then when processing is completed with 20 communications, the CPU 10 ends the print process.

A sixth embodiment of the present invention will now be described in detail with reference to the drawings.

The present embodiment uses the construction of the first embodiment in common.

FIG. 26 illustrates a received image management table in the RAM 12. A page record management table is used to manage a storage address of a received image page by page. A page record contains a page ID of a next page and the top and end addresses of an image storage location. A next page ID column contains ID of a next page, if any, or 8000H if a current page is a last page.

Likewise, an image record is provided to manage pages communication by communication. The image record contains a reception number to discriminate communications from each other, a reception start time, a ring pattern ID, and a top page record ID.

Figure 27:
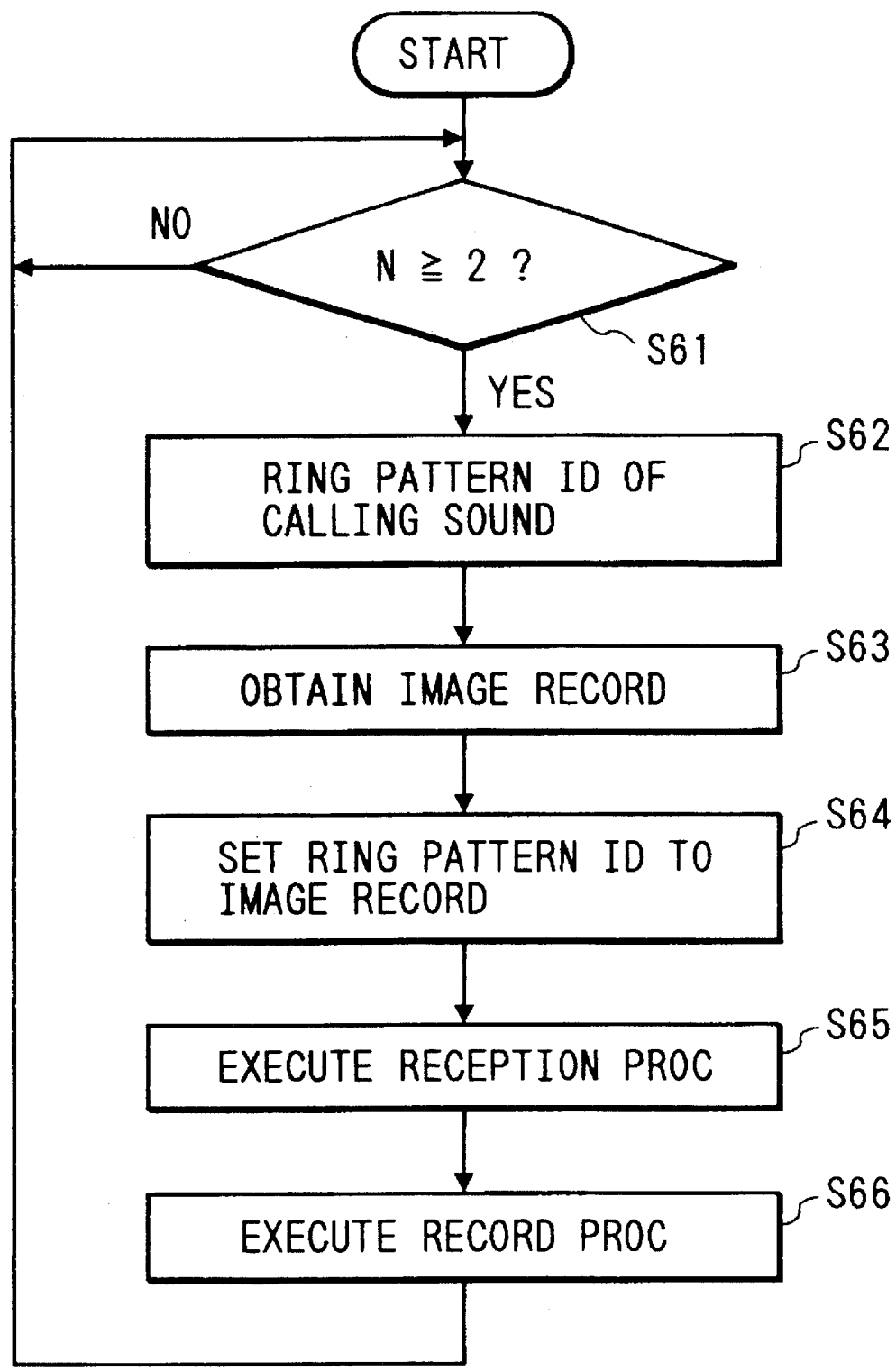
FIG. 27 is a flow chart of a termination process of the sixth embodiment.

FIG. 27 is a flow chart of a main process executed by the CPU 10 in the present embodiment.

First, at step S61, the CPU 10 waits until the calling count N becomes 2 or greater. N is set by the CI detection circuit 6 in parallel with the main process. When N becomes 2 or greater, the CPU 10 proceeds to step S62 and obtains a ring pattern of a call sound. The detail of this process is as shown in FIGS. 4A and 4B and FIG. 6. Next, the CPU 10 obtains an image record at step S63. At this time, the reception number is set for discrimination of image. At step S64, the CPU 10 sets the ring pattern ID obtained at step S62 into the image record. Then, it closes the line to execute a reception process (step S65) and a record process (step S66) and then ends the main process.

Figure 28:
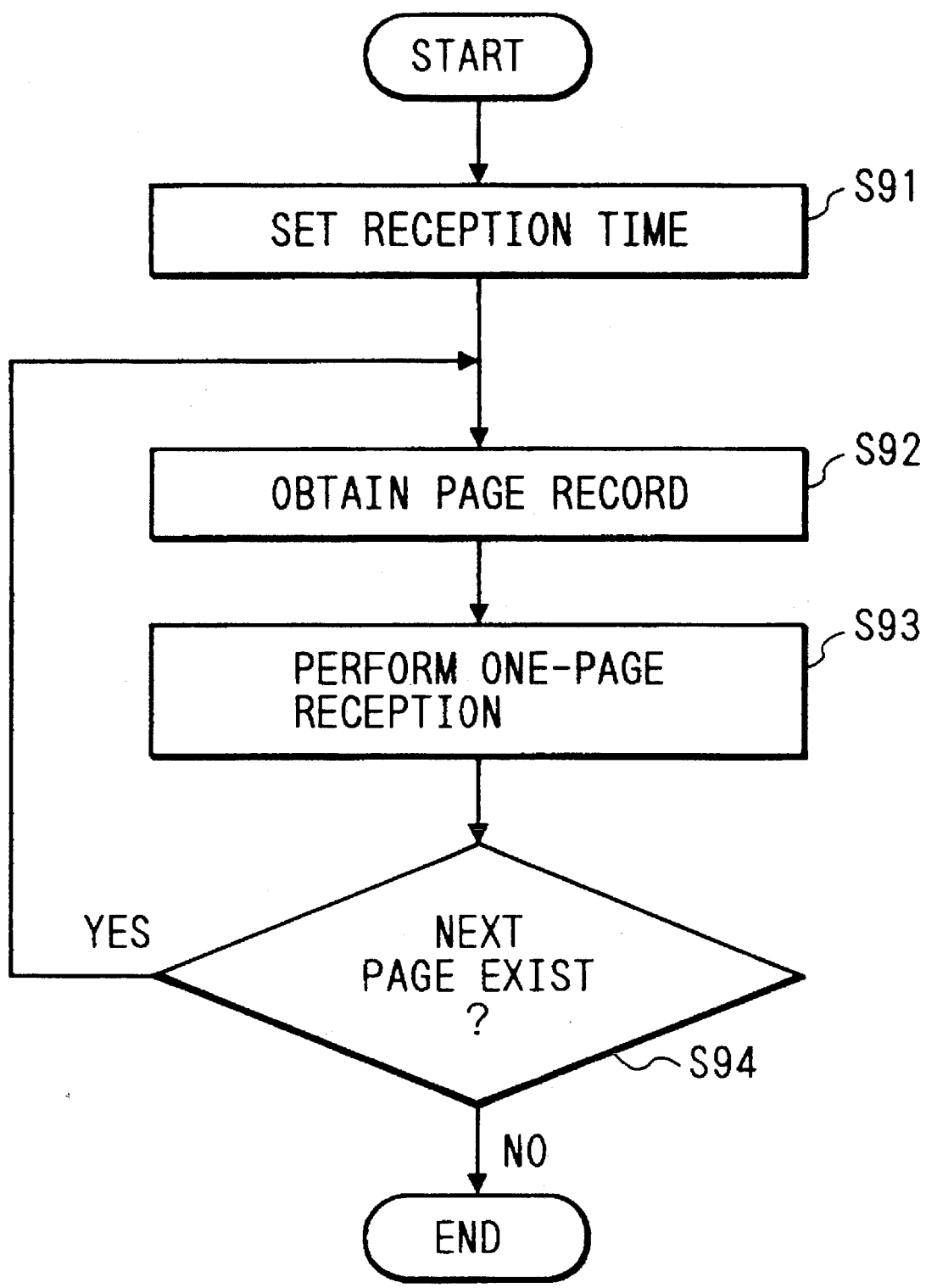
FIG. 28 is a flow chart of a reception process of the sixth embodiment.

FIG. 28 is a flow chart showing the reception process executed by the CPU 10. At the time of reception, the CPU 10 sets the reception start time into an image record at step S91. The CPU 10 obtains a page record at step S92 and sets its page ID into the image record. Then, the CPU 10 performs one-page reception at step S93. The CPU 10 sets the top address of image into a page record when reception starts, and sets the end address of image into the page record when reception ends. If a next page exists at step S94, the CPU 10 returns to step S92; if not, it ends the reception process.

Figure 29:
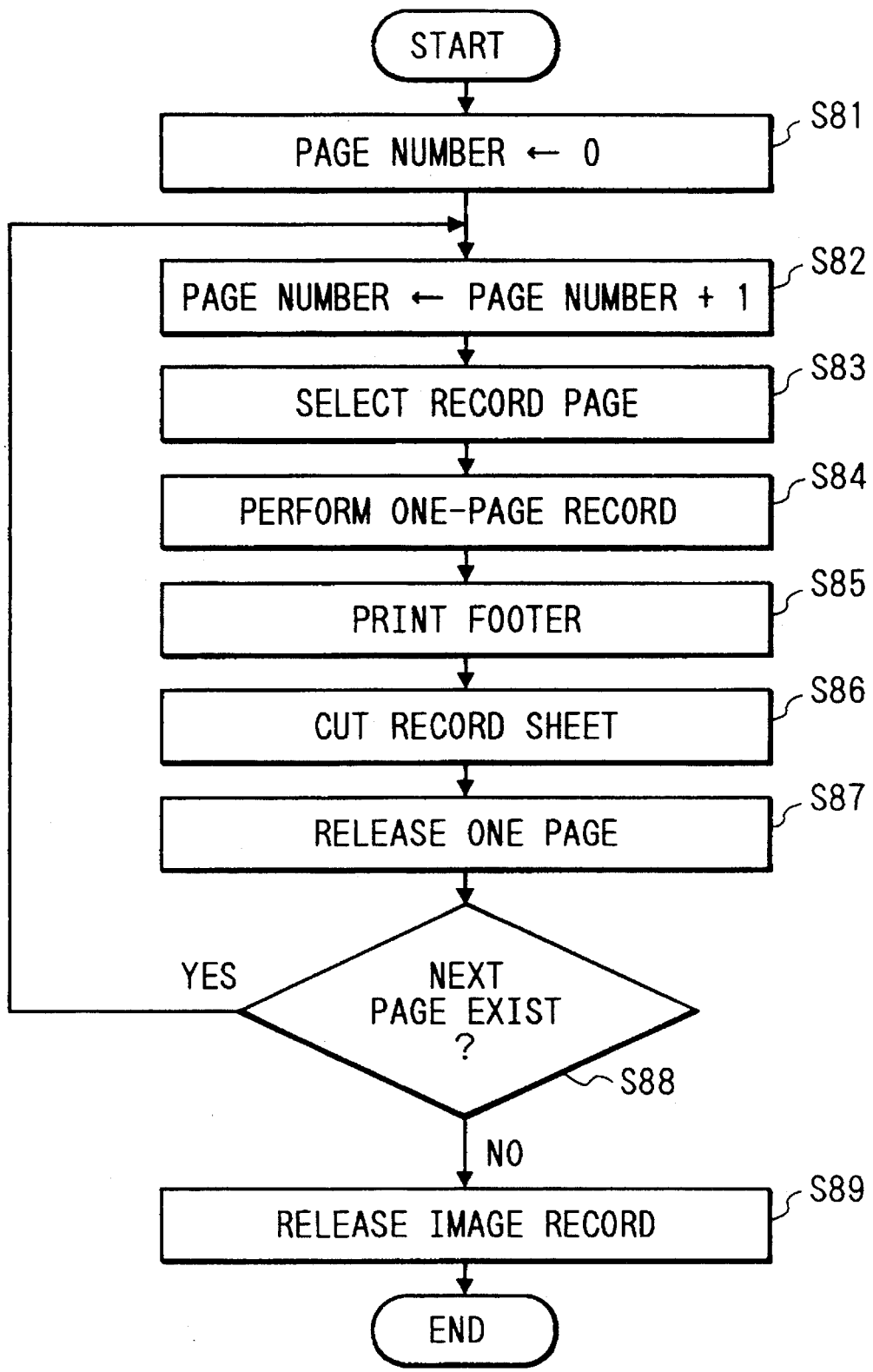
FIG. 29 is a flow chart of a record process of the sixth embodiment for recording on continuous paper.
Figure 30:
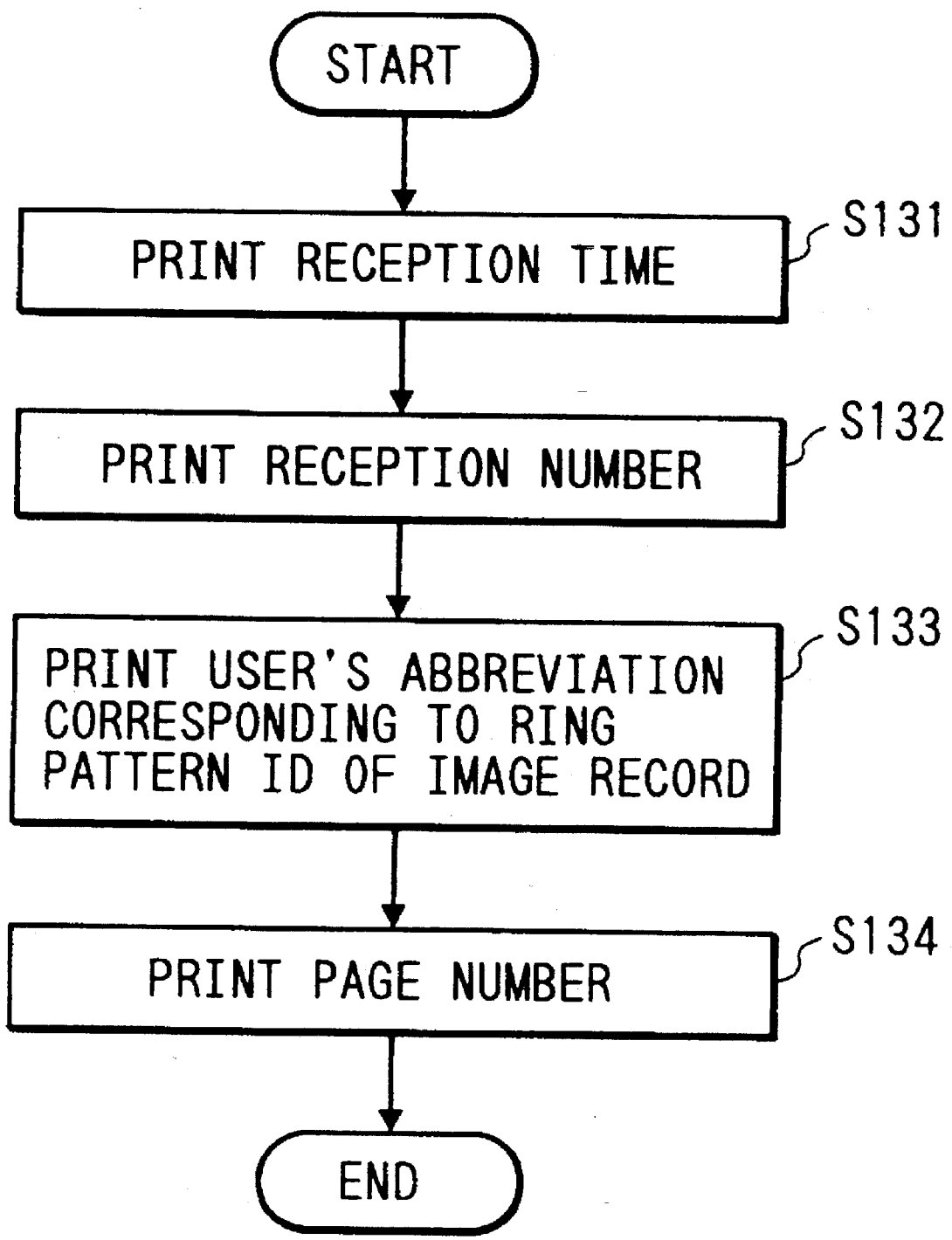
FIG. 30 is a flow chart of a footer print process of the sixth embodiment.

FIG. 29 is a flow chart showing a process of recording on continuous paper by the CPU 10. First, the CPU 10 sets a page number to 0 at step S81 and increments the page number at step S82. Then, the CPU 10 selects a record page from an image record at step S83, records the selected page at step S84, and prints a footer at step S85. The footer print process will be described in detail later (FIG. 30). On completion of printing the footer, the CPU 10 cuts away a record sheet at step S86 and releases the recorded page record at step S87. In detail, the CPU 10 sets a page ID next to the recorded page into the image record at the top page ID region, and clears the page record to 0. If the top page ID in the image record is 8000H, the CPU 10 considers that a next page does not exist, and hence proceeds to step S89 to release the image record and ends the record process. If a next page exists at step S88, the CPU 10 returns to step S82.

FIG. 30 is a flow chart showing a footer print process executed by the CPU 10. The CPU 10 prints, as a footer, a reception start time (step S131), a reception number (step S132), a user's abbreviation corresponding to a ring pattern ID registered in the called terminal information table in the RAM 12 (step S133), and a page number (step S134), and then ends the footer print process.

Figure 31:
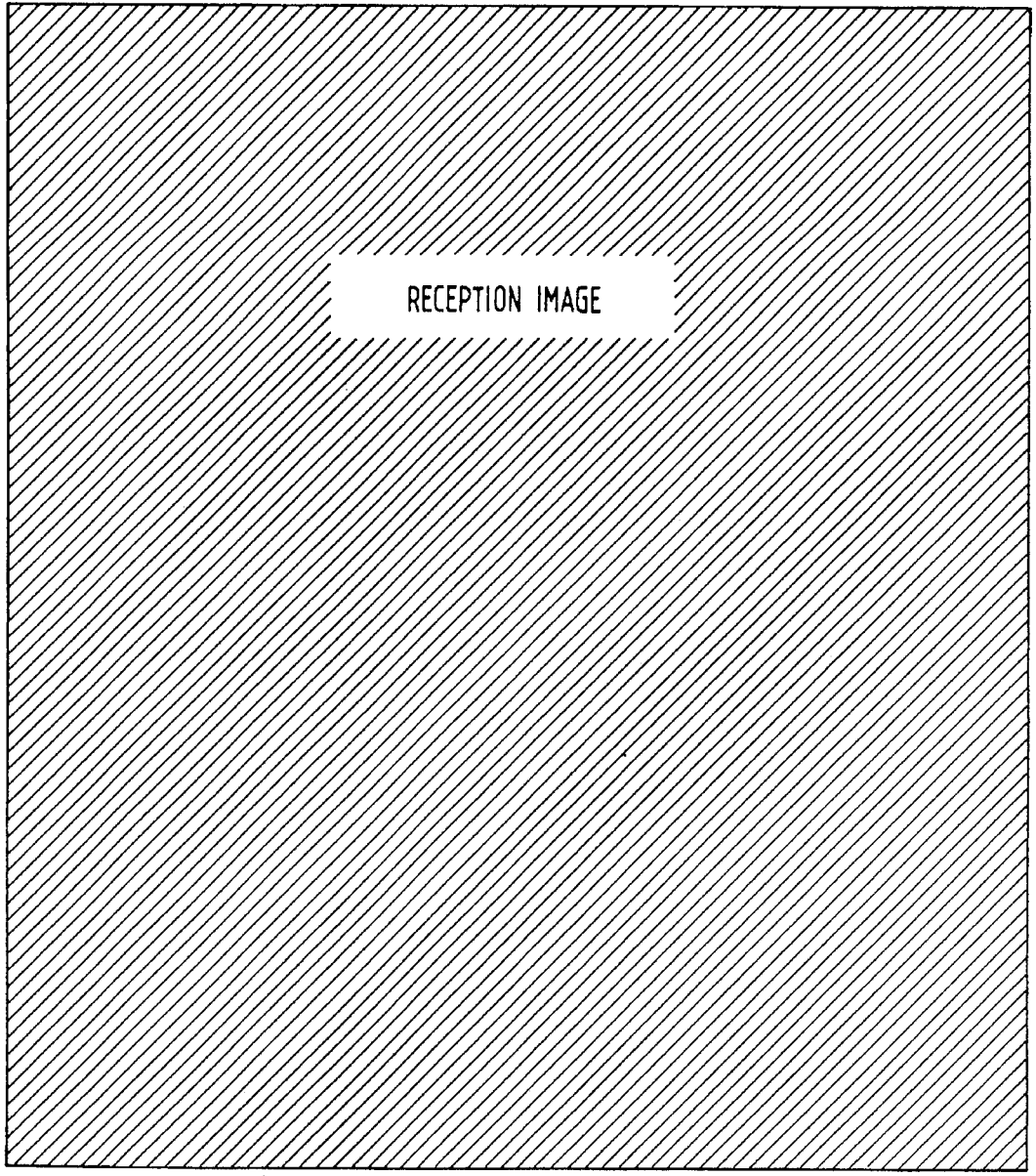
FIG. 31 is a view showing a recorded footer of the sixth embodiment.

FIG. 31 shows a footer example.

Figure 32A:
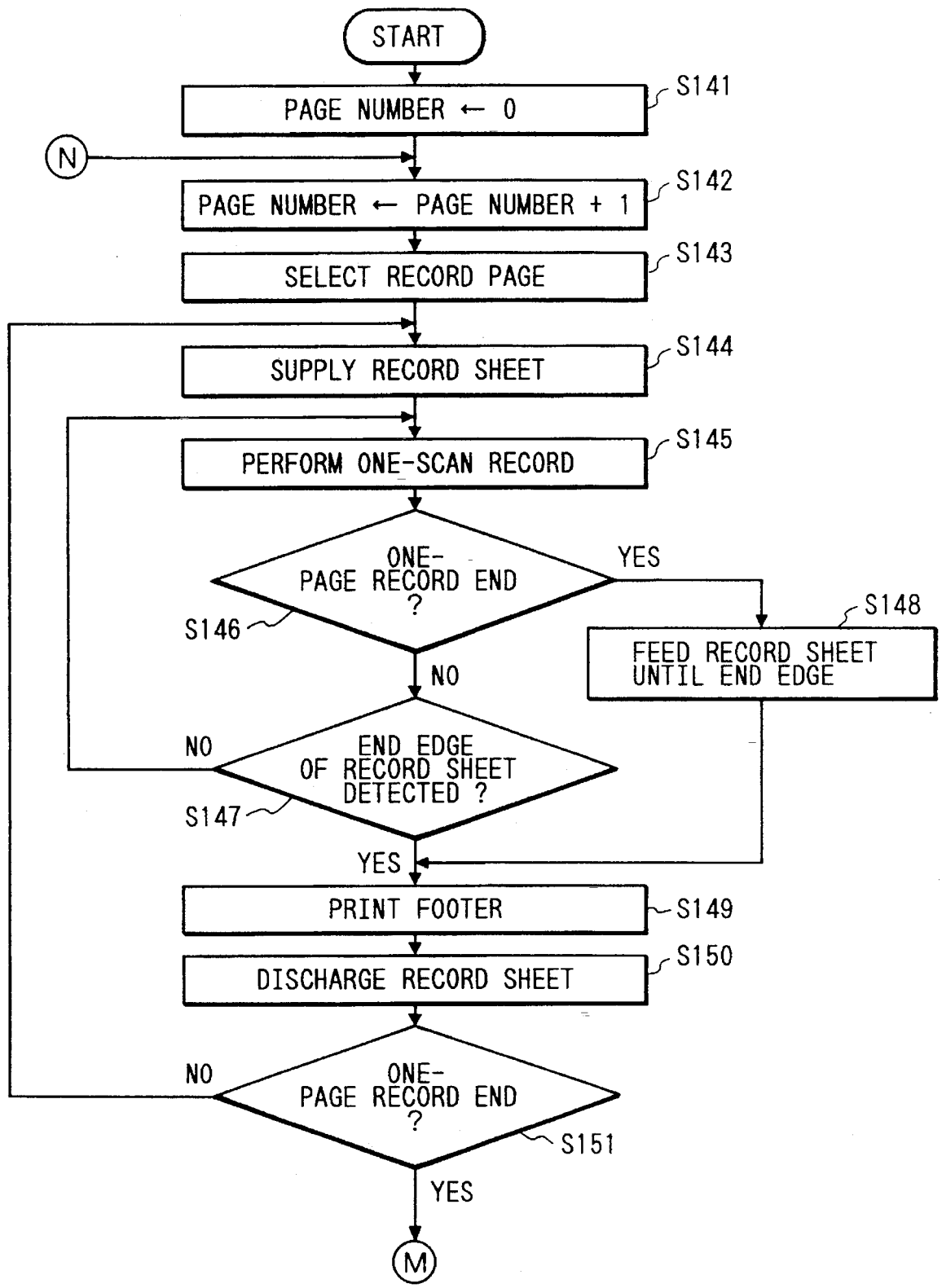
FIGS. 32A and 32B are flow charts of a record process of the sixth embodiment for recording on a cut sheet.
Figures 32B, 33:
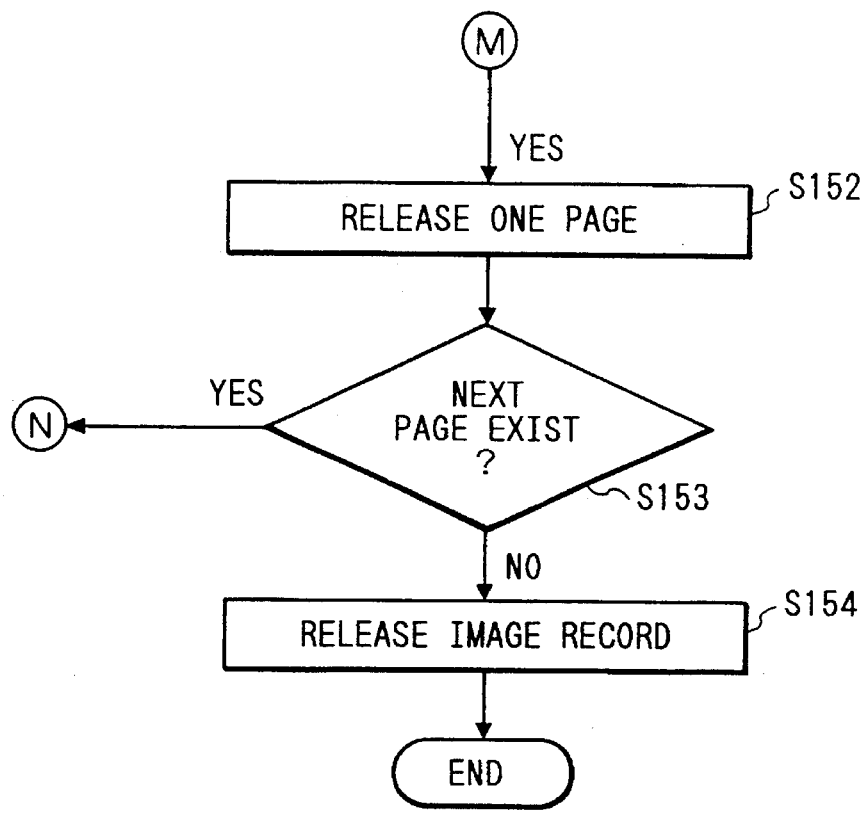
FIG. 33 is a construction diagram of a password table of a seventh embodiment.

FIGS. 32A and 32B are flow charts showing a process of recording on cut sheets by the CPU 10. A record unit in the present embodiment is such that an ink jet record head with 64 vertical nozzles performs a scan in a main scanning direction for printing. The record unit has a record sheet end edge sensor. After detecting the end edge of a record sheet, the sensor is located in such a position that printing for one more scan is possible.

First, the CPU 10 sets a page number to 0 at step S141, increments the page number at step S142, and selects a record page from an image record at step S143. Then, the CPU 10 supplies a record sheet at step S144, and prints as much an image as can be printed in one scan. If one-page image is all recorded at step S146, the CPU 10 feeds the record sheet at step S148 until the end edge thereof is detected, and then proceeds to step S149. If an image to be printed still remains on the page at step S146, the CPU 10 proceeds to step S147; the CPU 10 returns to step S145 if the end edge of the record sheet is not detected, and proceeds to step S149 if the end edge of the record sheet is detected. At step S149, the CPU 10 prints a footer. A footer print process is as described in FIG. 30.

On completion of printing a footer, the CPU 10 discharges the record sheet at step S150. If an image to be printed still remains on the page at step S151, the CPU 10 returns to step S141; if one-page image is all recorded at step S151, the CPU 10 proceeds to step S152 in FIG. 32B. At step S152, the CPU 10 releases the recorded page record. In detail, the CPU 10 sets a page ID next to the recorded page into the image record at the top page ID region, and clears the page record to 0. If the top page ID in the image record is 8000H, the CPU 10 considers that a next page does not exist, and hence proceeds to step S154 to release the image record and ends the record process. If a next page exists at step S153, the CPU 10 returns to step S142.

A seventh embodiment of the present invention will now be described. The present embodiment uses the construction of the first embodiment in common.

FIG. 33 shows the contents of a password table in the RAM 12 in the present embodiment.

A password is set corresponding to a ring pattern ID. This buffer is backed up, and the contents thereof are previously registered by a user. ID 0 corresponds to a normal ring (FIG. 5A); ID 1 corresponds to a double ring (FIG. 5B); ID 2 corresponds to a triple ring of short-short-long (FIG. 5C); ID 3 corresponds to a triple ring of short-long-short (FIG. 5D); and ID 4 corresponds to some other ring pattern. A number in a password column, if any, represents a password. FFFF in the password column indicates that a password is not contained.

Figure 34:
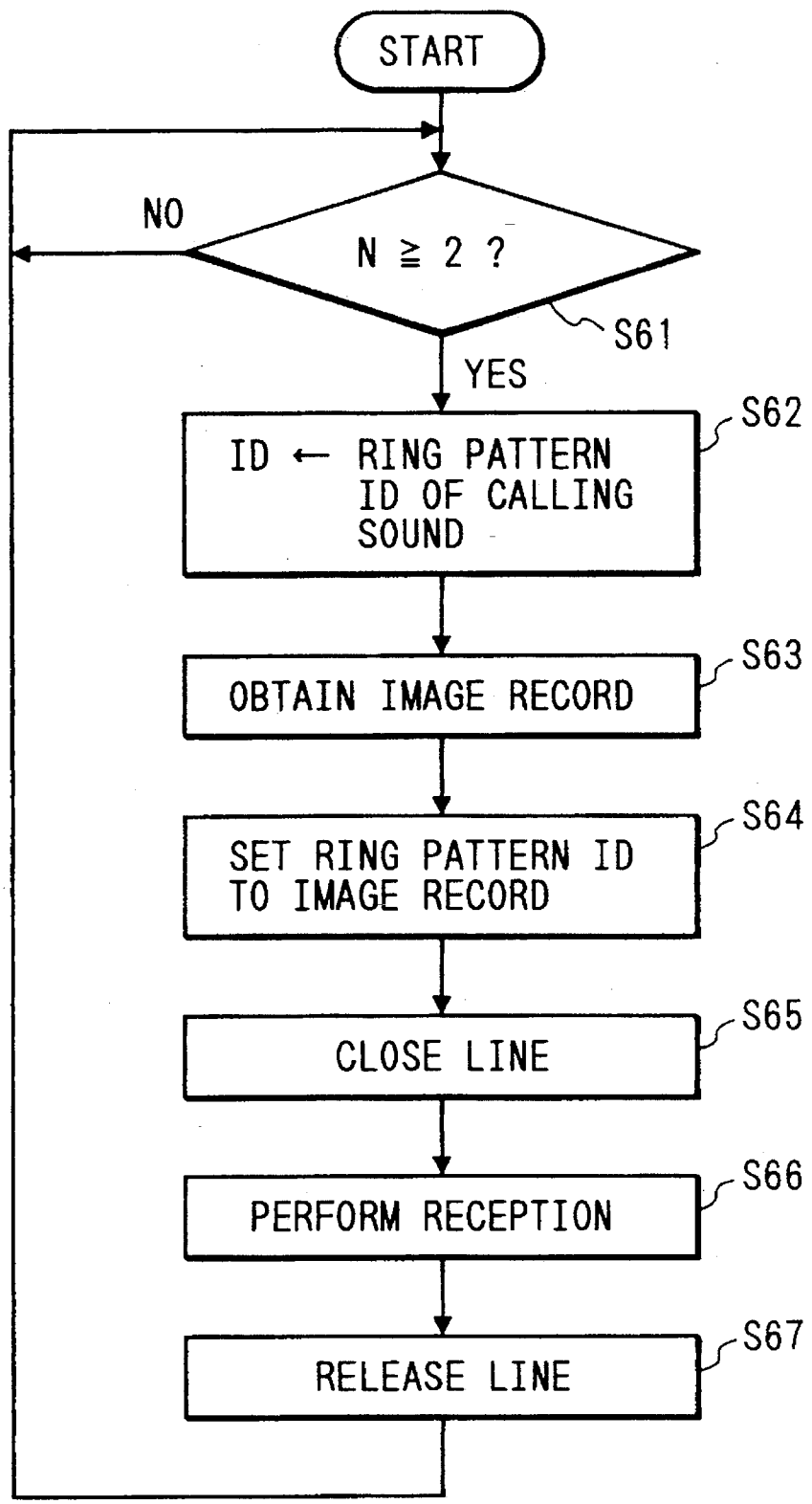
FIG. 34 is a flow chart of a termination process of the seventh embodiment.

FIG. 34 is a flow chart showing a termination process.

First, at step S61, the CPU 10 waits until the calling count N becomes 2 or greater. N is set by the CI detection circuit 6 in parallel with the main process. When N becomes 2 or greater, the CPU 10 proceeds to step S62 and obtains a ring pattern of a call sound. The detail of this process is as shown in FIGS. 4A and 4B and FIG. 6. Next, at step S63, the CPU 10 obtains an image record to store a reception image. At step S64, the CPU 10 sets the ring pattern ID into the image record in the RAM 12. Then, the CPU 10 closes the line at step S65, and performs reception at step S66 to store the reception image in the image record in the RAM 12. At step S67, the CPU 10 releases the line and returns to step S61.

Figure 35:
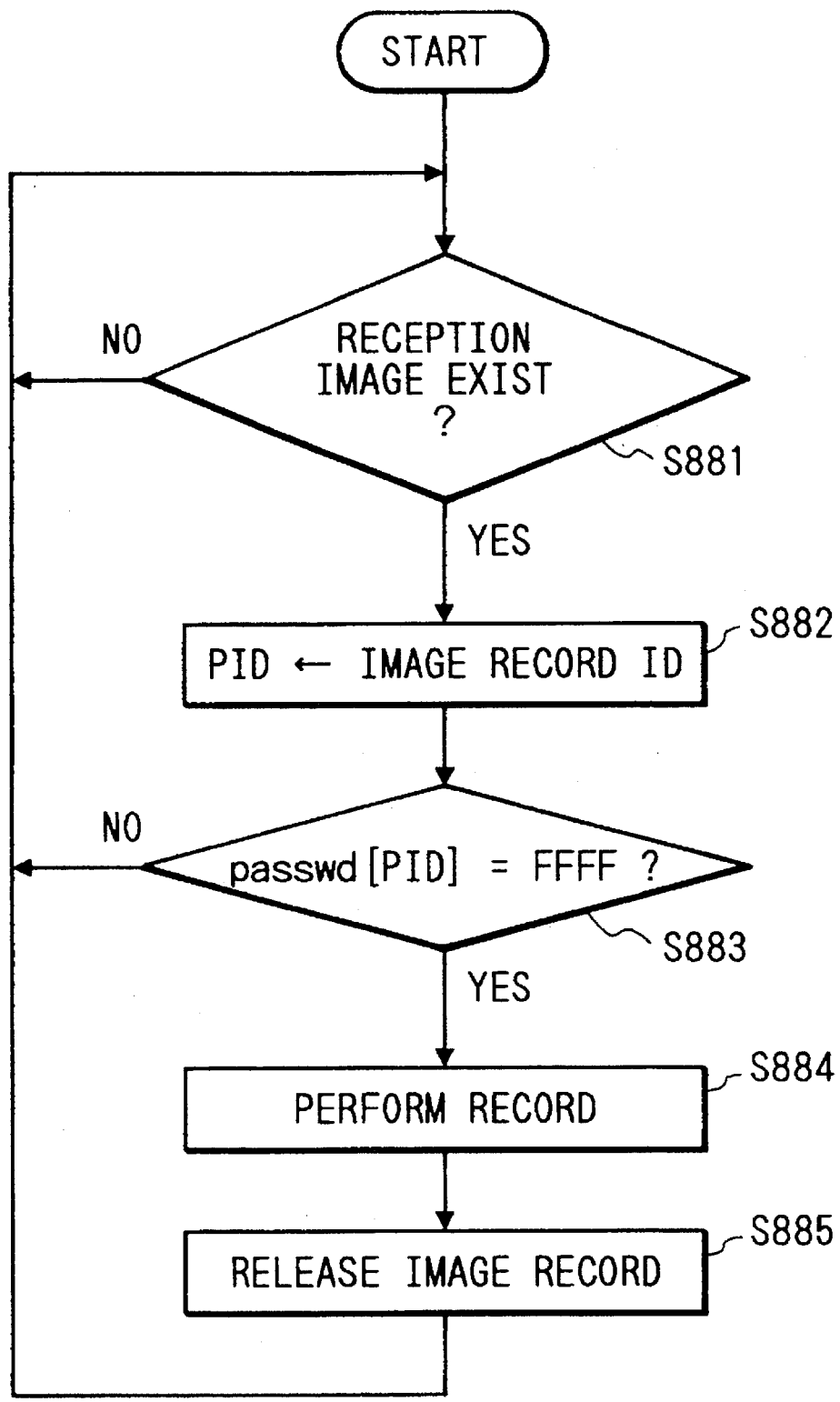
FIG. 35 is a flow chart of an automatic output process of the seventh embodiment.

FIG. 35 is a flow chart showing an automatic output process of a reception image executed by the CPU 10. The automatic output process runs in parallel with the reception process.

In the figure, password designates the password table in FIG. 33.

In a normal waiting state, the CPU 10 is checking at step S801 whether a received image exists. When an image received at step S66 in FIG. 34 is detected, the CPU 10 sets for PID a ring pattern ID which was set into the image record at step S64 (step S802). Next, the CPU 10 references a password corresponding to PID in the password table (step S803). If the password is FFFF, the CPU 10 records the image at step S804. On completion of the recording, the CPU 10 releases the image record at step S805 and returns to step S801. If a password is not FFFF at step S803, the CPU 10 returns to step S801.

Figure 36:
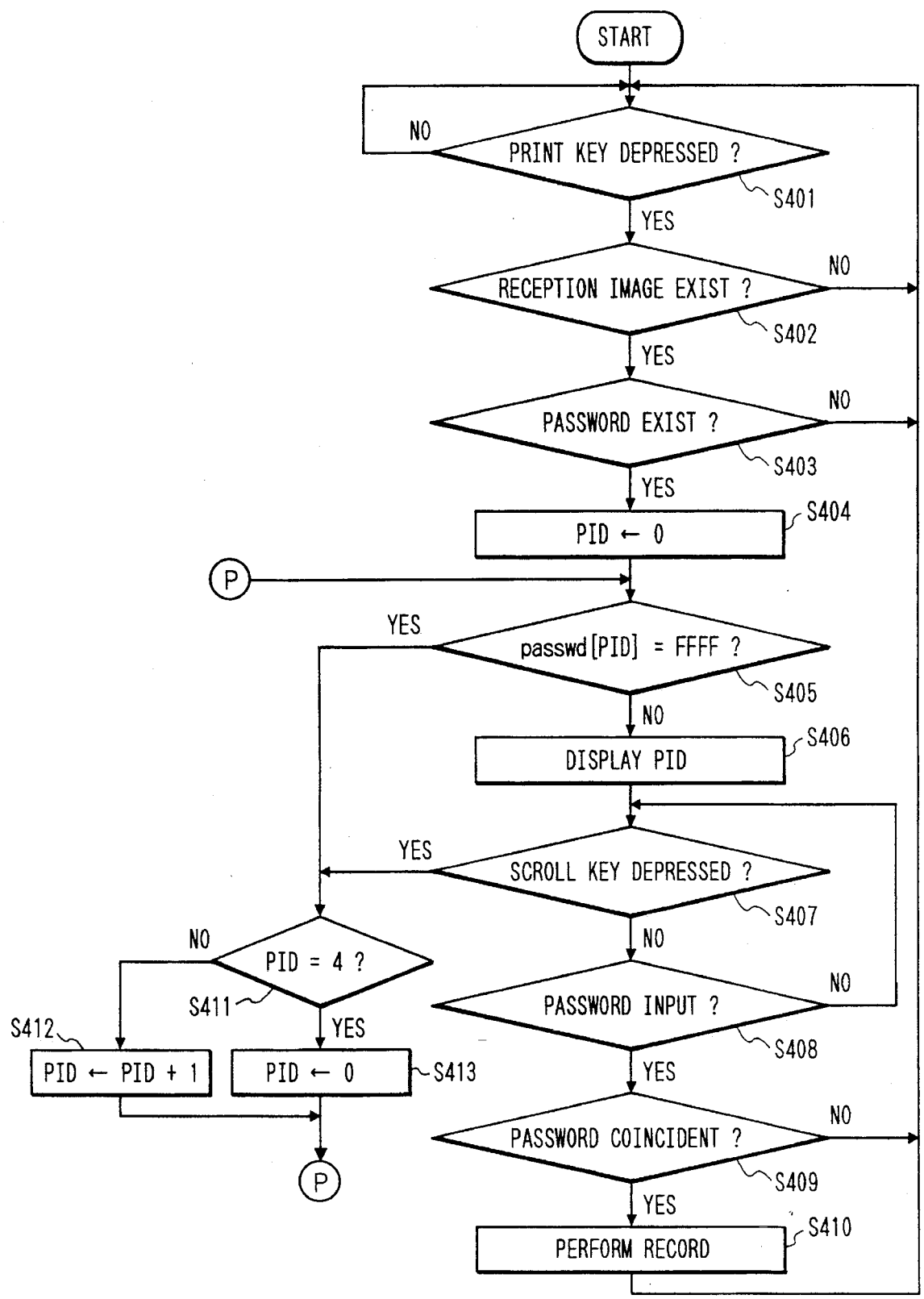
FIG. 36 is a flow chart of a manual output process of the seventh embodiment.

FIG. 36 is a flow chart showing a manual output process of a reception image executed by the CPU 10. The manual output process also runs in parallel with the reception process.

In the normal waiting state, the CPU 10 is checking at step S401 whether a print key is pressed or not. When the print key is pressed, the CPU 10 proceeds to step S402 and checks whether an image received at step S66 in FIG. 34 exists or not. If the reception image does not exist, the CPU 10 returns to step S401. If the reception image exists at step S402, the CPU 10 proceeds to step S403 and references the password buffer to check for a password other than FFFF. If no password exists at step S403, the CPU 10 returns to step S401.

If even one password exists in the password buffer at step S403, the CPU 10 sets PID to 0 at step S404 and then proceeds to step S405. At step S405, the CPU 10 checks whether an entry corresponding to PID in the password table in FIG. 33 is FFFF or not. If the corresponding entry is FFFF, the CPU 10 updates PID at steps 411 to 413 and then returns to step S405. If an entry corresponding to PID in the password buffer is not FFFF at step S405, the CPU 10 considers that there exists a password, and proceeds to step S406.

At step S406, the CPU 10 displays a PID value (0 to 4) or a user's abbreviation corresponding to PID on a display unit of the console unit 15, and at steps S407 and S408, the CPU 10 waits for a user to make a key entry. When a scroll key is pressed at step S407, the CPU 10 updates PID at steps S411 to S413 and then returns to step S405. When a password is entered at step S408, the CPU 10 proceeds to step S409 and checks whether or not the entered password matches an entry corresponding to PID in the password table. If they match, the CPU 10 records a reception image corresponding to the password from the record unit, and then returns to step S401. If they do not match, the CPU 10 returns to step S401 without performing a record.

As described above, in the present embodiment, a password is registered in the password table for each pattern of a call signal; a pattern of a call signal is identified based on an output from the CI detection circuit 6; and the CPU 10 performs a confidential reception into the RAM 12 or performs a printout from the record unit 14 according to the identified pattern of the call signal and a password in the password table. When a password entered from the console unit 15 matches a password registered in the password table, a corresponding image stored in the RAM 12 is printed out from the record unit 14.

Figure 37:
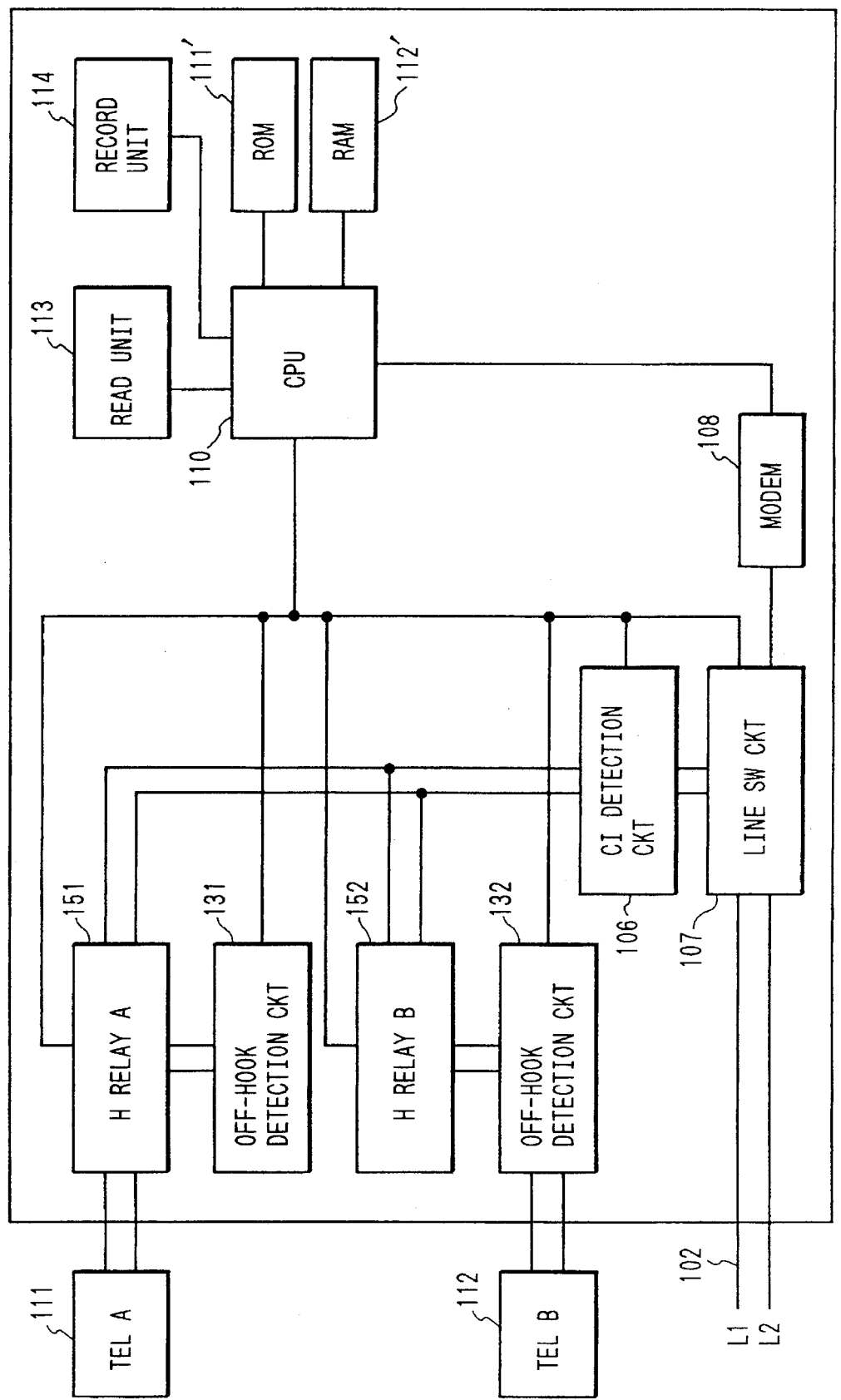
FIG. 37 is a block diagram of a facsimile apparatus of an eighth embodiment.

FIG. 37 is a block diagram showing an eighth embodiment of the present invention.

Reference numerals 151 and 152 designate H relays to connect telephones A and B to a line 102; reference numerals 131 and 132 designate off-hook detection circuits to detect an off-hook state of the telephones A and B; reference numeral 106 designates a CI detection circuit; reference numeral 107 designates a line switch circuit; reference numeral 108 designates a modem; reference numeral 110 designates a CPU; reference numeral 111' designates a ROM; reference numeral 112' designates a RAM; reference numeral 113 designates a read unit; and reference numeral 114 designates a record unit.

FIG. 38 shows the contents of an operation set table in the present embodiment. ID and an operation setting are stored in each row in correspondence to a ring pattern. ID 0 corresponds to a normal ring (FIG. 5A); ID 1 corresponds to a double ring (FIG. 5B); ID 2 corresponds to a triple ring of short-short-long (FIG. 5C); ID 3 corresponds to a triple ring of short-long-short (FIG. 5D); and ID 4 corresponds to some other ring pattern. TELA represents a telephone 111, TELB represents a telephone 112, and FAX represents a facsimile reception. The contents of the table are entered and set from a console unit by a user.

Figure 39A:
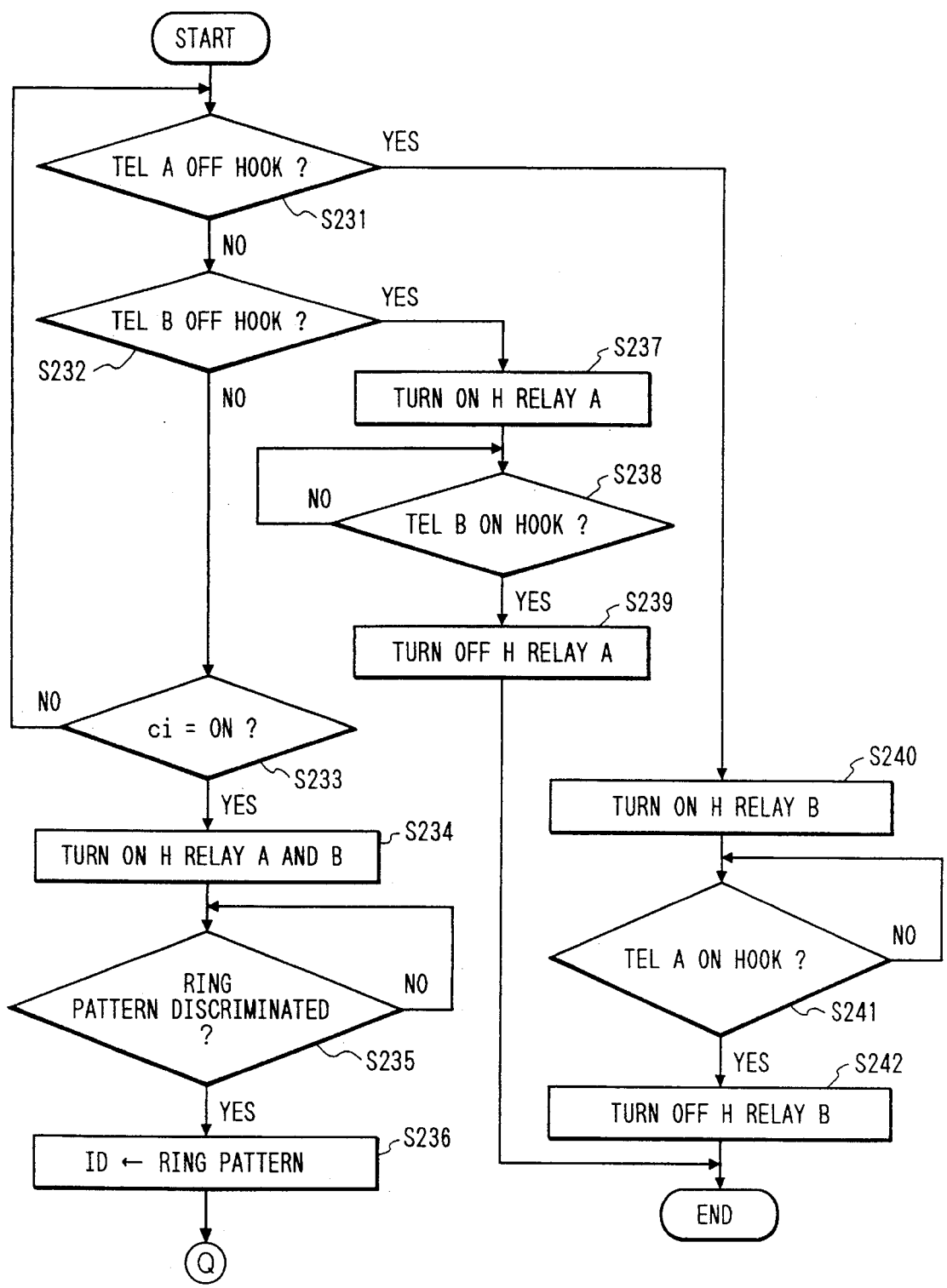
Figure 39B:
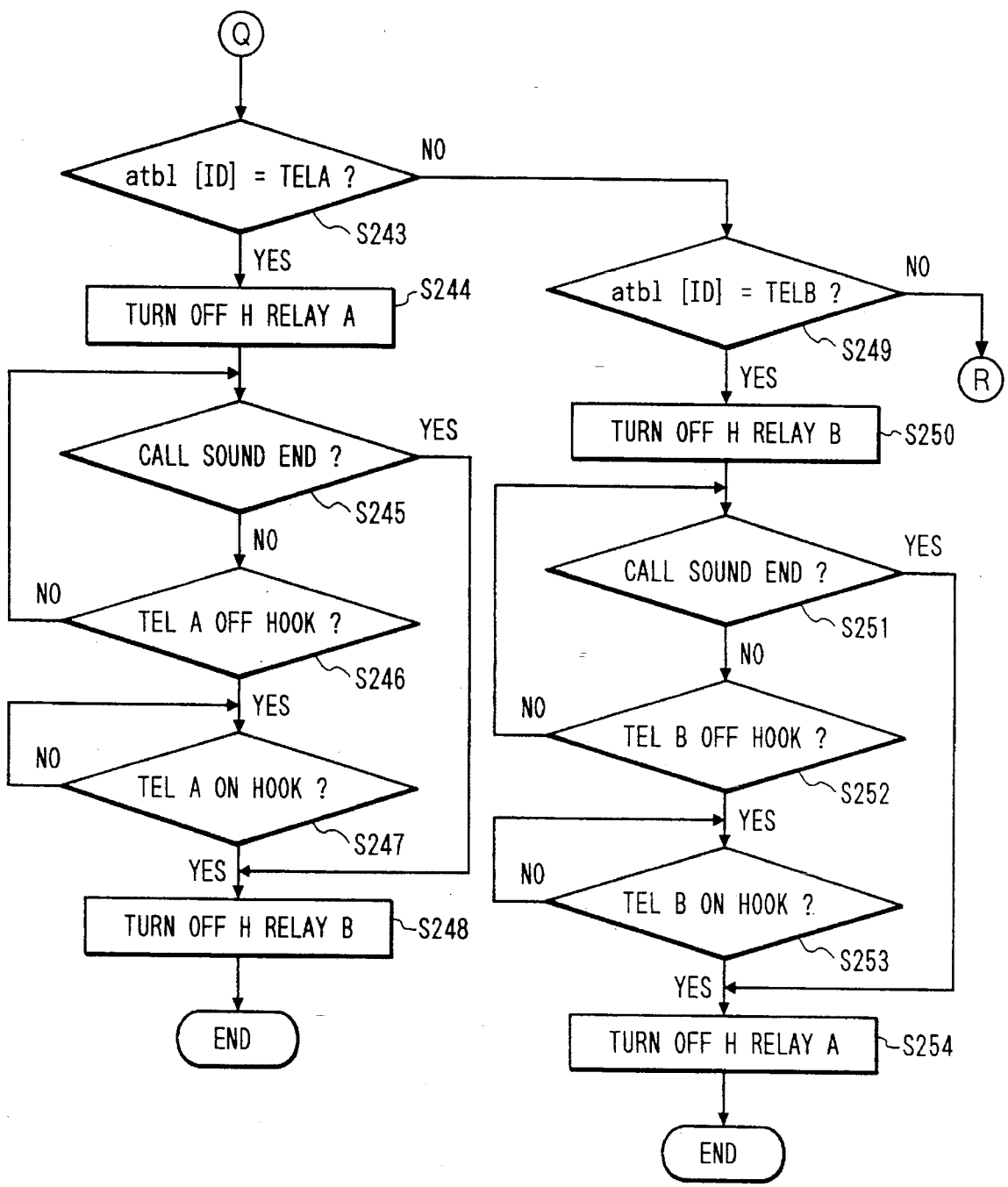
Figure 40A:
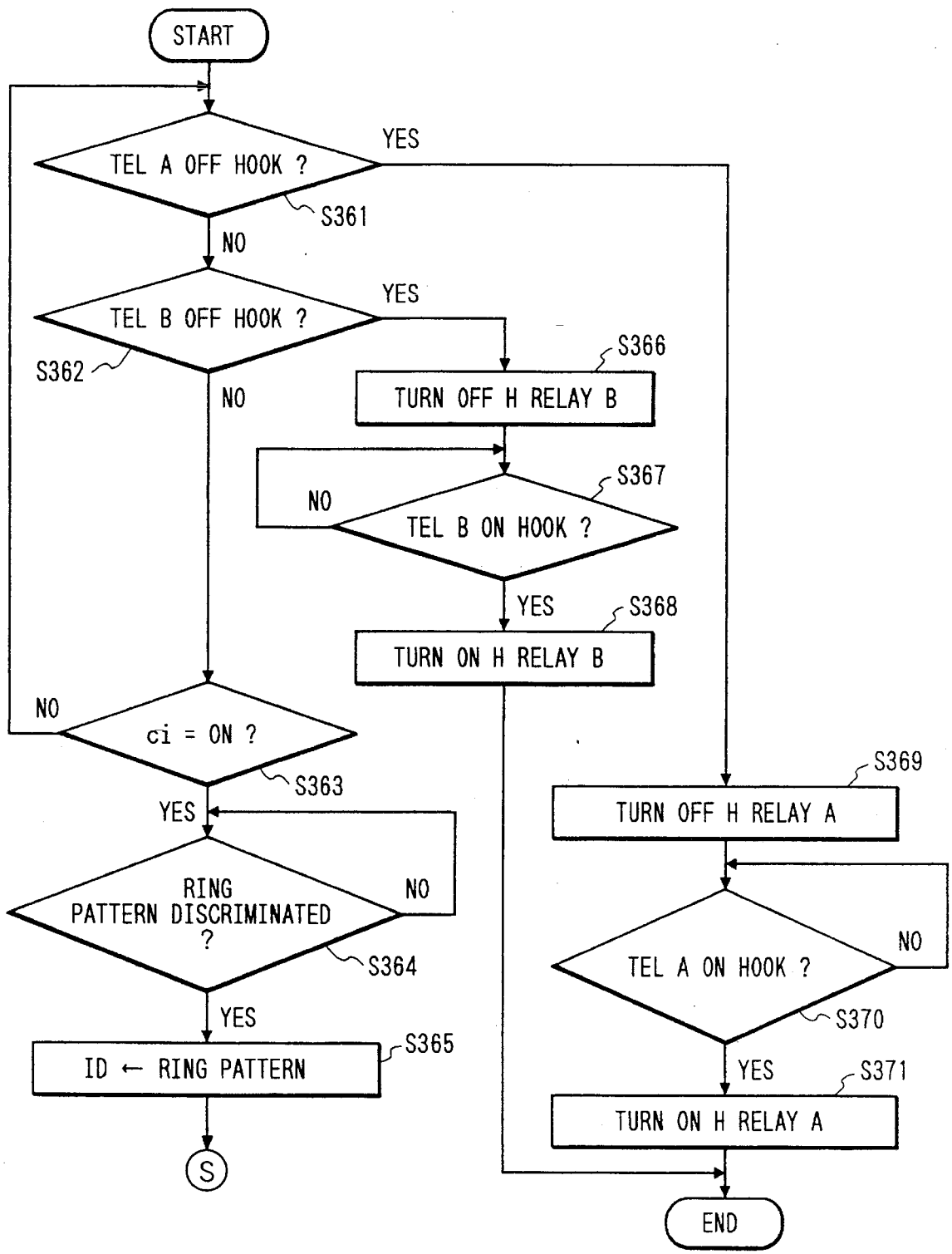
FIGS. 40A to 40D are flow charts of a termination operation of a ninth embodiment.
Figure 40B:
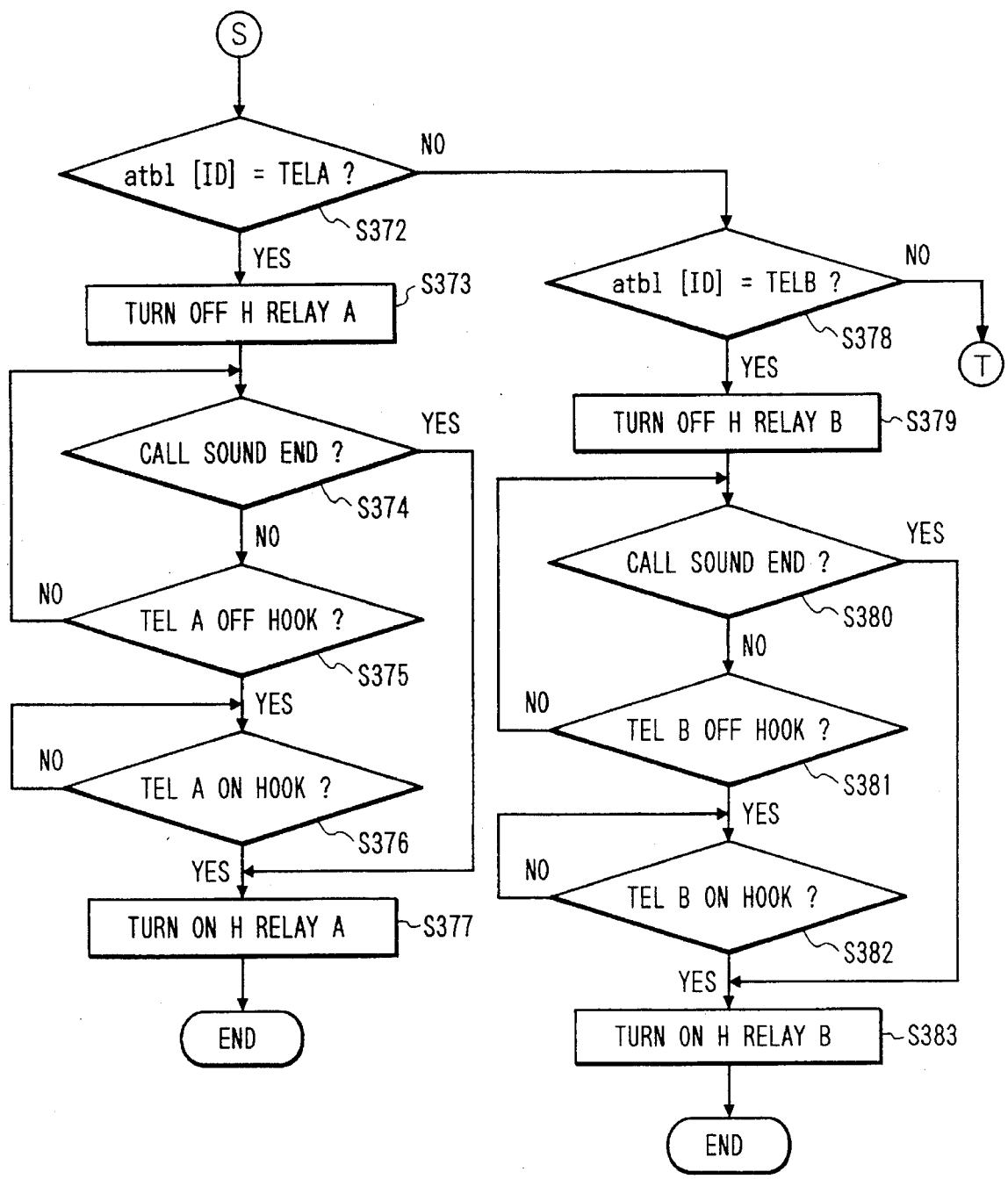
Figure 40C:
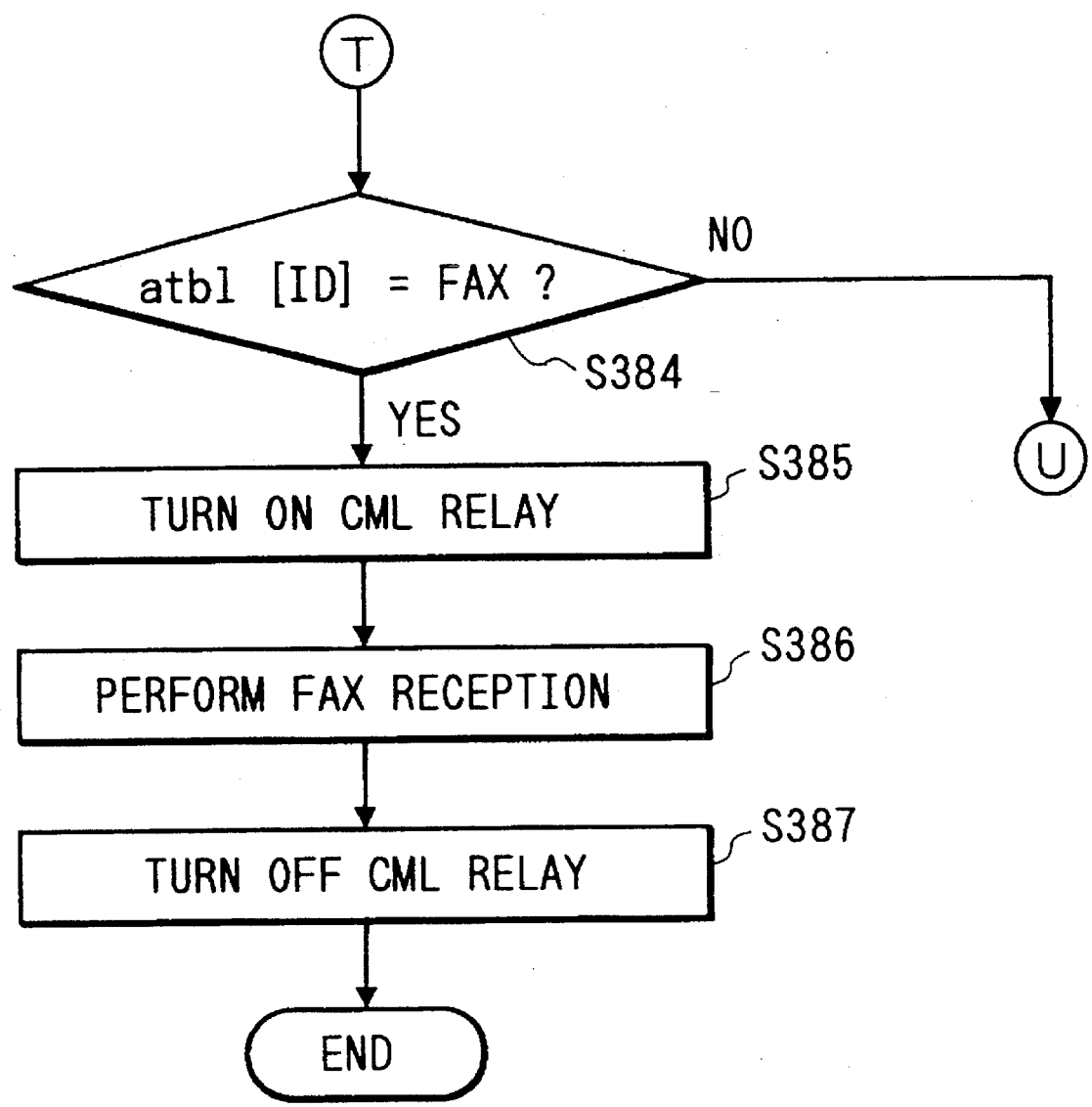
Figure 40D:
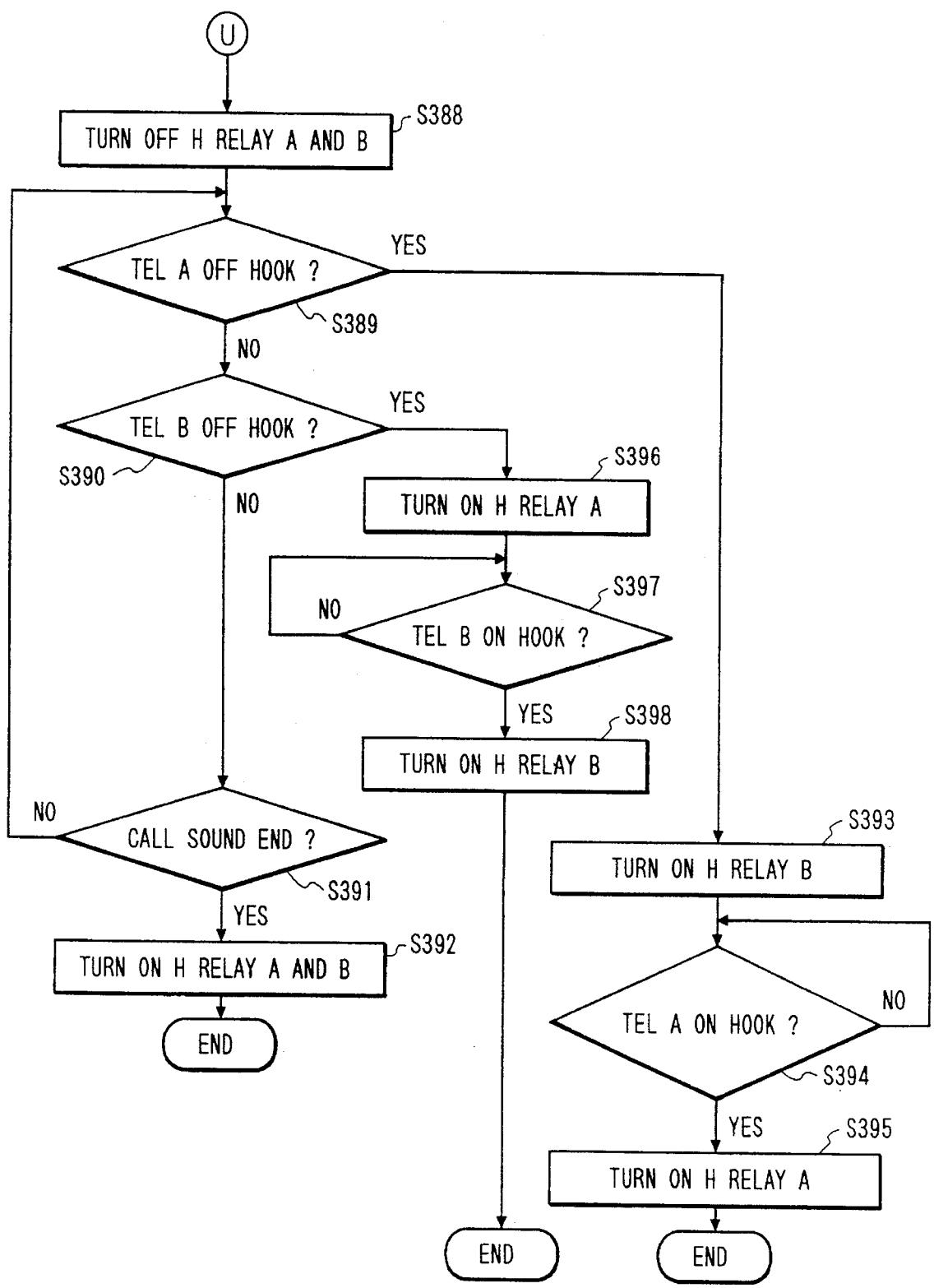

FIGS. 39A to 39C are flow charts of operations in the present embodiment.

First, an operation of a privacy function in a normal waiting state (state where no call sound comes in) is described. In the normal waiting state, the H relays 151, 152 are OFF, i.e. the telephones 111, 112 are connected to the line. The operation will now be described along the flow charts. If the telephone 111 is in an off-hook state at step S231, the CPU 110 proceeds to step S240 and turns ON the H relay 152 to disconnect the telephone 112 from the line, and then waits for the telephone 111 to go on-hook at step S241. When the telephone 111 goes on-hook, the CPU 110 turns OFF the H relay 132 back again and ends the operation.

If the telephone 111 is in an on-hook state at step S231 and if the telephone 112 is in an off-hook state at step S232, the CPU 110 proceeds to step S237 and turns ON the H relay 151 to disconnect the telephone 111 from the line, and then waits for the telephone 112 to go on-hook at step S238. When the telephone 112 goes on-hook, the CPU 110 turns OFF the H relay 151 back again and ends the operation.

If the telephone 111 is in an on-hook state at step S231, if the telephone 112 is in an on-hook state at step S232, and if CI is not detected at step S233, the CPU 110 returns to step S231.

An operation on detection of CI will now be described.

On detection of CI, the CPU 110 immediately turns ON the H relays 151, 152 (step S234) to disconnect the telephones 111, 112 from the telephone line 102, thereby preventing the telephones from ringing. Then, the CPU 110 waits for ring pattern discrimination to be completed at step S235. The ring pattern discrimination process in FIGS. 4A and 4B and FIG. 6 is herein used in common. On completion of the ring pattern discrimination, the CPU 110 proceeds to step S236 to set a ring pattern ID for ID.

At step S243, the CPU 110 references the operation set table (atbl) for setting in a position indicated by ID. If the setting is TELA, the CPU 110 proceeds to step S244 and turns OFF the H relay S151 to connect the telephone 111 to the line, thereby ringing the telephone 111. Then, at steps S245–S246, the CPU 110 waits until the call sound ends or the telephone 111 Goes off-hook. If the call sound ends before the telephone 111 Goes off-hook, the CPU 110 turns OFF the H relay 152 at step S248 and ends the operation. When the telephone 111 goes off-hook, the CPU 110 waits for the telephone 111 to go on-hook at step S247. When the telephone 111 goes on-hook, the CPU 110 turns OFF the H relay 152 at step S248 and ends the operation.

Next, at step S249, the CPU 110 references the operation set table (atbl) for setting in a position indicated by ID. If the setting is TELB, the CPU 110 proceeds to step S250 and turns OFF the H relay S152 to connect the telephone 112 to the line, thereby ringing the telephone 112. Then, at steps S251–S252, the CPU 110 waits until the call sound ends or the telephone 112 goes off-hook. If the call sound ends before the telephone 112 goes off-hook, the CPU 110 turns OFF the H relay 151 at step S254 and ends the operation. When the telephone 112 goes off-hook, the CPU 110 waits for the telephone 112 to go on-hook at step S253. When the telephone 112 goes on-hook, the CPU 110 turns OFF the H relay 151 at step S254 and ends the operation.

Then, at step S255, the CPU 110 references the operation set table (atbl) for setting in a position indicated by ID. If the setting is FAX, the CPU 110 turns OFF the H relays 151, 152 at step S256, turns ON the line switch circuit 107 at step S257 to connect the line 102 and the modem 108, performs a facsimile reception at step S258, and then turns OFF the line switch circuit 107 at step S259 to release the line and to end the operation.

When the CPU 110, at step S255, references the operation table (atbl) for setting in a position indicated by ID, if the setting is even not FAX, the CPU 110 turns OFF the H relays 151, 152 and ends the operation.

A ninth embodiment of the present invention will now be described.

The present embodiment uses the construction in FIG. 37 in common.

According to the present embodiment, in a normal state, the H relays 151, 152 are turned ON to disconnect the telephones from the line. An H relay on the side of a telephone which goes off-hook, is turned OFF.

FIGS. 40A to 40D are flow charts showing operations of the present embodiment.

First, an operation of a privacy function in the normal waiting state (state where no call sound comes in) is described. In the normal waiting state, the H relays 151, 152 are ON, i.e. the telephones 111, 112 are disconnected from the line. The operation will now be described along the flow charts. If the telephone 111 is in a off-hook state at step S361, the CPU 110 proceeds to step S369 and turns OFF the H relay 151 to connect the telephone 111 to the line, and then waits for the telephone 111 to go on-hook at step S370. When the telephone 111 goes on-hook, the CPU 110 turns ON the H relay 152 back again and ends the operation.

If the telephone 111 is in an on-hook state at step S361 and if the telephone 112 is in an off-hook state at step S362, the CPU 110 proceeds to step S366 and turns OFF the H relay 152 to connect the telephone 112 to the line, and then waits for the telephone 112 to go on-hook at step S367. When the telephone 112 goes on-hook, the CPU 110 turns ON the H relay 152 back again and ends the operation.

If the telephone 111 is in an on-hook state at step S361, if the telephone 112 is in an on-hook state at step S362, and if CI is not detected at step S363, the CPU 110 returns to step S361.

An operation on detection of CI will now be described.

On detection of CI, the CPU 110 waits for ring pattern discrimination to be completed at step S364. The ring pattern discrimination process in FIGS. 4A and 4B and FIG. 6 is herein used in common. On completion of the ring pattern discrimination, the CPU 110 proceeds to step S365 to set a ring pattern ID for ID.

At step S372, the CPU 110 references the operation set table (atbl) for setting in a position indicated by ID. If the setting is TELA, the CPU 110 proceeds to step S373 and turns OFF the H relay S151 to connect the telephone 111 to the line, thereby ringing the telephone 111. Then, at steps S374–S375, the CPU 110 waits until the call sound ends or the telephone 111 goes off-hook. If the call sound ends before the telephone 111 goes off-hook, the CPU 110 turns ON the H relay 151 back again at step S377 and ends the operation. When the telephone 111 goes off-hook, the CPU 110 waits for the telephone 111 to go on-hook at step S376. When the telephone 111 goes on-hook, the CPU 110 turns ON the H relay 151 back again at step S377 and ends the operation.

Next, at step S378, the CPU 110 references the operation set table (atbl) for setting in a position indicated by ID. If the setting is TELB, the CPU 110 proceeds to step S379 and turns OFF the H relay S152 to connect the telephone 112 to the line, thereby ringing the telephone 112. Then, at steps S380–S381, the CPU 110 waits until the call sound ends or the telephone 112 goes off-hook. If the call sound ends before the telephone 112 goes off-hook, the CPU 110 turns ON the H relay 152 back again at step S383 and ends the operation. When the telephone 112 goes off-hook, the CPU 110 waits for the telephone 112 to go on-hook at step S382. When the telephone 112 goes on-hook, the CPU 110 turns ON the H relay 152 back again at step S383 and ends the operation.

Then, at step S384, the CPU 110 references the operation set table (atbl) for setting in a position indicated by ID. If the setting is FAX, the CPU 110 turns ON the line switch circuit 107 at step S385 to connect the line 102 and the modem 108, performs a facsimile reception at step S386, and then turns OFF the line switch circuit 107 at step S387 to release the line and to end the operation.

When the CPU 110, at step S384, references the operation table (atbl) for setting in a position indicated by ID, if the setting is even not FAX, the CPU 110 turns OFF the H relays 151, 152 and rings the telephones 111, 112 (step S388). Then, the CPU 110 waits for the telephones 111, 112 to go off-hook or for the call sound to end along a loop of steps S389–S391.

On detection of an off-hook of the telephone 111 at step S389, the CPU 110 turns ON the H relay 152 at step S393 to disconnect the telephone 112 from the line, and then waits the telephone 111 to go on-hook at step S394. When the telephone 111 goes on-hook, the CPU 110 turns ON the H relay 151 back again at step S395.

On detection of an off-hook of the telephone 112 at step S390, the CPU 110 turns ON the H relay 151 at step S396 to disconnect the telephone 111 from the line, and then waits the telephone 112 to go on-hook at step S397. When the telephone 112 goes on-hook, the CPU 110 turns ON the H relay 152 back again at step S398.

When the call sound ends at step S391, the CPU 110 turns ON the H relays 151, 152 back again and ends the operation.

Finally, transmission of a pseudo call sound at steps S288 in FIG. 13 will be described.

FIG. 41 shows the contents of a pseudo call sound pattern data table secured in the RAM 12. Pattern data corresponding to a ringing pattern ID (identification) is stored in the table at each row. The pattern data comprises an array of an ON time and an OFF time (unit: 10 msec) and delimiters (0). For example, ID 0 is a repetition of a 2-second ON and a 4-second OFF. Here, ID 0 corresponds to a normal ring (FIG. 5A); ID 1 corresponds to a double ring (FIG. 5B); ID 2 corresponds to a triple ring of short-short-long (FIG. 5C); ID 3 corresponds to a triple ring of short-long-short (FIG. 5D); and ID 4 corresponds to some other ring pattern.

Figure 42:
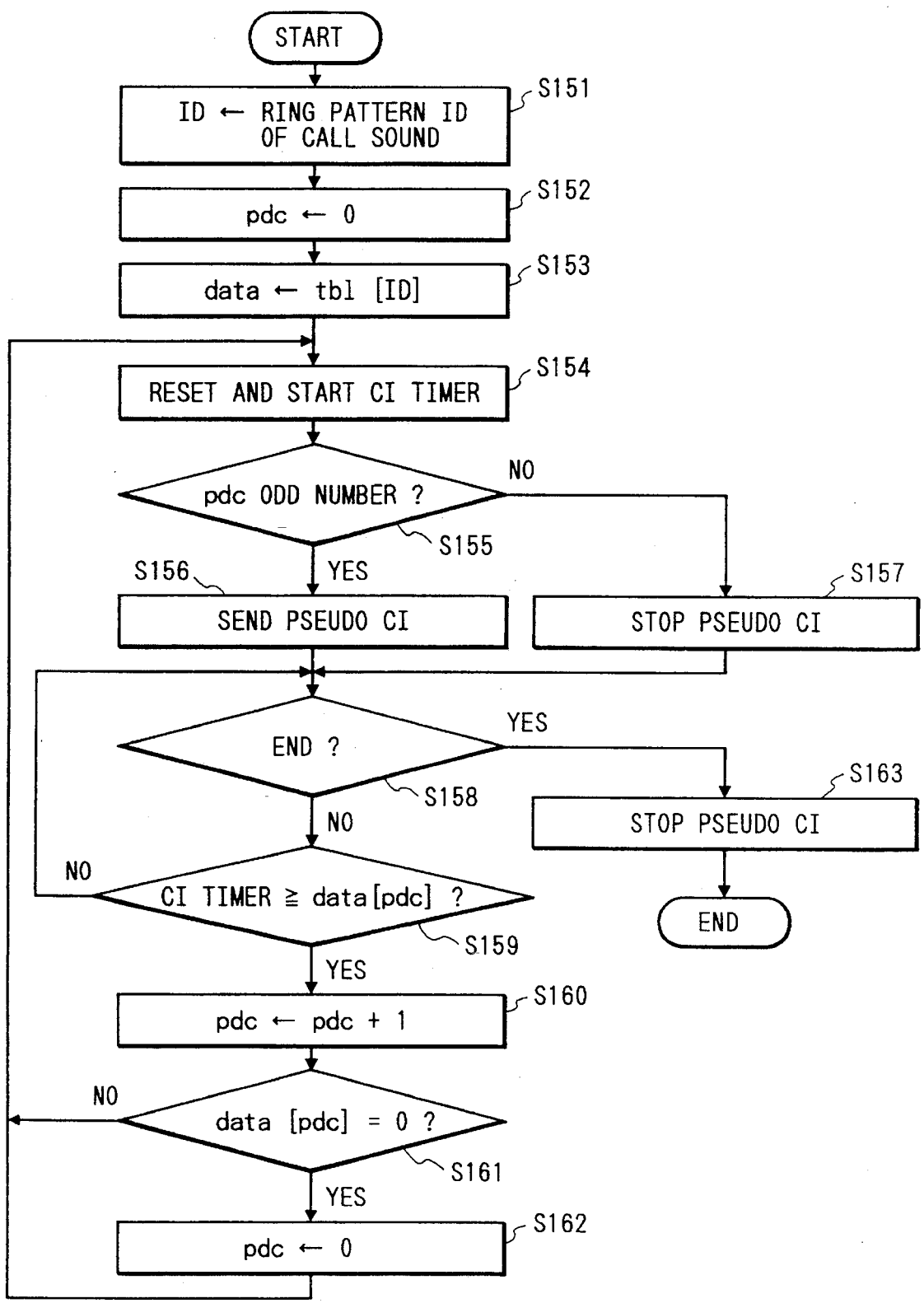
FIG. 42 is a flow chart of a pseudo call sound ringing process.

FIG. 42 is a flow chart showing the contents of a pseudo call sound ringing process.

In the figure, data (hereinafter referred to as 'data') is a buffer to store the pattern data on a pseudo CI. The pattern data comprises an array of an ON time and an OFF time (unit: 10 msec) and delimiters (0). pdc is a counter to indicate which data in 'data' is currently being executed. tbl is a pseudo call sound pattern data table. A CI timer is a timer to be incremented every 10 msec.

First, at step S151, the CPU 10 sets the type of a call sound ringing pattern for ID. Then, the CPU 10 sets 0 into pdc (step S152), and copies a pattern data in tbl at an ordinal position indicated by ID into 'data' (step S153).

Then, the CPU 10 resets and starts the CI timer (step S154). If pdc is an odd number at step S155, the CPU 10 drives the pseudo CI circuit 4 to transmit a pseudo CI (step S156); if pdc is an even number, the CPU 10 stops a pseudo CI (step S157). In a loop of steps S158–S159, the CPU 10 waits for an end instruction from a FAX/TEL switch process (step S158) and also waits until a time indicated by data in a data array in 'data' at an ordinal position indicated by pdc (step S159). If a time-out occurs at step S159, the CPU 10 increments pdc at step S160 and then proceeds to step S161.

If data in the data array in 'data' at an ordinal indicated by pdc is not 0, the CPU 10 returns to S154; if 0, the CPU 10 clears pdc at step S162 and then returns to step S154. On detection of an end instruction at step S158, the CPU 10 stops a pseudo CI at step S163 and ends the operation.

According to the above-mentioned process, a pseudo CI can be transmitted according to the pattern table in FIG. 41.

Figure 43A:
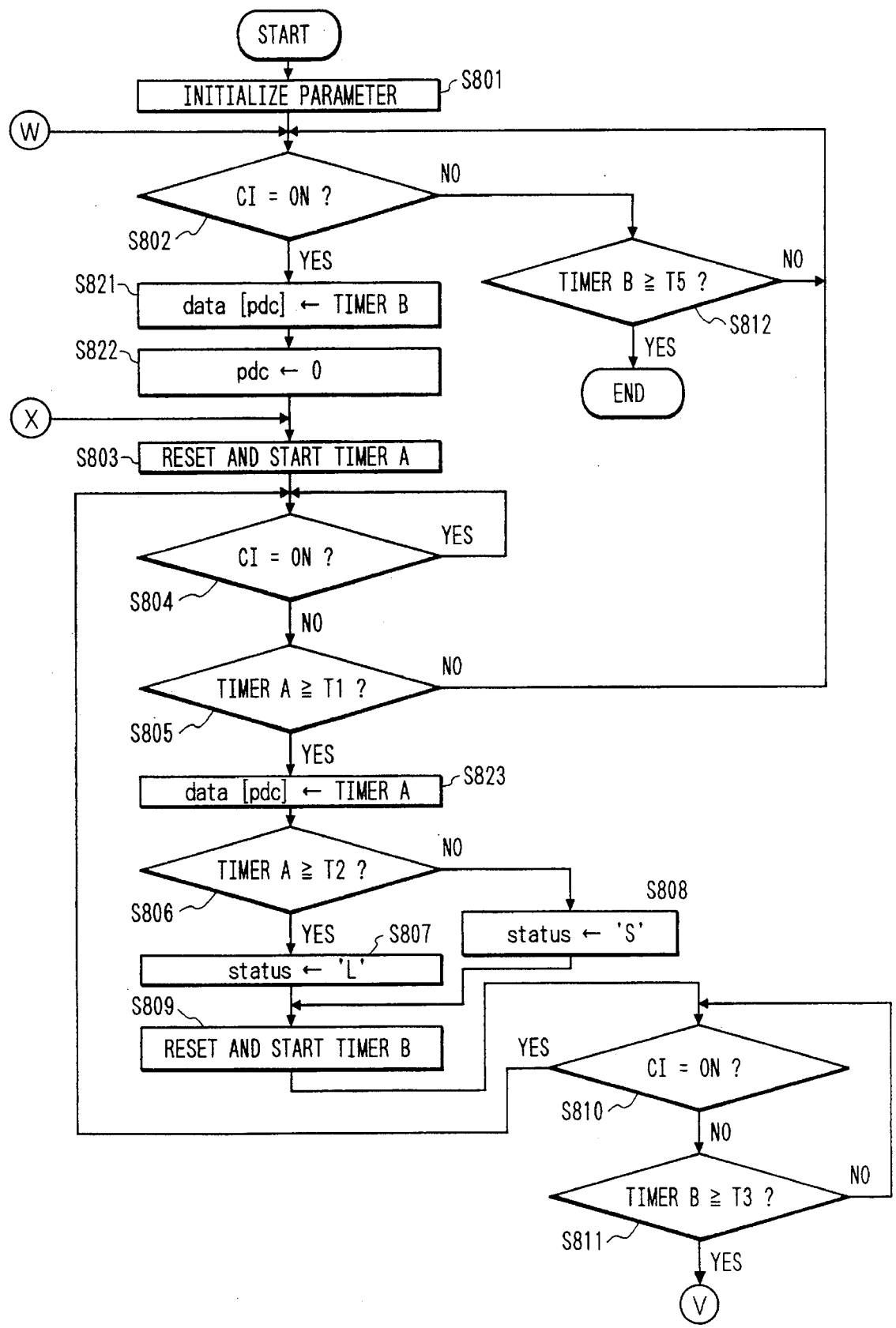
FIGS. 43A and 43B are flow charts of a modified example of a pseudo call sound ringing process.
Figure 43B:
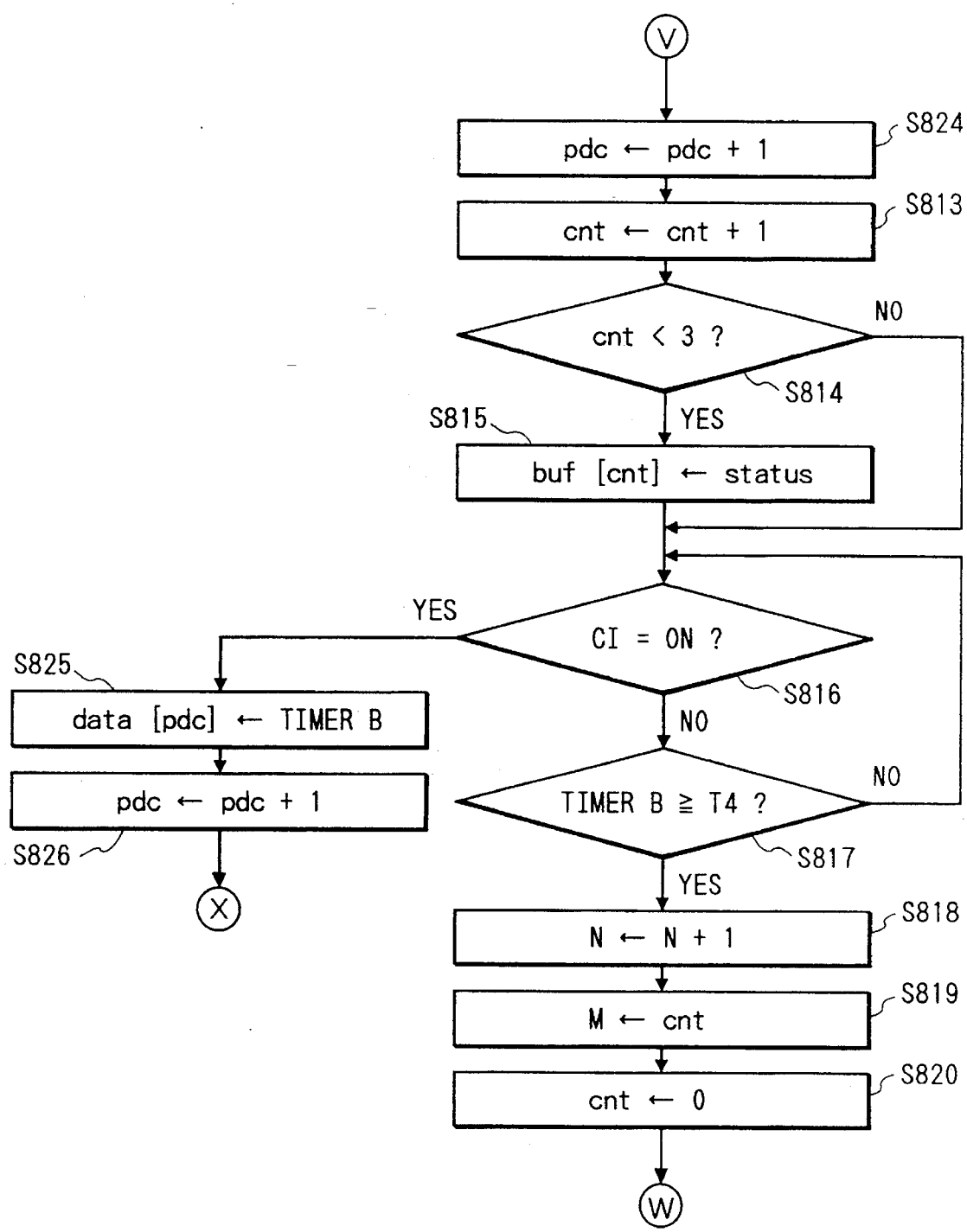

FIGS. 43A and 43B are flow charts showing a modified version of the CI detection process in FIG. 42. A process at steps S802–S820 is identical to a process at steps S102–S120 in FIGS. 4A and 4B of the first embodiment. At step S301, a process of clearing the buffer 'data' which stores the pseudo CI pattern data and of clearing the counter pdc which indicates which data in 'data' is currently being executed, is added to a process in step S101.

Steps S821–S826 are newly added steps in the present modified example.

When CI first goes ON, the CPU 10 saves the contents of the timer B to 'data' at a 0'the position at step S821. At this time (when CI first goes ON), the process at step S821 does not have meaning; it has meaning when a call sound enters its second cycle. This will be described in detail later.

Next, the CPU 10 clears pdc at step S822 and then proceeds to step S803. At step S803, the CPU 10 resets and starts the timer A. At step S804, it waits for CI to go OFF. When at step S805, it determines that an ON time of CI is equal to or greater than T1 and that the ON is valid, it proceeds to step S823 to store the contents of the timer A in 'data' at an ordinal position indicated by pdc.

When at step S811, the CPU 10 determines that an OFF time of CI is equal to or greater than T3 and that the OFF is valid, it proceeds to step S824 to increment pdc.

Then, when CI goes ON before the timer B reaches a time of T4 at steps S816–S817, the CPU 10 stores the contents of the timer A in 'data' at an ordinal position indicated by pdc (step S825), increments pdc (step S826), and then returns to step S803.

When the timer B reaches a time of T4 before CI goes ON at steps S816–S817, the CPU 10 performs a process of steps S818–S820 and then returns to step S802. Then, in a loop of steps S802 and S812, the CPU 10 waits for CI to becomes ON. When CI goes ON, the CPU 10 stores a value of the timer B in 'data' at an ordinal position indicated by the pdc at step S821, clears pdc at step S822, and then proceeds to step S803. In other words, at this time, the OFF time between a call sound and a next call sound is set in 'data'.

Since data is set in 'data' in the CI detection process, a ring pattern ID obtainment process (step S151 in FIG. 42) in a pseudo CI transmission process and a process of reading the pattern data from the table (step S153 in FIG. 42) are unnecessary. Hence, the pseudo CI transmission process in the present embodiment is identical to the process in FIG. 42 with steps S151 and S153 removed therefrom.

Thus, the present embodiment can reproduce any call sound pattern in the form of a pseudo call sound.

In the present embodiment, the pseudo CI circuit rings the telephone, thereby ringing a pseudo call sound. However, by providing the display unit 15 with a voice generator like a buzzer, a pseudo bell sound may be rung (step S288 in FIG. 13, step S41 in FIG. 14B, and step S513 in FIG. 16B).

The present invention is applicable not only to a pseudo call at automatic FAX/TEL switch but a pseudo call at reservation for speech communication.

As described above, when a telephone call is received, an incoming ring pattern is identified, and then a line is closed. Then, if the telephone call is from a partner other than facsimile, a pattern data associated with a pseudo call sound corresponding to the identified ring pattern is selected, and a pseudo call sound is rung based on the pattern data. Accordingly, the pseudo call sound rings in the same manner as a pattern of a call signal transmitted from an exchange. Hence, even when the apparatus is connected to such an exchange that provides services according to ring patterns used distinctively by a user, the user can utilize the services of the exchange as well as an automatic FAX/TEL switch function.

A facsimile reception at step S219 in FIG. 13 and other steps will now be described with reference to FIG. 44.

First, the CPU 10 sets a ring pattern of a call sound for ID (step S622). Based on the ID, the CPU 10 stores a telephone number and an abbreviation corresponding to the ring pattern from a called terminal information table in FIG. 45 to a CSI buffer for FIF and an NSF buffer for a user's abbreviation, respectively (steps S623 and S624). The CPU 10 performs an operation of reception at step S625 and then ends the reception. In the operation of reception, the contents of the CSI buffer for FIF and the NSF buffer for a user's abbreviation are transmitted.

Figures 44, 45:
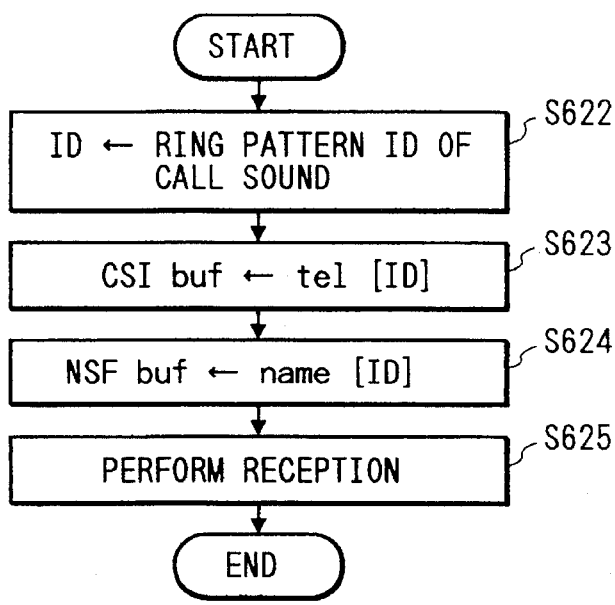
FIG. 44 is a flow chart of a facsimile reception process.
FIG. 45 is a construction diagram of a called terminal information table.

FIG. 45 shows the contents of the called terminal information table in the RAM 12 in the present embodiment. ID, a user's telephone number, and a user's abbreviation are stored in each row in correspondence to a ring pattern. ID 0 corresponds to a normal ring (FIG. 5A); ID 1 corresponds to a double ring (FIG. 5B); ID 2 corresponds to a triple ring of short-short-long (FIG. 5C); ID 3 corresponds to a triple ring of short-long-short (FIG. 5D); and ID 4 corresponds to some other ring pattern.

Although the present invention has been described based on the preferred embodiments, the invention is also applicable to data communications other than facsimile and may be modified in various forms within the scope of the appended claims.

What is claimed is:

1. A communication apparatus comprising:

detecting means for detecting plural kinds of ringing signals from a communication line to which a plurality of identification information are assigned;

receiving means for receiving data through the communication line;

recording means for recording data received by said receiving means;

memory means for storing the received data; and control means for controlling whether to record the received data or to store the received data into said memory means in accordance with the kind of ringing signal detected by said detection means.

2. A communication apparatus comprising:

ringing signal detection means for detecting plural kinds of ringing signals from a communication line to which a plurality of identification information are assigned;

discriminating means for discriminating whether or not a calling party is a data communication terminal, in accordance with a signal from the calling party;

data communication means for performing a data communication; and selecting means for selecting one of a first mode to perform the data communication in response to a detection of the ringing signal by said ringing signal detection means and a second mode to perform the data communication in accordance with a result of discrimination by said discriminating means after the detection of the ringing signal, in accordance with the kind of ringing signal detected by said ringing signal detection means.

3. A communication apparatus according to claim 1, wherein said data communication includes facsimile data communication.

4. A communication apparatus according to claim 2, further comprising voice answering means for sending a voice message to the communication line, and wherein said selecting means selects one of the first mode, the second mode and a third mode to send the voice message in accordance with the kind of ringing signal detected by said ringing signal detection means.

5. A communication apparatus according to claim 2, wherein said signal from a calling party side includes a CNG signal.

6. A communication apparatus according to claim 2, further comprising means for causing said data communication means to transmit data corresponding to the kind of ringing signal detected by said ringing signal detection means.

7. A communication apparatus according to claim 2, further comprising recording means for recording data received by said data communication means, and control means for controlling said recording means in accordance with the kind of ringing signal detected by said ringing signal detection means.

8. A communication apparatus according to claim 7, wherein said control means includes input means for inputting a password and controls said record means according to a password inputted from said input means and an intermittent pattern of said call signal.

9. A data receiving method comprising the steps of:

detecting plural kinds of ringing signals from a communication line to which a plurality of identification information are assigned;

receiving data through the communication line;

storing the received data into a memory;

recording the received data; and controlling whether to record the received data or to store the received data into a memory in accordance with the kind of ringing signal detected in said detecting step.

10. A communication apparatus comprising:

detection means for detecting plural kinds of ringing signals from a communication line to which a plurality of identification information are assigned;

discrimination means for discriminating whether or not a calling party is a data communication terminal, in accordance with a signal from the calling party;

data communication means for performing a data communication;

speech communication means for performing a speech communication; and control means for selecting one of a first mode to perform the speech communication and a second mode to selectively perform the data communication or the speech communication in accordance with a result of the discrimination by said discriminating means, in accordance with the kind of ringing signal detected by said detection means.

11. A communication apparatus according to claim 10, further comprising means for sending a voice message to the communication line.

12. A communication apparatus according to claim 10, further comprising means for manually setting an operation mode, and wherein said control means selects one of the first mode and the second mode in accordance with the kind of ringing signal and the set operation mode.

13. A communication apparatus comprising:

detection means for detecting plural kinds of ringing signals from a communication line to which a plurality of identification information are assigned;

data communication means for performing data communication;

memory means for storing communication result information including information relating to a data communication which has been performed by said data communication means; and control means for controlling said data communication means and said memory means in accordance with the kind of ringing signal detected by said detection means, wherein said control means controls said memory means to store the communication result information including information corresponding to the kind of the detected ringing signal.

14. A communication apparatus according to claim 13, further comprising display means for displaying character information corresponding to the detected ringing signal.

15. A communication method comprising the steps of:

detecting plural kinds of ringing signals from a communication line to which a plurality of identification information are assigned;

performing data communication;

storing, in a memory means, communication result information including information relating to a data communication which has been performed in said data communicating step; and controlling performance of said data communicating step and said storing step in accordance with the kind of ringing signal detected in said detecting step, wherein said controlling step includes controlling the memory means to store the communication result information including information corresponding to the kind of the detected ringing signal.

16. A communication method according to claim 15, further comprising the step of displaying character information corresponding to the detected ringing signal.

17. A communication method comprising the steps of:

detecting plural kinds of ringing signals from a communication line to which a plurality of identification information are assigned;

discriminating whether or not a calling party is a data communication terminal, in accordance with a signal from the calling party; and selecting a first mode to perform a data communication without performing a discrimination in said discriminating step or a second mode to perform the data communication in accordance with a result of discrimination in said discriminating step, in accordance with the kind of ringing signal detected in said detecting step.

18. A method according to claim 17, further comprising the step of storing communication management information including information corresponding to the detected ringing signal.

19. A method according to claim 17, further comprising the step of sending a voice message to the communication line, and wherein said selecting step selects one of the first mode, the second mode and a third mode to send the voice message in accordance with the detected ringing signal.

20. A method according to claim 19, further comprising the step of manually setting an operation mode, and wherein said selecting step selects one of the first mode, the second mode and the third mode in accordance with the detected ringing signal and the set operation mode.

* * * * *

UNITED STATES PATENT AND TRADEMARK OFFICE
CERTIFICATE OF CORRECTION

PATENT NO. : 5,563,932

DATED : October 8, 1996

INVENTOR(S): SHUNICHI TACHIBANA ET AL.

It is certified that error appears in the above-identified patent and that said Letters Patent is hereby corrected as shown below:

COLUMN 1

Line 27, "case," should read --cases,--;
Line 29, "case," should read --cases,--;
Line 50, "are" should read --is--.

COLUMN 3

Line 38, "a" should read --the--.

COLUMN 5

Line 65, "which" should read --in which--.

COLUMN 10

Line 31, "user's" (both occurrences) should read --users'--;
Line 40, " user's" (both occurrences) should read --user's--.

UNITED STATES PATENT AND TRADEMARK OFFICE
CERTIFICATE OF CORRECTION

PATENT NO. : 5,563,932

DATED : October 8, 1996

INVENTOR(S) : SHUNICHI TACHIBANA ET AL.

It is certified that error appears in the above-identified patent and that said Letters Patent is hereby corrected as shown below:

COLUMN 11

Line 26, "Set" should read --set--.

COLUMN 12

Line 48, "in" (second occurrence) should read --In--.

COLUMN 13

Line 59, "detected-at" should read --detected at--.

COLUMN 15

Line 9, "the order." should read --that order.--.

COLUMN 16

Line 4, "the order." should read --that order.--

UNITED STATES PATENT AND TRADEMARK OFFICE
CERTIFICATE OF CORRECTION

PATENT NO. : 5,563,932

DATED : October 8, 1996

INVENTOR(S): SHUNICHI TACHIBANA ET AL.

It is certified that error appears in the above-identified patent and that said Letters Patent is hereby corrected as shown below:

COLUMN 20

Line 17, "Goes" should read --goes--;
   Line 17, "Goes" should read --goes--;
   Line 48, delete "even".

COLUMN 21

Line 61, delete "even".

COLUMN 22

Line 13, "steps" should read --step--.

UNITED STATES PATENT AND TRADEMARK OFFICE
CERTIFICATE OF CORRECTION

PATENT NO. : 5,563,932

DATED : October 8, 1996

INVENTOR(S) : SHUNICHI TACHIBANA ET AL.

It is certified that error appears in the above-identified patent and that said Letters Patent is hereby corrected as shown below:

COLUMN 23

Line 2, "0'the" should read -- 0' the --;
  Line 24, "becomes" should read --become--.

Signed and Sealed this

Fourth Day of March, 1997

Attest:

BRUCE LEHMAN

Attesting Officer     Commissioner of Patents and Trademarks